(12) United States Patent
Kim et al.

(10) Patent No.: US 8,115,894 B2
(45) Date of Patent: Feb. 14, 2012

(54) TRANSFLECTIVE LIQUID CRYSTAL DISPLAY DEVICE AND METHOD FOR MANUFACTURING THE SAME

(75) Inventors: Dong Guk Kim, Kyonggi-do (KR); Won Seok Kang, Seoul (KR); Joo Soo Lim, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 45 days.

(21) Appl. No.: 12/289,074

(22) Filed: Oct. 20, 2008

(65) Prior Publication Data

US 2009/0066868 A1 Mar. 12, 2009

Related U.S. Application Data

(62) Division of application No. 11/116,178, filed on Apr. 28, 2005, now Pat. No. 7,453,537, which is a division of application No. 10/630,688, filed on Jul. 31, 2003, now Pat. No. 6,897,925.

(30) Foreign Application Priority Data

| Jul. 31, 2002 | (KR) | ............................ 10-2002-45338 |
| Apr. 7, 2003 | (KR) | ............................ 10-2003-21653 |
| Jun. 5, 2003 | (KR) | ............................ 10-2003-36394 |

(51) Int. Cl.
*G02F 1/1335* (2006.01)

(52) U.S. Cl. ..................................................... 349/114

(58) Field of Classification Search .................. None
See application file for complete search history.

(56) References Cited

U.S. PATENT DOCUMENTS

| 5,408,345 | A | 4/1995 | Mitsui et al. |
| 5,926,240 | A | 7/1999 | Hirota et al. |
| 6,195,140 | B1 * | 2/2001 | Kubo et al. ..................... 349/44 |
| 6,341,002 | B1 | 1/2002 | Shimizu et al. |
| 6,466,280 | B1 | 10/2002 | Park et al. |
| 6,620,655 | B2 | 9/2003 | Ha et al. |
| 6,697,138 | B2 | 2/2004 | Ha et al. |
| 6,704,081 | B2 | 3/2004 | Ha et al. |
| 6,734,935 | B2 | 5/2004 | Kim et al. |
| 6,831,718 | B2 | 12/2004 | Wei et al. |
| 6,833,883 | B2 | 12/2004 | Park et al. |
| 6,850,298 | B2 | 2/2005 | Fujimori et al. |

(Continued)

FOREIGN PATENT DOCUMENTS

JP 11-109417 4/1999

(Continued)

*Primary Examiner* — Thanh-Nhan Nguyen
(74) *Attorney, Agent, or Firm* — McKenna Long & Aldridge, LLP

(57) ABSTRACT

A transflective type LCD device and a method for manufacturing the same is disclosed, in which an aperture ratio of a reflective part is improved, and manufacturing process is simplified by decreasing the number of masks for forming contact holes. The transflective type LCD device includes a plurality of gate and data lines crossing each other, defining a plurality of pixel regions; a thin film transistor at a crossing point of the gate and data lines; a lower storage electrode formed by one portion of a preceding gate line, and an upper storage electrode above the lower storage electrode having a gate insulating layer in between; a transmitting electrode in contact the upper storage electrode; and a reflective electrode in contact with the transmitting electrode in the reflective part of the pixel region wherein the transmitting electrode is in between the reflective electrode and the substrate.

16 Claims, 43 Drawing Sheets

U.S. PATENT DOCUMENTS

| | | |
|---|---|---|
| 6,888,597 B2 * | 5/2005 | Ha et al. .................. 349/114 |
| 6,927,820 B2 | 8/2005 | Jang et al. |
| 7,023,508 B2 | 4/2006 | You |
| 7,106,400 B1 | 9/2006 | Tsuda et al. |
| 7,859,620 B2 * | 12/2010 | Okamoto et al. ............ 349/114 |
| 2001/0040648 A1 | 11/2001 | Ono et al. |
| 2001/0055082 A1 * | 12/2001 | Kubo et al. .................. 349/114 |
| 2002/0050594 A1 | 5/2002 | Kim et al. |
| 2002/0093609 A1 | 7/2002 | Baek et al. |
| 2002/0109811 A1 * | 8/2002 | Park et al. ................... 349/113 |
| 2002/0113926 A1 | 8/2002 | Hanazawa et al. |
| 2002/0135716 A1 * | 9/2002 | Watanabe et al. ............ 349/113 |
| 2004/0004687 A1 | 1/2004 | Baek |
| 2004/0085498 A1 | 5/2004 | Chang |
| 2004/0125289 A1 * | 7/2004 | Nam et al. ................... 349/114 |

FOREIGN PATENT DOCUMENTS

| | | |
|---|---|---|
| JP | 11-281992 | 10/1999 |
| JP | 2000-19563 | 1/2000 |
| JP | 2000-284272 | 10/2000 |

* cited by examiner

TRANSFLECTIVE LIQUID CRYSTAL DISPLAY DEVICE AND METHOD FOR MANUFACTURING THE SAME

This application is a divisional of prior application Ser. No. 11/116,178, filed Apr. 28, 2005 now U.S. Pat. No. 7,453,537, which is a divisional of application Ser. No. 10/630,688, filed Jul. 31, 2003 now U.S. Pat. No. 6,897,925, and claims the benefit of Korean Patent Application Nos. P2002-45338, P2003-21653, and P2003-36394, filed on Jul. 31, 2002, Apr. 7, 2003, and Jun. 5, 2003, respectively, which are hereby incorporated by reference for all purposes as if fully set forth herein.

BACKGROUND OF THE INVENTION

1. Field of the Invention

The present invention relates to a liquid crystal display (LCD) device, and more particularly, a transflective type LCD device for selectively using a reflective mode and a transmitting mode, and a method for manufacturing the same.

2. Discussion of the Related Art

In general, LCD devices are classified into two types, a transmitting type LCD device and a reflective type LCD device. At this time, the transmitting type LCD device has a backlight as a light source, so that the transmitting type LCD device can produce a picture image in the dark. However, it has the problem of high power consumption. Meanwhile, the reflective type LCD device uses ambient light as a light source, so that it has lower power consumption. However, the reflective type LCD device has a limitation in that it cannot display a picture image in the dark. In order to solve these problems, a transflective type LCD device is disclosed. The transflective type LCD device can operate as a reflective type or a transmitting type as needed with the transflective LCD having both a reflective part and a transmitting part inside a unit pixel region. That is, the transflective type LCD device selectively uses ambient light or artificial light, whereby it is possible to operate the transflective type LCD device independent of the surrounding environment and to decrease power consumption.

Meanwhile, the LCD devices may have an additional storage capacitor for maintaining an electric charge across the pixel. A structure forming a capacitor between a preceding gate line and a pixel electrode is referred to as a storage-on-gate structure. The storage capacitor maintains a voltage across a liquid crystal during a turn-off mode of a corresponding thin film transistor. Accordingly, during the turn-off mode of the thin film transistor, it is possible to prevent a current from leaking, thereby preventing picture quality degradation due to flicker.

Hereinafter, a general transflective type LCD device will be described with reference to the accompanying drawings.

FIG. 1 is an exploded perspective view illustrating some parts of the general transflective type LCD device. As shown in FIG. 1, the general transflective type LCD device 11 includes an upper substrate 15, a lower substrate 21, and a liquid crystal 23 between the upper substrate 15 and the lower substrate 21. Herein, a color filter 17 having a black matrix 16 is formed on the upper substrate 15, and then a common electrode 13 is formed on the color filter. The lower substrate 21 includes a pixel region P, a pixel electrode 19 having a transmitting part A and a reflective part C in the pixel region P, a switching device T and array lines. The lower substrate 21 is referred to as a TFT array substrate, in which a plurality of gate lines 25 are formed substantially perpendicular to a plurality of data lines 27, thereby forming a plurality of thin film transistors T as the switching devices in a matrix. At this time, the pixel region P is defined by the crossing of the gate lines 25 and the data lines 27.

The operational characteristics of the aforementioned transflective type LCD device will be described with reference to FIG. 2. FIG. 2 is a cross-sectional view illustrating a general transflective type LCD device. As shown in FIG. 2, the general transflective type LCD device 11 includes an upper substrate 15 having a common electrode 13, a lower substrate 21 having a pixel electrode 19 including a transmitting electrode 19a and a reflective electrode 19b having a transmitting hole A, a liquid crystal 23 charged between the upper substrate 15 and the lower substrate 21, and a backlight 41 below the lower substrate 21. When the transflective type LCD device 11 having the aforementioned structure is used in a reflective mode, the ambient light is used as a light source.

Hereinafter, the operation of the transmitting mode or reflective mode LCD device will be described with reference to the aforementioned structure.

In the reflective mode, the LCD device uses ambient light as the light source, in which the light B is incident on the upper substrate 15 of the LCD device, and then reflected by the reflective electrode 19b. Subsequently, the light passes through the liquid crystal 23 arranged by an electric field between the reflective electrode 19b and the common electrode 13, so that a picture image is displayed by controlling the transmittance of the light B passing through the liquid crystal 23 according to the arrangement of the liquid crystal 23. Meanwhile, in the transmitting mode, the backlight 41 is used as the light source for emitting the light F. The backlight 41 is formed below the lower substrate 21, of which the light F is emitted from the backlight 41, and incident on the liquid crystal 23 through the transparent electrode 19a. Thus, a picture image is displayed by controlling the transmittance of the light from the backlight 41 through the liquid crystal 23 as arranged by an electric field between the transparent electrode 19a and the common electrode 13 below the transmitting hole.

A related art transflective type LCD device and a method for manufacturing the same will be described with reference to the accompanying drawings. In general, an LCD device includes a lower substrate of a thin film transistor array substrate, an upper substrate of a color filter substrate, and a liquid crystal between the upper substrate and the lower substrate. At this time, the lower substrate of the thin film transistor array substrate will be described in more detail.

A transflective type LCD device and a method for manufacturing the same according to a first method of the related art will be described as follows. FIG. 3 and FIG. 4 are respectively a plan view and a cross-sectional view illustrating a transflective type LCD device according to the first method of the related art. FIG. 5A to FIG. 5C are sequential plan views illustrating an enlarged pixel of an array substrate in a method for manufacturing a transflective type LCD device according to the first method of the related art. FIG. 6A to FIG. 6C are cross-sectional views taken along lines I-I', II-II' and III-III' of FIG. 5A to FIG. 5C for illustrating manufacturing process.

As shown in FIG. 3 and FIG. 4, the transflective type LCD device according to the first method of the related art includes a gate line 31, a gate electrode 31b, and a lower storage electrode 31c. The gate lines 31 are formed on a transparent substrate 30 at fixed intervals in one direction substantially parallel to one another, and each gate electrode 31b is projected from each of the gate lines 31 at one direction. Then, the lower storage electrode 31c is formed integral with the preceding gate line corresponding to a storage capacitor. After that, a gate insulating layer 32 is formed to electrically insulate the gate line 31, the gate electrode 31b, and the lower storage electrode 31c from an upper layer, and an active layer 33 is formed on the gate insulating layer 32 above the gate electrode 31b. In this state, the active layer 33 is formed of an amorphous silicon layer, and an ohmic contact layer 33a of doped amorphous silicon is formed on the active layer 33 except for a channel region.

Next, a data line 34 is formed to be substantially perpendicular to the gate line 31, thereby defining a pixel region. A source electrode 34b is projected from the data line 34 in a direction overlapping with one side of the active layer 33, and a drain electrode 34c is formed to be apart from the source electrode 34b overlapping with the other side of the active layer 33. Then, an upper storage electrode 34d is formed at the preceding gate line integral with the drain electrode 34c above the lower storage electrode 31c.

Subsequently, a first passivation layer 35 is formed on an entire surface of the substrate 30 including the drain electrode 34c and the upper storage electrode 34d. At this time, the first passivation layer 35 has first, second, and third contact holes 36a, 36b, and 36c respectively formed above the upper storage electrode 34d, gate and source pads 31a and 34a, and a transmitting hole 36d in the pixel region. Then, a reflective electrode 37 is formed in the pixel region except on a lower surface of the transmitting hole. At this time, the reflective electrode 37 is partially overlapped with the data line 34 defining the pixel region. Also, a second passivation layer 38 is formed on the entire surface of the substrate 30 except the first, second and third contact holes 36a, 36b, and 36c and the lower surface of the transmitting hole 36d. Next, a gate pad terminal 39a and a source pad terminal 39b are formed above the first and third contact holes 36a and 36c and the adjoining second passivation layer 38, and a transmitting electrode 39c is formed in the pixel region having the transmitting hole 36d for being in contact with the upper storage electrode 34d through the second contact hole 36b. In the pixel region, the transmitting electrode 39c is in contact with the upper storage electrode 34d through the second contact hole 36b, and a pixel electrode is formed of the reflective electrode 37 and the transmitting electrode 39c.

In the method for forming the transflective type LCD device according to the first method of the related art, referring to FIG. 5A and FIG. 6A, a conductive metal material such as aluminum Al, molybdenum Mo, tungsten W or conductive alloy is deposited on the transparent substrate 30, and then patterned to form the gate pad 31a having a predetermined area at an end thereof, the gate line 31 extended from the gate pad 31a in one direction, and the gate electrode 31b projected from the gate line 31 to have a predetermined area. When forming the gate line 31, the lower storage electrode 31c is formed in the storage capacitor region of the gate line. Next, an insulating material such as silicon dioxide $SiO_2$ or silicon nitride SiNx is formed on the entire surface of the substrate 30. Also, the amorphous silicon layer having amorphous silicon a-Si and impurity is deposited to form the gate insulating layer 32 and a semiconductor layer (amorphous silicon and doped amorphous silicon). After that, the semiconductor layer is patterned to form the active layer 33 with an island-shape above the gate electrode 31b.

Subsequently, a conductive metal material such as molybdenum Mo, tungsten W or chrome Cr is deposited on the entire surface of the substrate 31 having the active layer 33, and then a patterning process is performed thereon. According to the patterning process, the data line 34 is formed substantially perpendicular to the gate line to have the gate insulating layer 32 in between, the source pad 34a is formed at one end of the data line 34, and the source electrode 34b projected to the upper side of the gate electrode 31b is formed overlapping with one side of the active layer 33. When forming the data line 34, the drain electrode 34c apart from the source electrode 34b is formed overlapping with the other side of the active layer 33, and the upper storage electrode 34d is formed as integral with the drain electrode 34c above the lower storage electrode 31 of the preceding gate line. Also, the doped amorphous silicon of the channel region is etched by using the source electrode 34b and the drain electrode 34c as masks, whereby the ohmic contact layer 33a is formed on the active layer 33.

As shown in FIG. 5B and FIG. 6B, an organic insulating material such as benzocyclobuten BCB or photoacrylic resin is formed on the entire surface of the substrate including the upper storage electrode 34d, thereby forming the first passivation layer 35. After patterning the first passivation layer 35, the transmitting hole 36d is formed in the pixel region. Then, a reflective metal having low resistance and great reflectivity is deposited on the first passivation layer 35 including the transmitting hole 36d, and patterned to form the reflective electrode 37. Subsequently, a silicon nitride layer SiNx is deposited on the substrate 30 including the reflective electrode 37 to form the second passivation layer 38. By etching the second passivation layer 38, the reflective electrode 37, and the gate insulating layer 31c, the first, second, and third contact holes 36a, 36b and 36c are respectively formed above the upper storage electrode 34d, the gate pad 31a, and the source pad 34a. At this time, the portion of the substrate 30 corresponding to the transmitting hole 36d is exposed.

Referring to FIG. 5C and FIG. 6C, a transparent conductive metal such as Indium-Tin-Oxide ITO or Indium-Zinc-Oxide IZO is formed on the entire surface of the substrate 30 including the source electrode 34b and the drain electrode 34c, and then a patterning process is performed thereto. As a result, the transmitting electrode 39c is formed in the pixel region in direct contact with the upper storage electrode 34d at the preceding gate line. When forming the reflective electrode 37, the gate pad terminal 39a is formed on the contact hole of the gate pad 31a and the adjoining second passivation layer 38 in contact with the gate pad 31a, and the source pad terminal 39b is formed on the contact hole of the source pad 34a and the adjoining second passivation layer 38 in contact with the source pad 34a. At this time, the reflective electrode 37 is partially overlapped with the data line 34 defining the pixel region.

A transflective type LCD device according to a second method of the related art and a method for manufacturing the same will be described as follows. FIG. 7 and FIG. 8 are respectively a plan view and a cross-sectional view illustrating a transflective type LCD device according to the second method of the related art. FIG. 9A to FIG. 9C are sequential plan views illustrating an enlarged pixel of an array substrate in a method for manufacturing a transflective type LCD device according to the second method of the related art. FIG. 10A to FIG. 10C are cross-sectional views taken along lines IV-IV', V-V' and VI-VI' of FIG. 9A to FIG. 9C for illustrating the manufacturing process.

Referring to FIG. 7 and FIG. 8, the transflective type LCD device according to the second method of the related art has the same structure as the transflective type LCD device according to the first method of the related art except that a second passivation layer 55b (circle portions in FIG. 7) having projections is formed on a first passivation layer 55a of a reflective part (pixel region except a transmitting hole 56d), and a reflective electrode 57 has an uneven surface on the second passivation layer 55b. In the method for forming the transflective type LCD device according to the second method of the related art, referring to FIG. 10B and FIG. 10C, the second passivation layer 55b is deposited on a first passivation layer 55a, and then an exposure and developing process is performed thereto to form projection patterns in the second passivation layer 55b corresponding to a reflective part.

However, the transflective type LCD devices according to the first and second methods of the related art have the following disadvantages. In the methods for forming the transflective type LCD device according to the first and second methods of the related art, it is necessary to form the contact hole in the upper storage electrode formed integral with the drain electrode for connecting the pixel region to the drain electrode, such that the aperture ratio is decreased in the reflective part forming the contact hole. Also, in the transflective type LCD device according to the second method of the related art, it is hard to form the projection patterns corresponding to the number of the contact hole regions in the upper storage electrode, whereby the aperture ratio of the reflective part becomes lower than that according to the first method of the related art.

SUMMARY OF THE INVENTION

Accordingly, the present invention is directed to a transflective type LCD device and a method for manufacturing the same that substantially obviates one or more problems due to limitations and disadvantages of the related art.

An advantage of the present invention is to provide a transflective type LCD device for improving an aperture ratio of a reflective part.

Another advantage of the present invention is to provide a method for manufacturing a transflective type LCD device for simplifying manufacturing process by decreasing the number of masks for forming contact holes.

Another advantage of the present invention is to provide a transflective type LCD device and a method for manufacturing the same for preventing a channel region of a thin film transistor from being damaged.

Another advantage of the present invention is to provide a transflective type LCD device and a method for manufacturing the same for improving reliability when etching a reflective electrode at gate and source pads.

Another advantage of the present invention is to provide a transflective type LCD device and a method for manufacturing the same for improving reflectivity by forming a reflective electrode on a transmitting electrode.

Another advantage of the present invention is to provide a transflective type LCD device and a method for manufacturing the same for preventing a photoacrylic projection pattern from deteriorating.

Additional features and advantages of the invention will be set forth in the description which follows, and in part will be apparent from the description, or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, a transflective type LCD device having a pixel region with a reflective part and a transmitting part includes: a plurality of gate and data lines crossing each other on a substrate defining a plurality of pixel regions; a thin film transistor having a drain electrode at a crossing point of the gate and data lines; a lower storage electrode formed by a portion of a preceding gate line and an upper storage electrode above the lower storage electrode having a gate insulating layer in between wherein the upper storage electrode contacts the drain electrode; a transmitting electrode in contact the upper storage electrode; and a reflective electrode in contact with the transmitting electrode in the reflective part of the pixel region wherein the transmitting electrode is in between the reflective electrode and the substrate.

In another aspect of the present invention, a transflective type LCD device having a pixel region with a reflective part and a transmitting part includes: a plurality of gate and data lines crossing each other on a substrate defining a plurality of pixel regions; a thin film transistor having a drain electrode at a crossing point of the gate and data lines; an upper storage electrode of a storage capacitor at a preceding gate line integral with a drain electrode of the thin film transistor; a transmitting electrode in the pixel region in contact with the upper storage electrode; a passivation layer including a first transmitting hole with an inclination exposing a predetermined portion of the transmitting electrode; and a reflective electrode on the inclination of the passivation layer and bottom corners of the first transmitting hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to embodiments of the present invention, example of which is illustrated in the accompanying drawings. Wherever possible, the same reference numbers will be used throughout the drawings to refer to the same or like parts.

A transflective type LCD device according to the preferred embodiments of the present invention will be described with reference to the accompanying drawings. In general, an LCD device includes a lower substrate of a thin film transistor array substrate, and an upper substrate of a color filter substrate, and a liquid crystal layer between the lower and upper substrates. Hereinafter, the thin film array substrate of the lower substrate will be described as follows.

Figure 11:
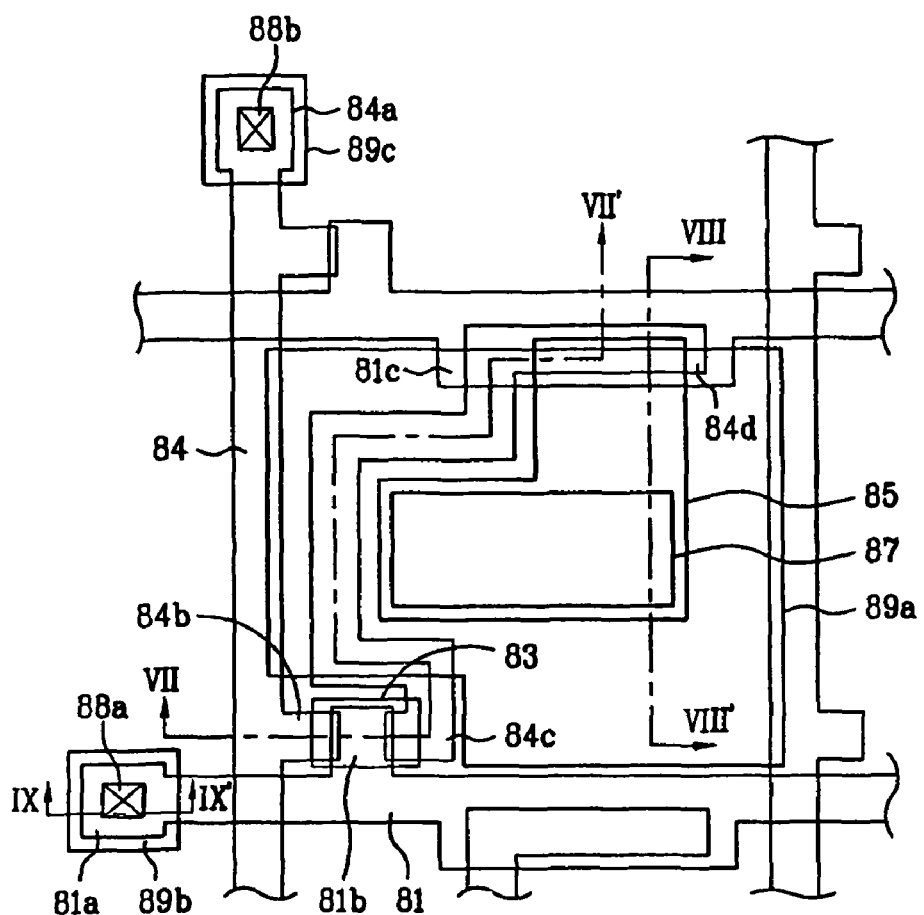
FIG. 11 and FIG. 12 are respectively a plan view and a cross-sectional view illustrating a transflective type LCD device according to the first embodiment of the present invention.
Figure 12:
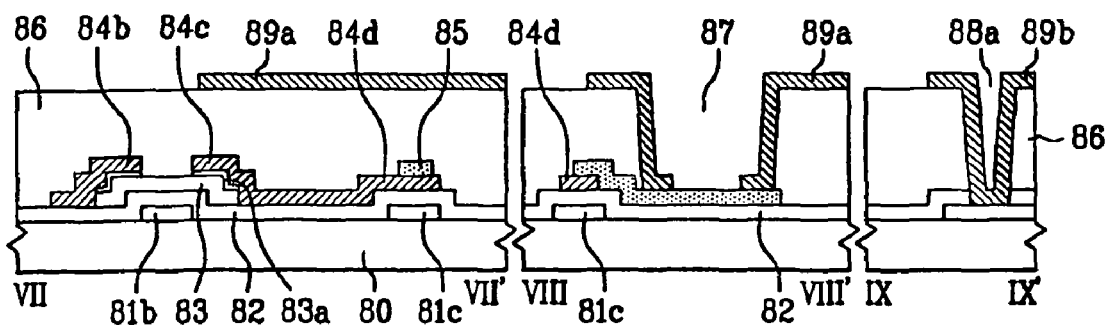
Figure 13A:
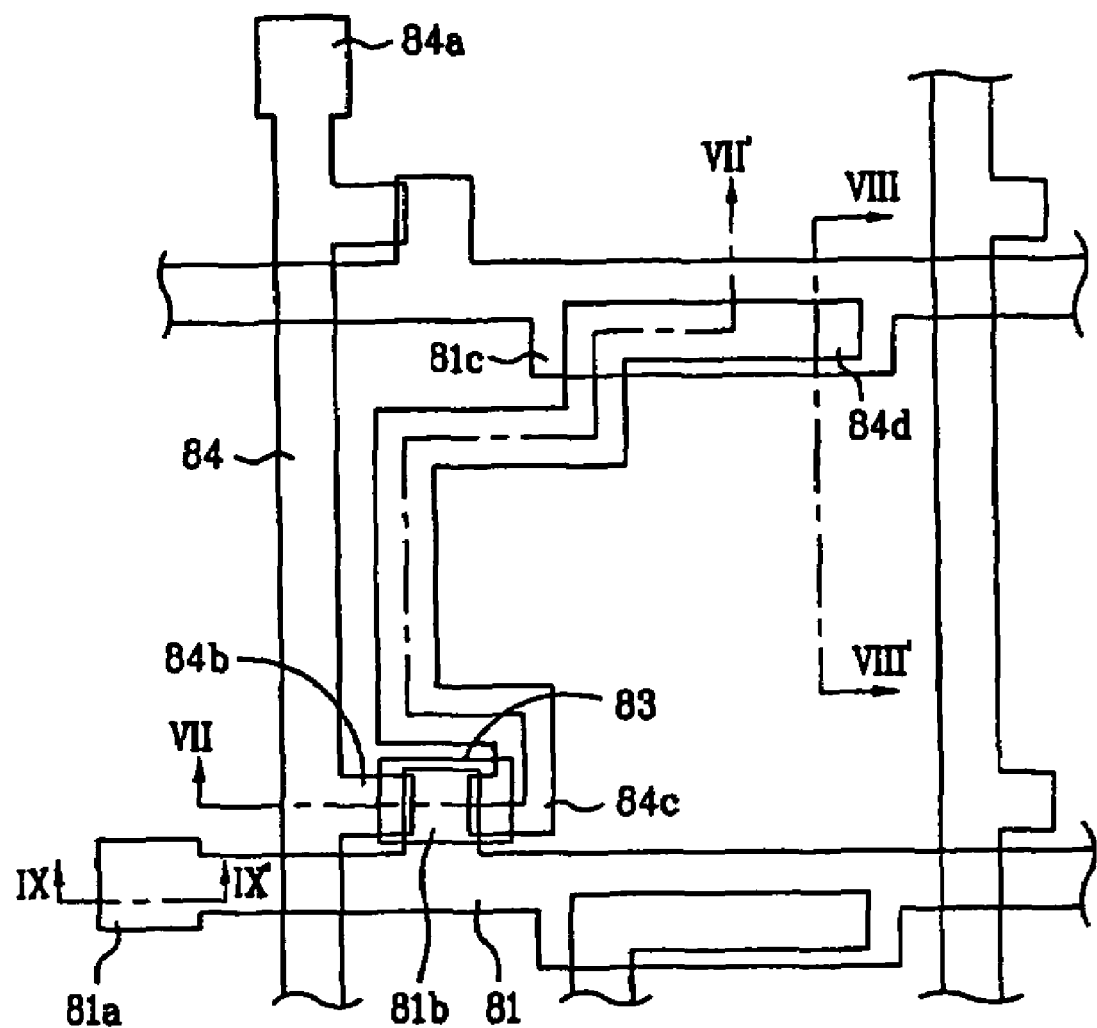
FIG. 13A to FIG. 13C are sequential plan views illustrating an enlarged pixel of an array substrate in a method for manufacturing a transflective type LCD device according to the first embodiment of the present invention.
Figure 13B:
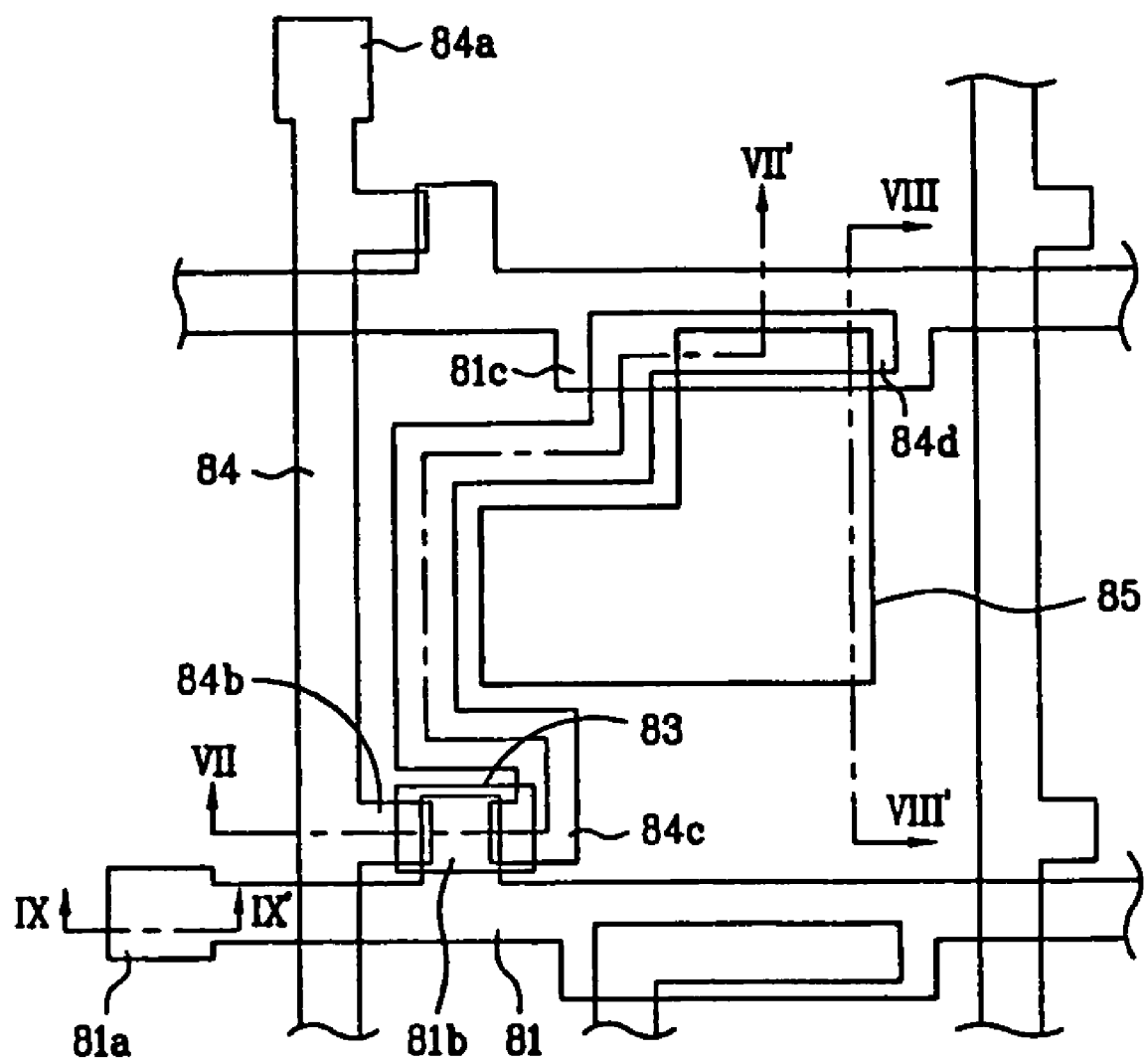
Figure 13C:
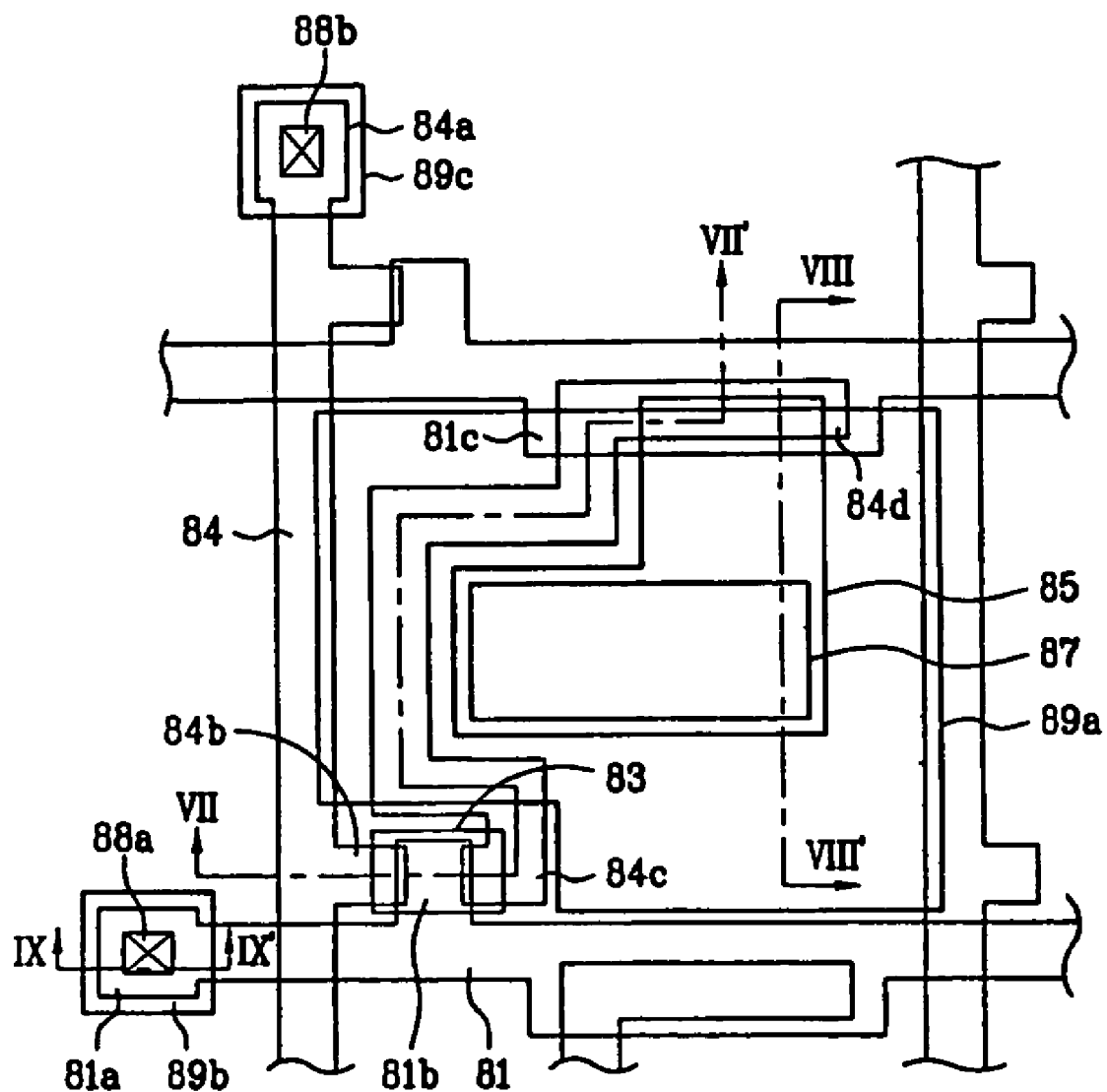
Figure 14A:
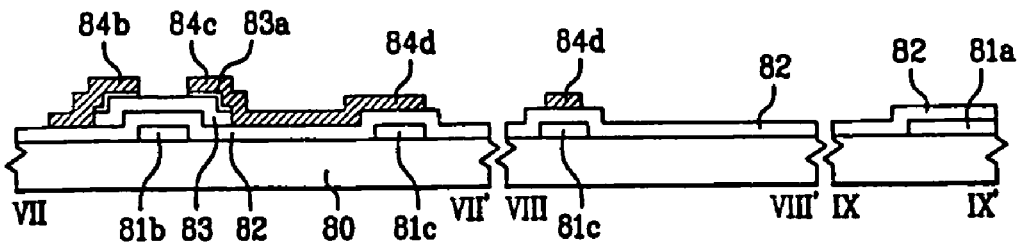
FIG. 14A to FIG. 14C are cross-sectional views taken along lines VII-VII', VIII-VIII' and IX-IX' of FIG. 13A to FIG. 13C for illustrating the manufacturing process.
Figure 14B:
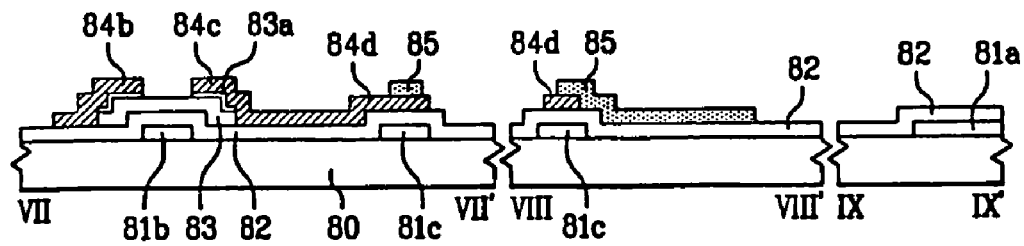
Figure 14C:
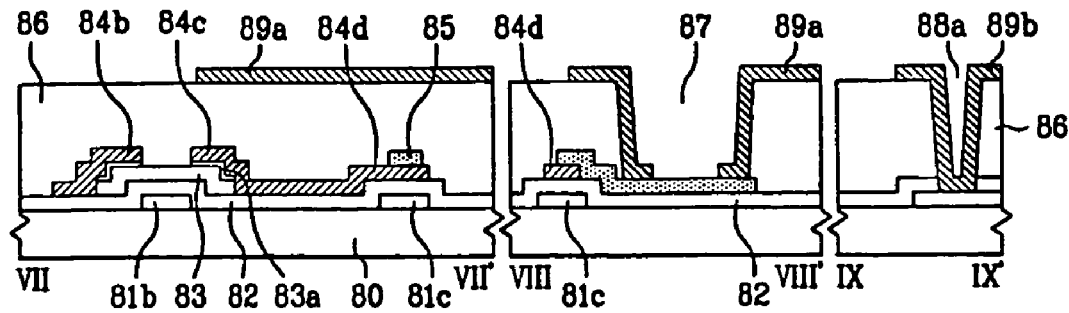

FIG. 11 and FIG. 12 are respectively a plan view and a cross-sectional view illustrating a transflective type LCD device according to a first embodiment of the present invention. FIG. 13A to FIG. 13C are sequential plan views illustrating an enlarged pixel of an array substrate in a method for manufacturing a transflective type LCD device according to the first embodiment of the present invention. FIG. 14A to FIG. 14C are cross-sectional views taken along lines VII-VII', VIII-VIII' and IX-IX' of FIG. 13A to FIG. 13C for illustrating the manufacturing process. The line VII-VII' is a cross-sectional line of a thin film transistor and a storage capacitor, the line VIII-VIII' is a cross-sectional line of a storage capacitor and a transmitting hole, and the line IX-IX' is a cross-sectional line of a gate pad.

As shown in FIG. 11 and FIG. 12, and the transflective type LCD device according to the first embodiment of the present invention includes a gate line 81, a data line 84, a pixel region, a thin film transistor and a storage capacitor. At this time, a gate pad 81a is formed at one end of the gate line 81, and a source pad 84a is formed at one end of the data line 84. Also, the gate line 81 and the data line 84 are formed substantially perpendicular to each other, thereby defining the pixel region. The pixel region includes a transmitting part and a reflective part. In the pixel region, a transmitting electrode 85 is in direct contact with an upper storage electrode 84d, and a reflective electrode 89a is formed in the reflective area of the pixel to have a second transmitting hole 87 in the transmitting electrode 85.

The thin film transistor is formed at a crossing point of the gate line 81 and the data line 84, and includes a gate electrode 81b projecting from the gate line 81 in a predetermined direction, a source electrode 84b extending from the data line 84 above the gate electrode 81b, and a drain electrode 84c being separated from the source electrode 84b at a predetermined interval. Also, the storage capacitor includes a lower storage electrode 81c connected to the preceding gate line at a predetermined portion, a gate insulating layer 82 for electrically insulating the gate electrode 81b and the lower storage electrode 81c from an upper layer, and an upper storage electrode 84d extended from the drain electrode 84c as one body.

More specifically, the aforementioned transflective type LCD device according to the present invention will be described as follows.

As shown in FIG. 11 and FIG. 12, the gate lines 81 are formed on a transparent substrate 80 at fixed intervals in one direction substantially in parallel to one another, and then the gate electrode 81b projects from each of the gate lines 81. Then, the lower storage electrode 81c is formed integral with the preceding gate line 81 corresponding to the storage capacitor. Also, the gate pad 81a is formed at one end of the gate line 81, and the source pad 84a is formed at one end of the data line 84. Then, the gate insulating layer 82 is formed on the transparent substrate 80 for electrically insulating the gate line 81, the gate electrode 81b and the lower storage electrode 81c from the upper layer. Subsequently, an active layer 83 is formed on the gate insulating layer 82 above the gate electrode 81b. In this case, the active layer 83 is formed of an amorphous silicon layer, and an ohmic contact layer 83a of a doped amorphous silicon layer is formed on the active layer 83 except in a channel region above the gate electrode 81b.

After that, the data line 84 is formed substantially perpendicular with the gate line 81 to define the pixel region, and the source electrode 84b projects from the data line 84 in one direction overlapping with one side of the active layer 83. Also, the drain electrode 84c is separated from the source electrode 84b overlapping with the other side of the active layer 83. Next, the upper storage electrode 84d extends above the lower storage electrode 81c at the preceding gate line formed integral with the drain electrode 84c. The transmitting electrode 85 is formed in the pixel region overlapping the upper storage electrode 84d, whereby the transmitting electrode 85 is in direct contact with the upper storage electrode 84d. Although not shown, the transmitting electrode 85 may be connected to the expanded drain electrode 84c of the thin film transistor. At this time, the transmitting electrode 85 may be wider than the second transmitting hole 87.

Subsequently, a passivation layer 86 is formed on an entire surface of the transparent substrate 80 including the thin film transistor and the pixel region, and a transmitting hole and first and second contact holes 88a and 88b are formed in the passivation larger 86 above the transmitting electrode 85 of the pixel region, the gate pad 81a and the source pad 84a. The transmitting holes include first and second transmitting holes, in which the first transmitting hole is a contact hole having an inclination by the passivation layer 86, and the second transmitting hole 87 is an area exposing the transmitting electrode 85 by the reflective electrode 89a. Thus, the first transmitting hole is wider than the second transmitting hole. Also, the reflective electrode 89a is formed in the reflective part of the pixel in contact with the sidewall of the first transmitting hole and the transmitting electrode 85 at the bottom of the first transmitting hole extended from the sidewall. The reflective electrode 89a is formed overlapping with the data line 84 defining the pixel region. That is, a pixel electrode is formed of the reflective electrode 89a and the transmitting electrode 85. In the aforementioned structure, the transmitting electrode 85 is in direct contact with the upper storage electrode 84d, so that it is not required to connect the upper storage electrode 84d to the transmitting electrode 85, thereby simplifying the manufacturing process. Also, the reflective electrode 89a is formed on a predetermined portion of the passivation layer 86, the sidewall of the first transmitting hole, and a predetermined portion at the bottom of the extended first transmitting hole, thereby improving reflectivity.

A method for manufacturing the transflective type LCD device having the aforementioned structure will be described with reference to FIG. 13A to FIG. 13C and FIG. 14a to FIG. 14C.

As shown in FIG. 13A and FIG. 14A, a conductive metal such as aluminum Al, molybdenum Mo, tungsten W or any conductive alloy is deposited on the transparent substrate 80, and then patterned to form the gate pad 81a, the gate line 81 extending from the gate pad 81a in one direction, and the gate electrode 81b projecting at one side from the gate line 81. Then, the lower storage electrode 81c is formed in the storage capacitor region of the preceding gate line when forming the gate line 81. After that, an insulating material such as silicon dioxide $SiO_2$ or silicon nitride $SiN_x$ is deposited on the entire surface of the transparent substrate 80 including the gate line 81, and sequentially, the amorphous silicon layer having amorphous silicon (a-Si) and impurity is deposited, thereby forming the gate insulating layer 82 and a semiconductor layer (amorphous silicon layer and doped amorphous silicon layer). Then, the semiconductor layer is patterned to form an island-shaped semiconductor pattern above the gate electrode 81b.

Next, a conductive metal material such as molybdenum Mo, tungsten W or chrome Cr is deposited on the entire surface of the transparent substrate 80 having the semiconductor pattern, and then a patterning process is performed thereto. Through the patterning process, the data line 84 is formed substantially perpendicular with the gate line having the gate insulating layer 82 in between, and the source pad 84a is formed at one end of the data line 84. Also, the source electrode 84b overlaps with one side of the semiconductor pattern above the gate electrode 81b. When forming the data line 84, the drain electrode 84c is formed overlapping with the other side of the semiconductor pattern at a predetermined interval with the source electrode 84b. The upper storage electrode 84d is formed above the lower storage electrode 81c at the preceding gate line connected integrally to the drain electrode 84c. After that, the doped amorphous silicon layer of the semiconductor layer is etched by using the source electrode 84b and the drain electrode 84c as masks. As a result, the active layer 83' of the amorphous silicon layer is formed, and the ohmic contact layer 83a of the doped amorphous silicon layer is formed on the active layer 83 except the channel region.

Referring to FIG. 13B and FIG. 14B, one of transparent conductive metals such as Indium-Tin-Oxide ITO and Indium-Zinc-Oxide IZO is deposited on the entire surface of the transparent substrate 80 having the source electrode 84b and the drain electrode 84c, and then a wet-etch process is performed thereto, thereby forming the transmitting electrode 85 being in direct contact with the upper storage electrode 84d at the preceding gate line. At this time, the transmitting electrode 85 is wider than the second transmitting hole (87 of FIG. 13C and FIG. 14C).

As shown in FIG. 13C and FIG. 14C, any one organic insulating material such as BenzocycloButen BCB or photoacrylic resin is deposited on the entire surface of the transparent substrate 80, thereby forming the passivation layer 86. The passivation layer 86 is formed of an insulating layer having a low dielectric constant at a predetermined thickness, so that it is possible to prevent a parasitic capacitance by overlapping structure of the reflective electrode and the respective lines. Then, a photo process is performed thereto, thereby forming the first transmitting hole exposing the predetermined portion of the transmitting electrode 85 of the pixel region, simultaneously, forming the first and second contact holes 88a and 88b (FIG. 13C) above the gate pad 81a and the source pad 84a.

Next, a reflective metal material having low resistance value and great reflectivity such as aluminum Al, aluminum alloy or silver Ag is deposited on the entire surface of the transparent substrate 80 having the passivation layer 86, and then a patterning process is performed thereto. As a result, the transmitting electrode 85 is exposed, and the reflective electrode 89a is formed in the reflective part of the pixel region in contact with the sidewall of the first transmitting hole and the transmitting electrode 85 at the bottom of the extended first transmitting hole. Preferably, the reflective electrode 89a is formed as a dual-layered structure (for example, Mo—Al and Mo—AlNd) in that it is possible to decrease the contact resistance to the transparent electrode ITO by connecting Mo to the transparent electrode, and to prevent Galvanic corrosion according to direct contact between Al/AlNd and ITO. At this time, Mo has the low resistance value, and Al/AlNd has great reflectivity.

When forming the reflective electrode 89a, a gate pad terminal 89b is formed in contact with the contact hole on the gate pad 81a, and the gate pad 81a on the adjoining passivation layer 86. Also, a source pad terminal 89c is formed in contact with the contact hole on the source pad 84a, and the source pad 84a on the adjoining passivation layer 86. The reflective electrode 89a partially overlaps with the data line 84 defining the pixel region.

When manufacturing the transflective type LCD device according to the aforementioned process, it is not required to perform an additional contact process between the drain electrode 84c and the transmitting electrode 85 and between the upper storage electrode 84d and the transmitting electrode 85, thereby simplifying manufacturing process. Also, the reflective electrode 89a is formed in contact with the sidewall of the inclination of the first transmitting hole, and the transmitting electrode 85 at the bottom of the extended first transmitting hole, thereby improving aperture ratio of the reflective part.

Figure 15:
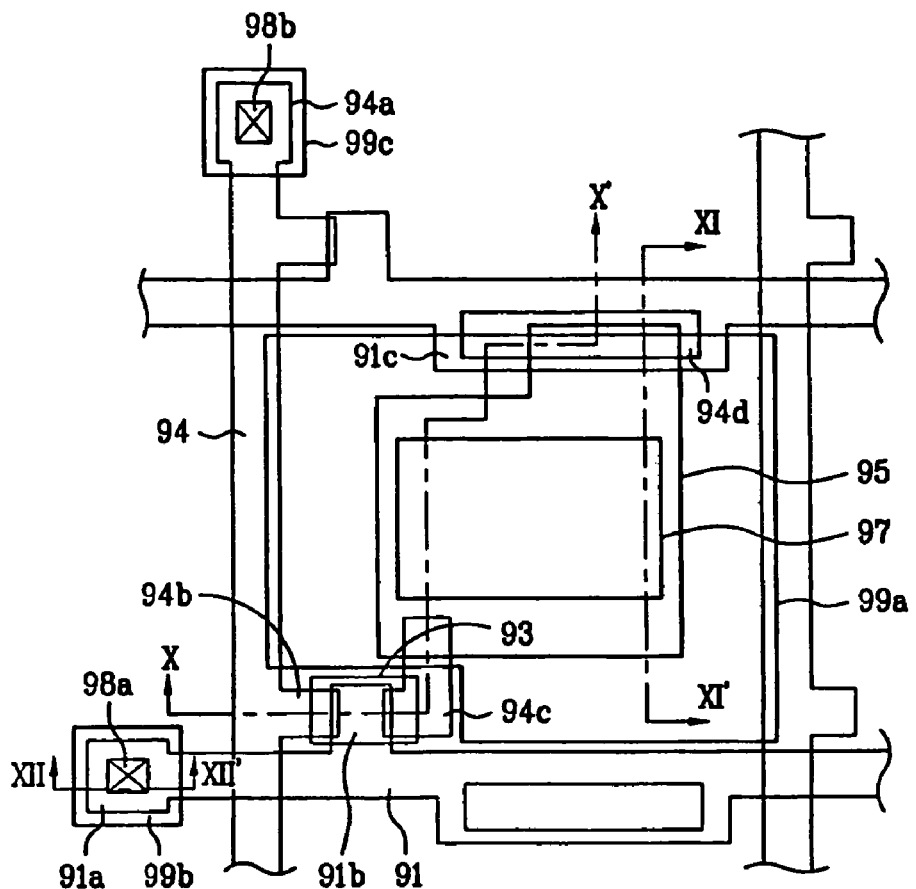
FIG. 15 and FIG. 16 are respectively a plan view and a cross-sectional view illustrating a transflective type LCD device according to the second embodiment of the present invention.
Figure 16:
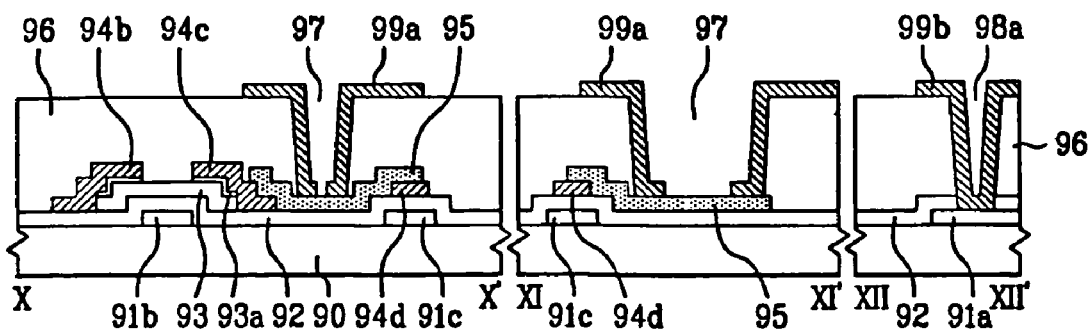
Figure 17A:
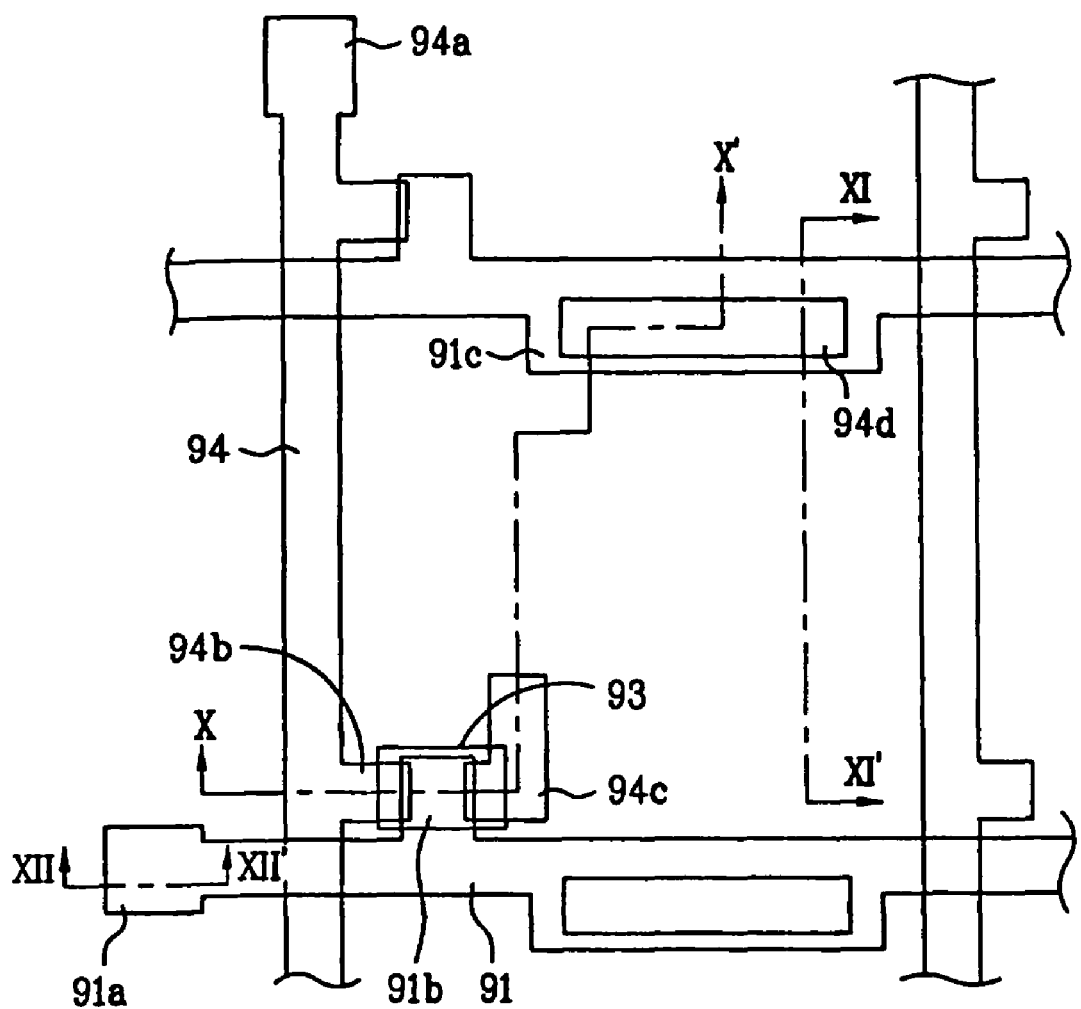
FIG. 17A to FIG. 17C are sequential plan views illustrating an enlarged pixel of an array substrate in a method for manufacturing a transflective type LCD device according to the second embodiment of the present invention.
Figure 17B:
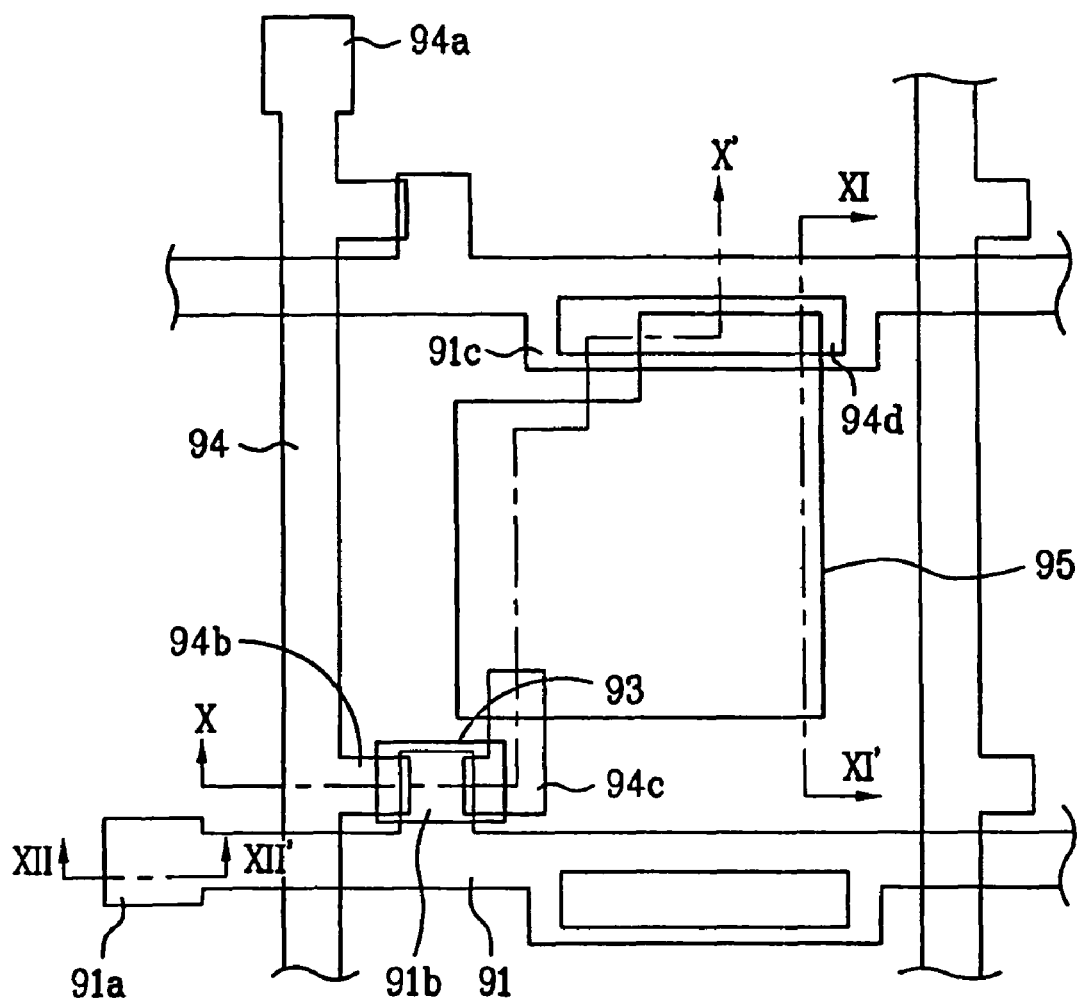
Figure 17C:
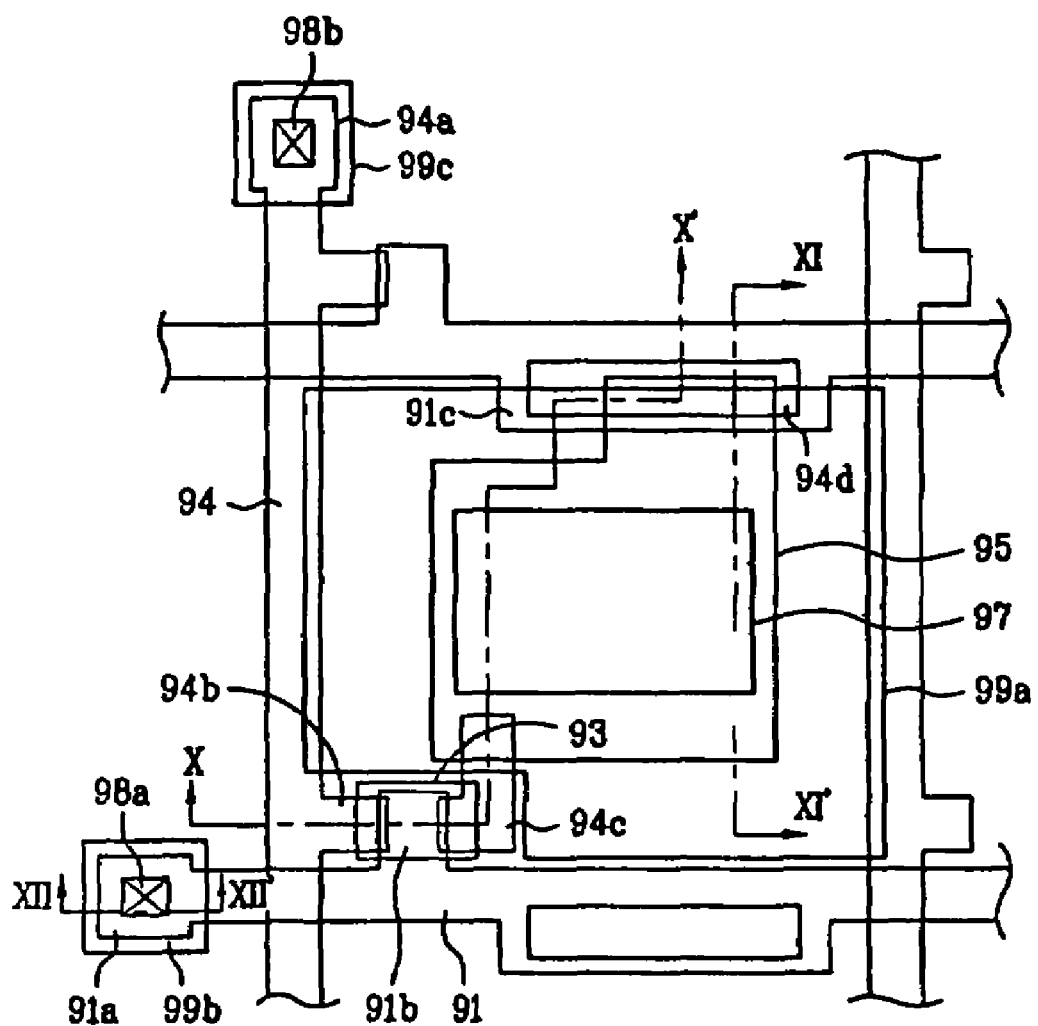
Figure 18A:
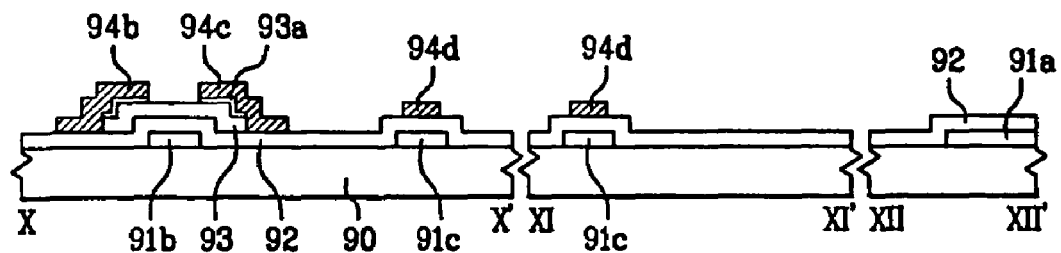
FIG. 18A to FIG. 18C are cross-sectional views taken along lines X-X', XI-XI' and XII-XII' of FIG. 17A to FIG. 17C for illustrating the manufacturing process.
Figure 18B:
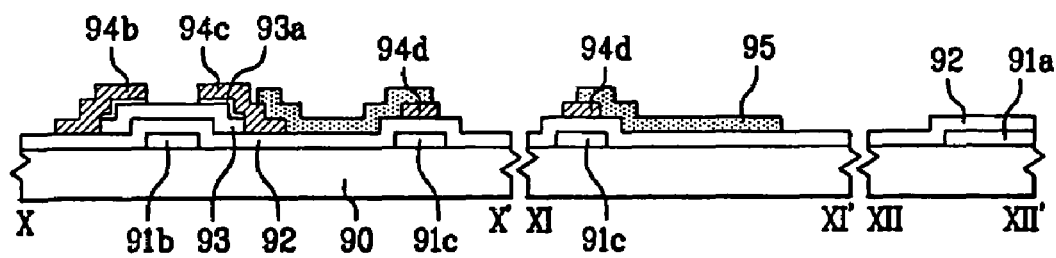
Figure 18C:
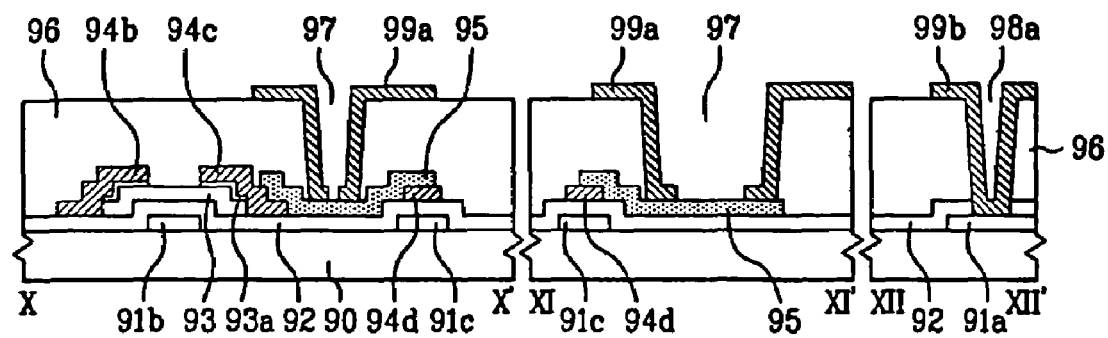

FIG. 15 and FIG. 16 are respectively a plan view and a cross-sectional view illustrating a transflective type LCD device according to a second embodiment of the present invention. FIG. 17A to FIG. 17C are sequential plan views illustrating an enlarged pixel of an array substrate in a method for manufacturing a transflective type LCD device according to the second embodiment of the present invention. FIG. 18A to FIG. 18C are cross-sectional views taken along lines X-X', XI-XI' and XII-XII' of FIG. 17A to FIG. 17C for illustrating the manufacturing process. At this time, the line X-X' is a cross-sectional line of a thin film transistor and a storage capacitor, the line XI-XI' is a cross-sectional line of a storage capacitor and a transmitting hole, and the line XII-XII' is a cross-sectional line of a gate pad.

Referring to FIG. 15 and FIG. 16, and the transflective type LCD device according to the second embodiment of the present invention includes a gate line 91, a data line 94, a pixel region, a thin film transistor and a storage capacitor. A gate pad 91a is formed at one end of the gate line 91, and a source pad 94a is formed at one end of the data line 94. Also, the gate line 91 and the data line 94 are formed substantially perpendicular to each other, thereby defining the pixel region. The pixel region includes a transmitting part and a reflective part. In the pixel region, a transmitting electrode 95 is in direct contact with a drain electrode 94c and an upper storage electrode 94d, and a reflective electrode 99a is formed in the reflective part to have a second transmitting hole 97 on the transmitting electrode 95. The transmitting electrode 95 is in contact with the drain electrode 94c and the upper storage electrode 94d at the same time.

The thin film transistor is formed at a crossing point of the gate line 91 and the data line 94, and includes a gate electrode 91b projecting from the gate line 91 in one direction, a source electrode 94b extending from the data line 94 to the upper side of the gate electrode 91b, and a drain electrode 94c separated from the source electrode 94b at a predetermined interval. Also, the storage capacitor includes a lower storage electrode 91c connected to the preceding gate line at a predetermined portion, and an upper storage electrode 94d above the lower storage electrode 91c has a gate insulating layer 92 in between.

More specifically, the aforementioned transflective type LCD device according to the present invention will be described as follows.

As shown in FIG. 15 and FIG. 16, the gate lines 91 are formed on a transparent substrate 90 at fixed intervals in one direction substantially parallel to one another, and the gate electrode 91b projects from each of the gate lines 91. Then, the lower storage electrode 91c is formed integral with the preceding gate line 91 corresponding to the storage capacitor. Also, the gate insulating layer 92 is formed to electrically insulating the gate line 91, the gate electrode 91b and the lower storage electrode 91c from an upper layer. Subsequently, an active layer 93 is formed on the gate insulating layer 92 above the gate electrode 91b. In this case, the active layer 93 is formed of an amorphous silicon layer, and an ohmic contact layer 93a of a doped amorphous silicon layer is formed on the active layer 93 above the gate electrode 91b except in a channel region. After that, the data line 94 is formed substantially perpendicular with the gate line 91 to define the pixel region, and the source electrode 94b projects from the data line 94 in one direction overlapping with one side of the active layer 93. Also, the drain electrode 94c is separated from the source electrode 94b that overlaps with the other side of the active layer 93. The upper storage electrode 94d extends above the lower storage electrode 91c at the preceding gate line separate from the drain electrode 94c. In the pixel region, the transmitting electrode 95 is formed overlapping with the upper storage electrode 94d and the drain electrode 94c, whereby the transmitting electrode 95 is in direct contact with the upper storage electrode 94d and the drain electrode 94c. At this time, the aforementioned transmitting electrode 95 is wider than the second transmitting hole 97.

Subsequently, a passivation layer 96 is formed on the entire surface of the transparent substrate 90 including the thin film transistor and the pixel region to have the first transmitting hole and first and second contact holes 98a and 98b above the transmitting electrode 95 of the pixel region, the gate pad 91a and the source pad 94a. The transmitting holes include first and second transmitting holes, in which the first transmitting hole is a contact hole having an inclination by the passivation layer 96, and the second transmitting hole is an area exposing the transmitting electrode 95 by the reflective electrode 99a. Thus, the first transmitting hole is wider than the second transmitting hole. Also, the reflective electrode 99a is formed in the reflective part in contact with the inclination of the first transmitting hole and the transmitting electrode 95 at the bottom of the extended first transmitting hole. The reflective electrode 99a is formed overlapping with the data line 94 defining the pixel region. Thus, a pixel electrode is formed of the reflective electrode 99a and the transmitting electrode 95.

In the aforementioned structure, the transmitting electrode 95 is in direct contact with the upper storage electrode 94d and the drain electrode 94c, so that it is not required to perform a process for connecting the upper storage electrode 94d to the transmitting electrode 95, and connecting the drain electrode 94c to the transmitting electrode 95, thereby simplifying manufacturing process. Also, the reflective electrode 99a is formed on a predetermined portion of the passivation layer 96, the inclination of the first transmitting hole, and the bottom of the first transmitting hole extended from the inclination, thereby improving reflectivity.

A method for manufacturing the transflective type LCD device having the aforementioned structure will be described with reference to FIG. 17A to FIG. 17C and FIG. 18a to FIG. 18C.

As shown in FIG. 17A and FIG. 18A, a conductive metal such as aluminum Al, molybdenum Mo, tungsten W, and any other conductive alloy is deposited on the transparent substrate 90, and then patterned to form the gate pad 91a to have a predetermined area at the gate line 91 extending from the gate pad 91a in one direction, and the gate electrode 91b projecting from the gate line 91 at one side. The lower storage electrode 91c is formed in the storage capacitor region of the preceding gate line when forming the gate line 91. After that, an insulating material such as silicon dioxide $SiO_2$ or silicon nitride SiNx is deposited on the entire surface of the transparent substrate 90 including the gate line 91, and sequentially, the amorphous silicon layer having amorphous silicon (a-Si) and impurity is deposited to form a first insulating layer and a semiconductor layer (amorphous silicon layer and doped amorphous silicon layer). Then, the semiconductor layer is patterned to form an island-shaped semiconductor pattern above the gate electrode 91b.

Next, a conductive metal material such as molybdenum Mo, tungsten W or chrome Cr is deposited on the entire surface of the transparent substrate 90 having the semiconductor pattern, and then a patterning process is performed thereto. Through the patterning process, the data line 94 is formed substantially perpendicular to the gate line having the first insulating layer in between, and the source pad 94a is formed at one end of the data line 94. Also, the source electrode 94b is formed overlapping one side of the semiconductor pattern above the gate electrode 91b. When forming the data line 94, the drain electrode 94c is formed overlapping the other side of the semiconductor pattern at a predetermined interval with the source electrode 94b. The upper storage electrode 94d is formed above the lower storage electrode 91c at the preceding gate line separated from the drain electrode 94c. Next, the doped amorphous silicon layer is etched by using the source electrode 94b and the drain electrode 94c as masks. As a result, the active layer 93 of the amorphous silicon layer is formed, and the ohmic contact layer 93a of the doped amorphous silicon layer is formed on the active layer 93 except in the channel region.

As shown in FIG. 17B and FIG. 18B, one of transparent conductive metals such as Indium-Tin-Oxide ITO and Indium-Zinc-Oxide IZO is deposited on the entire surface of the transparent substrate 90 having the source electrode 94b and the drain electrode 94c, and then a wet-etch process is performed thereto, thereby forming the transmitting electrode 95 being in direct contact with the drain electrode 94c and the upper storage electrode 94d at the preceding gate line. The transmitting electrode 95 is wider than the second transmitting hole (FIG. 17C and FIG. 18C).

Referring to FIG. 17C and FIG. 18C, any one organic insulating material such as BenzocycloButen BCB or photoacryl resin is deposited on the entire surface of the transparent substrate 90 to form the passivation layer 96. The passivation layer 96 is formed of an insulating material having a low dielectric constant at a predetermined thickness, so that it is possible to prevent a parasitic capacitance due to the overlapping structure of the reflective electrode and the respective lines. Next, a photo process is performed thereto, thereby forming the transmitting hole 97 exposing the predetermined portion of the transmitting electrode 95, and simultaneously, forming the first and second contact holes 98a and 98b (not shown) above the gate pad 91a and the source pad 94a.

A reflective metal material having a low resistance value and great reflectivity such as aluminum Al, aluminum alloy or silver Ag is deposited on the entire surface of the transparent substrate 90 having the passivation layer 96, and then a patterning process is performed thereto. As a result, the transmitting electrode 95 is exposed, and the reflective electrode 99a is formed in the reflective part of the pixel region in contact with the transmitting electrode 95 at both corners of the transmitting hole 97. Preferably, the reflective electrode 99a is formed as a dual-layered structure (for example, Mo—Al and Mo—AlNd) in that it is possible to decrease a contact resistance to the transparent electrode ITO by connecting Mo to the transparent electrode and to prevent Galvanic corrosion according to direct contact between Al/AlNd and ITO.

When forming the reflective electrode 99a, a gate pad terminal 99b is formed in contact with the contact hole on the gate pad 91a, and the gate pad 91a on the adjoining passivation layer 96. Also, a source pad terminal 99c is formed in contact with the contact hole on the source pad 94a and the source pad 94a on the adjoining passivation layer 96. The reflective electrode 99a partially overlaps the data line 94 defining the pixel region.

When manufacturing the transflective type LCD device according to the aforementioned process, it is not required to perform an additional contact process between the drain electrode 94c and the transmitting electrode 95, and between the upper storage electrode 94d and the transmitting electrode 95, thereby simplifying the manufacturing process. Also, the reflective electrode 99a is formed in contact with the sidewall of the inclination of the first transmitting hole, and the transmitting electrode 95 at the bottom of the extended first transmitting hole, thereby improving aperture ratio of the reflective part.

Figure 19:
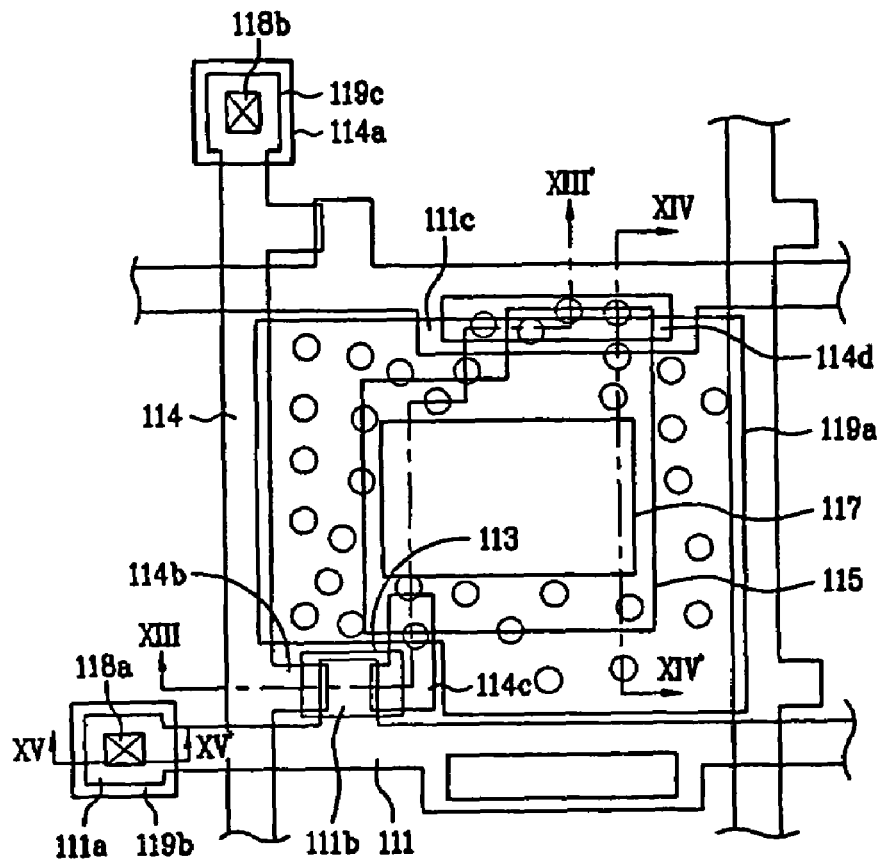
FIG. 19 and FIG. 20 are respectively a plan view and a cross-sectional view illustrating a transflective type LCD device according to the third embodiment of the present invention.
Figure 20:
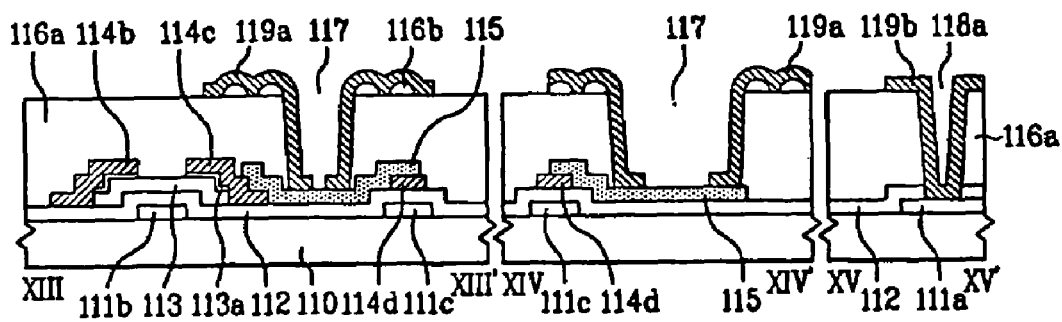
Figure 21A:
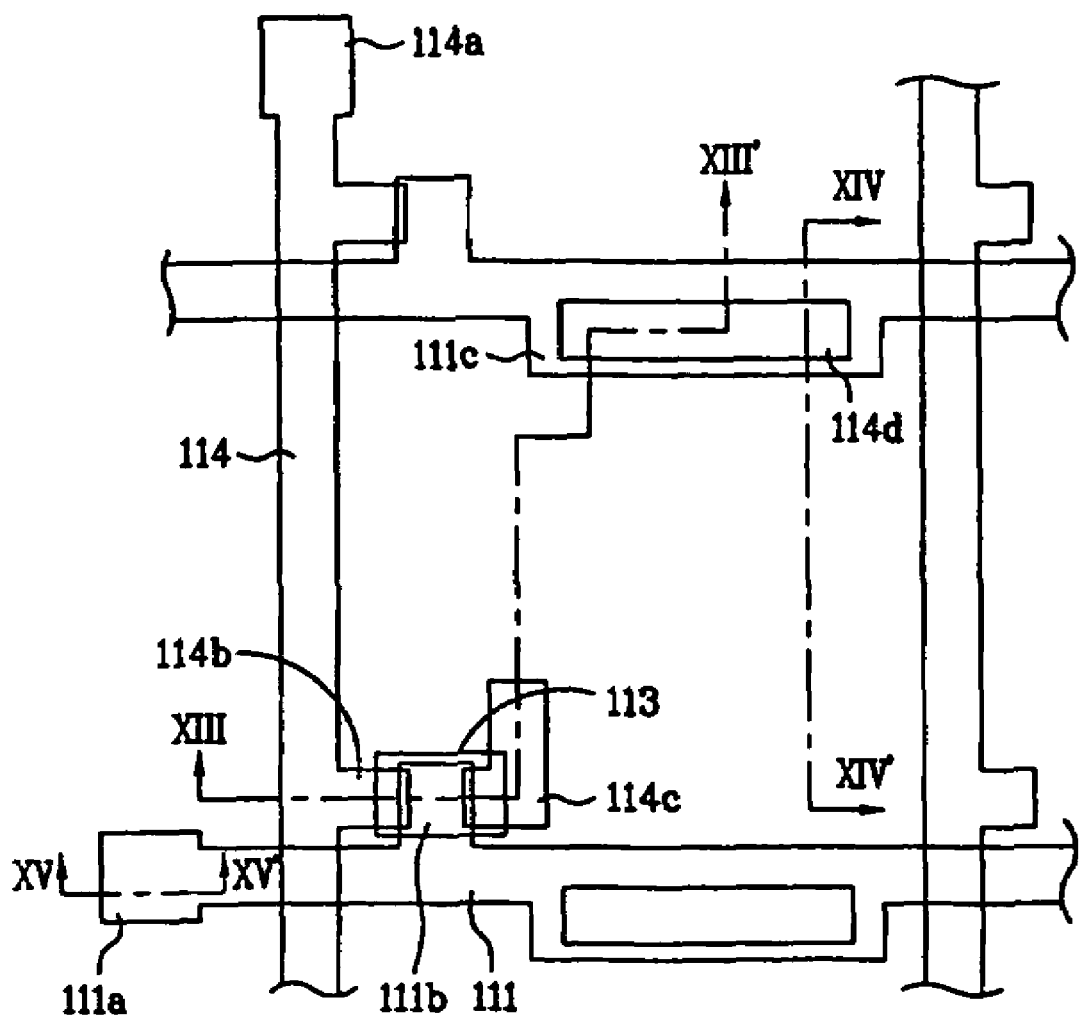
FIG. 21A to FIG. 21C are sequential plan views illustrating an enlarged pixel of an array substrate in a method for manufacturing a transflective type LCD device according to the third embodiment of the present invention.
Figure 21B:
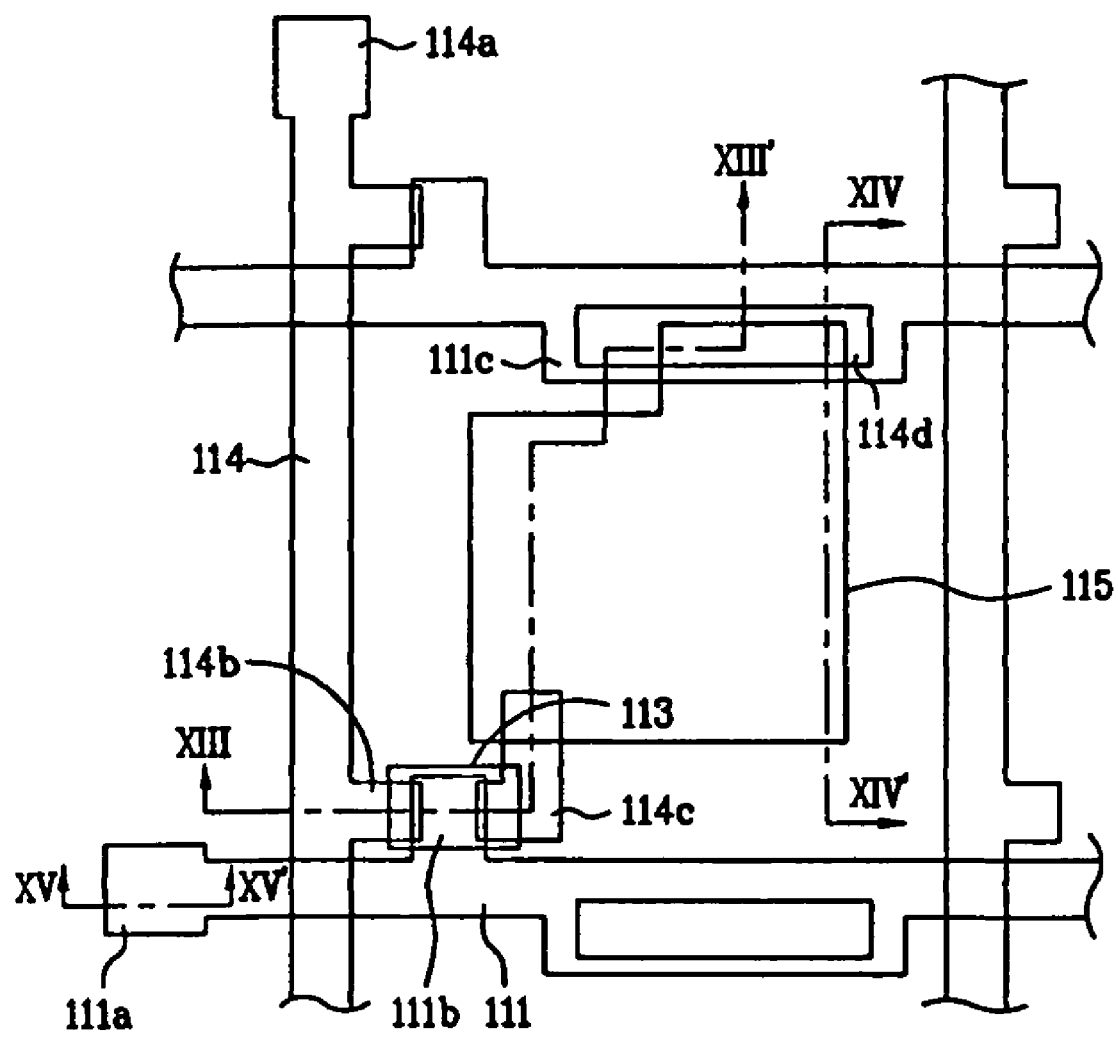
Figure 21C:
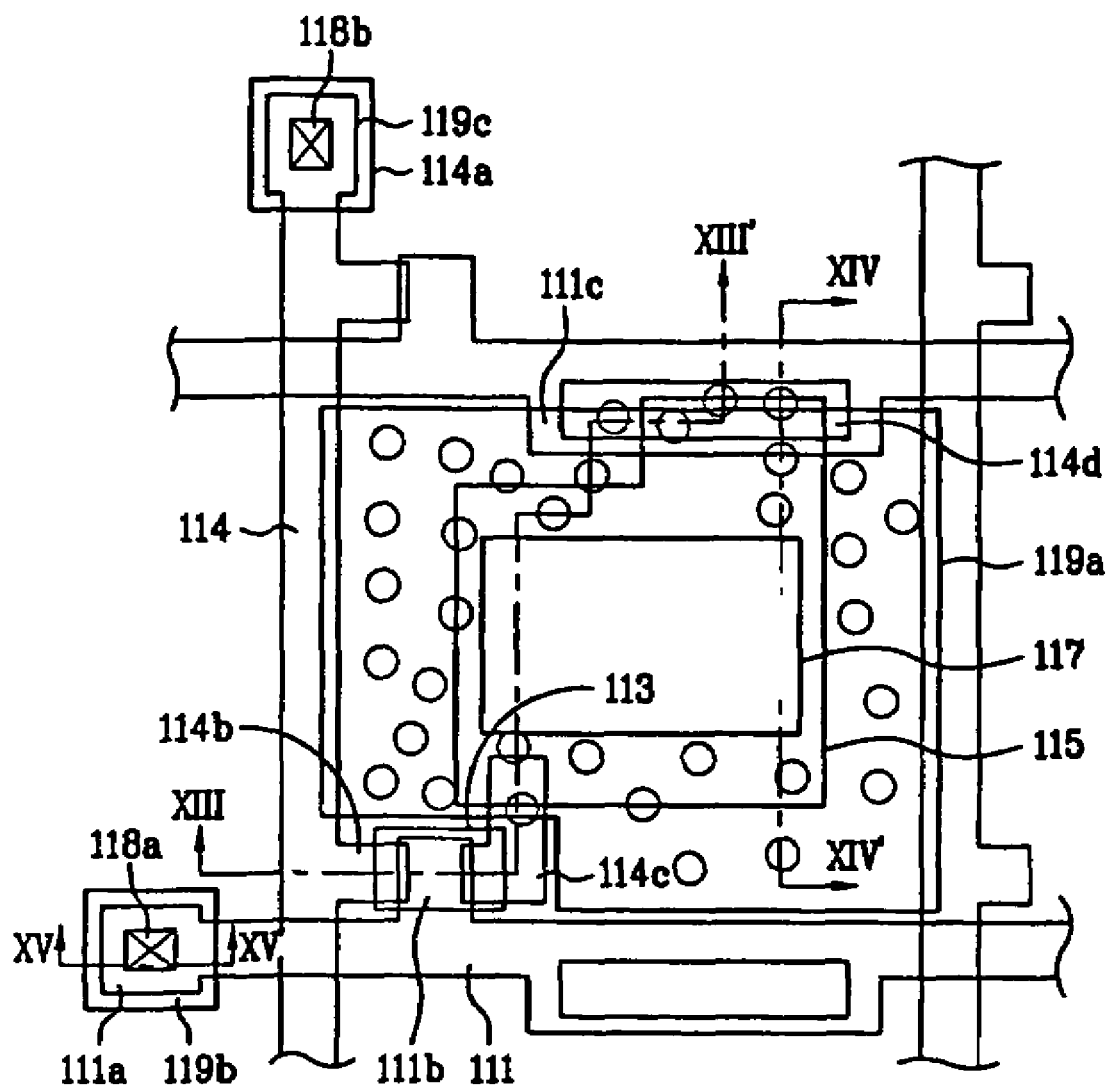
Figure 22A:
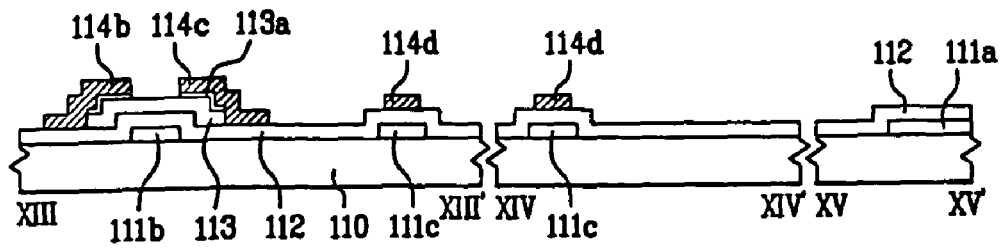
FIG. 22A to FIG. 22C are cross-sectional views taken along lines XIII-XIII', XIV-XIV' and XV-XV' of FIG. 21A to FIG. 21C for illustrating the manufacturing process.
Figure 22B:
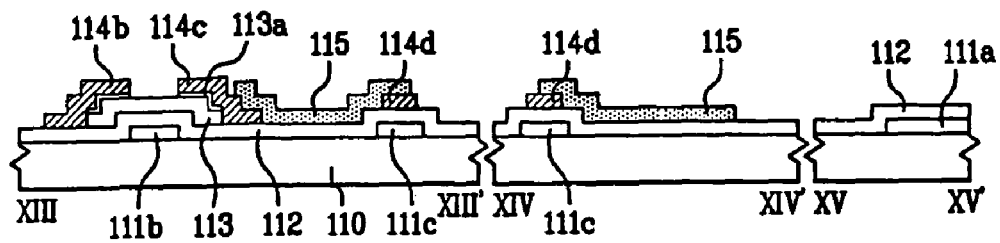
Figure 22C:
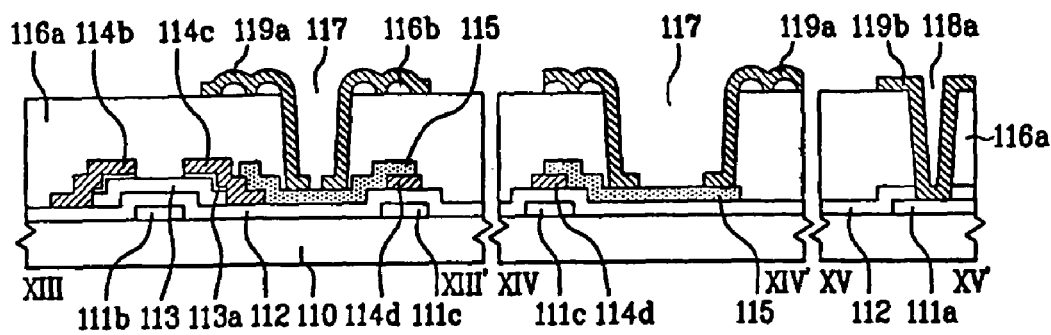

FIG. 19 and FIG. 20 are respectively a plan view and a cross-sectional view illustrating a transflective type LCD device according to a third embodiment of the present invention. FIG. 21A to FIG. 21C are sequential plan views illustrating an enlarged pixel of an array substrate in a method of manufacturing a transflective type LCD device according to the third embodiment of the present invention. FIG. 22A to FIG. 22C are cross-sectional views taken along lines XIII-XIII', XIV-XIV' and XV-XV' of FIG. 21A to FIG. 21C for illustrating the manufacturing process. The line XIII-XIII' is a cross-sectional line of a thin film transistor and a storage capacitor, the line XIV-XIV' is a cross-sectional line of a storage capacitor and a transmitting hole, and the line XV-XV' is a cross-sectional line of a gate pad. The transflective type LCD device according to the third embodiment of the present invention is characterized in that a reflective electrode 119a has an uneven surface including a plurality of projections. That is, the plurality of projections are formed on a passivation layer, and then the reflective electrode 119a is formed thereon. The plurality of projections are formed in the reflective part of the pixel region.

As shown in FIG. 19 and FIG. 20, the transflective type LCD device according to the third embodiment of the present invention includes a gate line 111, a data line 114, a pixel region, a thin film transistor and a storage capacitor. A gate pad 111a is formed at one end of the gate line 111, and a source pad 114a is formed at one end of the data line 114. Also, the gate line 111 and the data line 114 are substantially perpendicular to each other, thereby defining the pixel region. The pixel region includes a transmitting part and a reflective part. In the pixel region, a transmitting electrode 115 is in direct contact with an upper storage electrode 114d and a drain electrode 114c, and a reflective electrode 119a is formed in the reflective part to have a second transmitting hole 117 on the transmitting electrode 115. The transmitting electrode 115 is in contact with the drain electrode 114c and the upper storage electrode 114d at the same time. The thin film transistor is formed at a crossing point of the gate line 111 and the data line 114, and includes a gate electrode 111b projecting from the gate line 111 in one direction, a source electrode 114b extending from the data line 114 to the upper side of the gate electrode 111b, and a drain electrode 114c being separated from the source electrode 114b at a fixed interval. Also, the storage capacitor includes a lower storage electrode 111c connected to the preceding gate line, and an upper storage electrode 114d above the lower storage electrode 111c having a gate insulating layer 112 in between.

More specifically, the aforementioned transflective type LCD device according to the present invention will be described as follows.

As shown in FIG. 19 and FIG. 20, the gate lines 111 are formed on a transparent substrate 110 at fixed intervals in one direction and substantially parallel with one another, and then the gate electrode 111b projects from each of the gate lines 111. Then, the lower storage electrode 111c is formed integral with the preceding gate line corresponding to the storage capacitor. Also, the gate insulating layer 112 is formed to electrically insulate the gate line 111, the gate electrode 111b and the lower storage electrode 111c from an upper layer. Subsequently, an active layer 113 is formed on the gate insulating layer 112 above the gate electrode 111b. In this case, the active layer 113 is formed of an amorphous silicon layer, and an ohmic contact layer 113a of a doped amorphous silicon layer is formed on the active layer 113 above the gate electrode 111b except a in channel region. The data line 114 is formed substantially perpendicular with the gate line 111 to define the pixel region, and the source electrode 114b projects from the data line 114 in a predetermined direction and overlaps with one side of the active layer 113. Also, the drain electrode 114c is separate from the source electrode 114b overlapping with the other side of the active layer 113.

Next, the upper storage electrode 114d is formed above the lower storage electrode 111c at the preceding gate line separated from the drain electrode 114c. The transmitting electrode 115 is formed in the pixel region overlapping the upper storage electrode 114d and the drain electrode 114c, whereby the transmitting electrode 115 is in direct contact with the upper storage electrode 114d and the drain electrode 114c. The transmitting electrode 115 is wider than the second transmitting hole 117. Subsequently, the first and second passivation layers 116a and 116b are sequentially formed on the entire surface of the transparent substrate 110 including the thin film transistor and the pixel region to have a first transmitting hole and first and second contact holes 118a and 118b above the transmitting electrode 115 of the pixel region, the gate pad 111a and the source pad 114a. The first and second passivation layers 116a and 116b have a plurality of projections for the reflective electrode 119a. That is, the plurality of projections are formed on the entire reflective part of the pixel.

The transmitting holes include first and second transmitting holes, in which the first transmitting hole is a contact hole having an inclination by the first passivation layer 116a, and the second transmitting hole is an area exposing the transmissive electrode 115 by the reflective electrode 119a. Thus, the first transmitting hole is wider than the second transmitting hole. Also, the reflective electrode 119a is formed in the reflective part in contact with the transmitting electrode 115 at the bottom of the first transmitting hole extended from the sidewall of the inclination of the pixel region. The reflective electrode 119a overlaps with the data line 114 defining the pixel region. Thus, a pixel electrode is formed of the reflective electrode 119a and the transmitting electrode 115.

In the aforementioned structure, the transmitting electrode 115 is in direct contact with the upper storage electrode 114d and the drain electrode 114c, so that it is not required to perform a process for connecting the upper storage electrode 114d to the transmitting electrode 115 and connecting the drain electrode 114c to the transmitting electrode 115, thereby simplifying the manufacturing process. Also, the reflective electrode 119a is formed on a predetermined portion of the first passivation layer 116a, the inclination of the first transmitting hole, and the bottom of the first transmitting hole extending from the inclination, thereby improving reflectivity. Then, it is possible to improve reflectivity over an effective viewing angle range because the reflective electrode 119a has an uneven surface including a plurality of projections. The structure of the reflective electrode 119a having the plurality of projections may be applicable to a connecting structure of the upper storage electrode and the drain electrode.

A method for manufacturing the transflective type LCD device having the aforementioned structure will be described with reference to FIG. 21A to FIG. 21C and FIG. 22A to FIG. 22C.

As shown in FIG. 21A and FIG. 22A, a conductive metal such as aluminum Al, molybdenum Mo, tungsten W, and any conductive alloy is deposited on the transparent substrate 110, and then patterned to form a gate pad 111a having a predetermined area, a gate line 111 extending from the gate pad 91a in one direction, and the gate electrode 111b projecting from the gate line 111 at one side. Then, the lower storage electrode 111c is formed in the storage capacitor region of the preceding gate line when forming the gate line 111. Next, an insulating material such as silicon dioxide $SiO_2$ or silicon nitride SiNx is deposited on the entire surface of the transparent substrate 110 including the gate line 111, and sequentially, the amorphous silicon layer having the amorphous silicon (a-Si) and impurity is deposited to form a first insulating layer and a semiconductor layer (amorphous silicon layer and doped amorphous silicon layer). Then, the semiconductor layer is patterned to form an island-shaped semiconductor pattern above the gate electrode 111b.

Next, a conductive metal material such as molybdenum Mo, tungsten. W or chrome Cr is deposited on the entire surface of the transparent substrate 110 having the semiconductor pattern, and then a patterning process is performed thereto. Through the patterning process, the data line 114 is formed substantially perpendicular to the gate line having the first insulating layer in between, and the source pad 114a is formed at one end of the data line 114. Also, the source electrode 114b projects towards the upper side of the gate electrode 111b and overlaps with one side of the semiconductor pattern. When forming the data line 114, the drain electrode 114c is formed overlapping with the other side of the semiconductor pattern with a predetermined separation from the source electrode 114b. The upper storage electrode 114d is formed above the lower storage electrode 111c at the preceding gate line separated from the drain electrode 114c. The doped amorphous silicon layer is etched by using the source electrode 114b and the drain electrode 114c as masks. As a result, the active layer 113 of the amorphous silicon layer is formed, and the ohmic contact layer 113a of the doped amorphous silicon layer is formed on the active layer 113 except in the channel region.

As shown in FIG. 21B and FIG. 22B, one of transparent conductive metals such as Indium-Tin-Oxide ITO and Indium-Zinc-Oxide IZO is deposited on the entire surface of the transparent substrate 110 having the source electrode 114b and the drain electrode 114c, and then a wet-etch process is performed thereto, thereby forming a transmitting electrode 115 in the pixel region in direct contact with the drain electrode 114c and the upper storage electrode 114d at the preceding gate line. At this time, the transmitting electrode 115 is wider than the second transmitting hole (FIG. 21C and FIG. 22C).

Referring to FIG. 21C and FIG. 22C, any one organic insulating material such as BenzocycloButen BCB or photoacrylic resin is deposited on the entire surface of the transparent substrate 110 to form the first and second passivation layers 116a and 1161b. An exposure and developing process is performed to form the plurality of projections in the second passivation layer 116b corresponding to the reflective part. That is, the projections of the second passivation layer 116b are formed in the pixel region except in the region of the second transmitting hole 117. Subsequently, a photo process is performed thereto, thereby forming the first transmitting hole exposing the predetermined portion of the transmitting electrode 115 of the pixel region, and simultaneously, forming the first and second contact holes 118a and 118b above the gate pad 111a and the source pad 114a.

Next, a reflective metal material having low resistance value and great reflectivity such as aluminum Al, aluminum alloy or silver Ag is deposited on the entire surface of the transparent substrate 110 including the second passivation layer 116b having the uneven surface with the plurality of projections, and then the patterning process is performed thereon. As a result, the transmitting electrode 115 is exposed, and the reflective electrode 119a is formed in the reflective part of the pixel region in contact with the transmitting electrode 115 at the bottom of the first transmitting hole 117 extending from the inclination. Preferably, the reflective electrode 119a is formed as a dual-layered structure (for example, Mo—Al and Mo—AlNd) in that it is possible to decrease a contact resistance to the transparent electrode ITO by connecting Mo to the transparent electrode, and to prevent Galvanic corrosion according to direct contact between Al/AlNd and ITO.

When forming the reflective electrode 119a, a gate pad terminal 119b is formed in contact with the contact hole on the gate pad 111a, and the gate pad 111a on the adjoining first and second passivation layers 116a and 116b, and a source pad terminal 119c is formed in contact with the contact hole on the source pad 114a and the source pad 114a on the adjoining first and second passivation layers 116a and 116b. At this time, the reflective electrode 119a is partially overlapped with the data line 114 defining the pixel region.

The method for manufacturing the transflective type LCD device according to a fourth embodiment of the present invention is the same as that according to the first embodiment of the present invention except that the a doped amorphous silicon layer of a semiconductor pattern is etched after forming a transmitting electrode to form an active layer and an ohmic contact layer. In the method for manufacturing the transflective type LCD device according to the first embodiment of the present invention, an ohmic contact layer is formed by etching a doped amorphous silicon layer, and then a transparent conductive metal material is deposited, and a wet-etch process is performed thereto, thereby forming a transmitting electrode. At this time, a channel region of a thin film transistor may be damaged due to the wet-etch process. In order to solve such a problem, the doped amorphous silicon layer is etched after forming the transmitting electrode in the method for manufacturing the transflective type LCD device according to the fourth embodiment of the present invention.

Figure 23A:
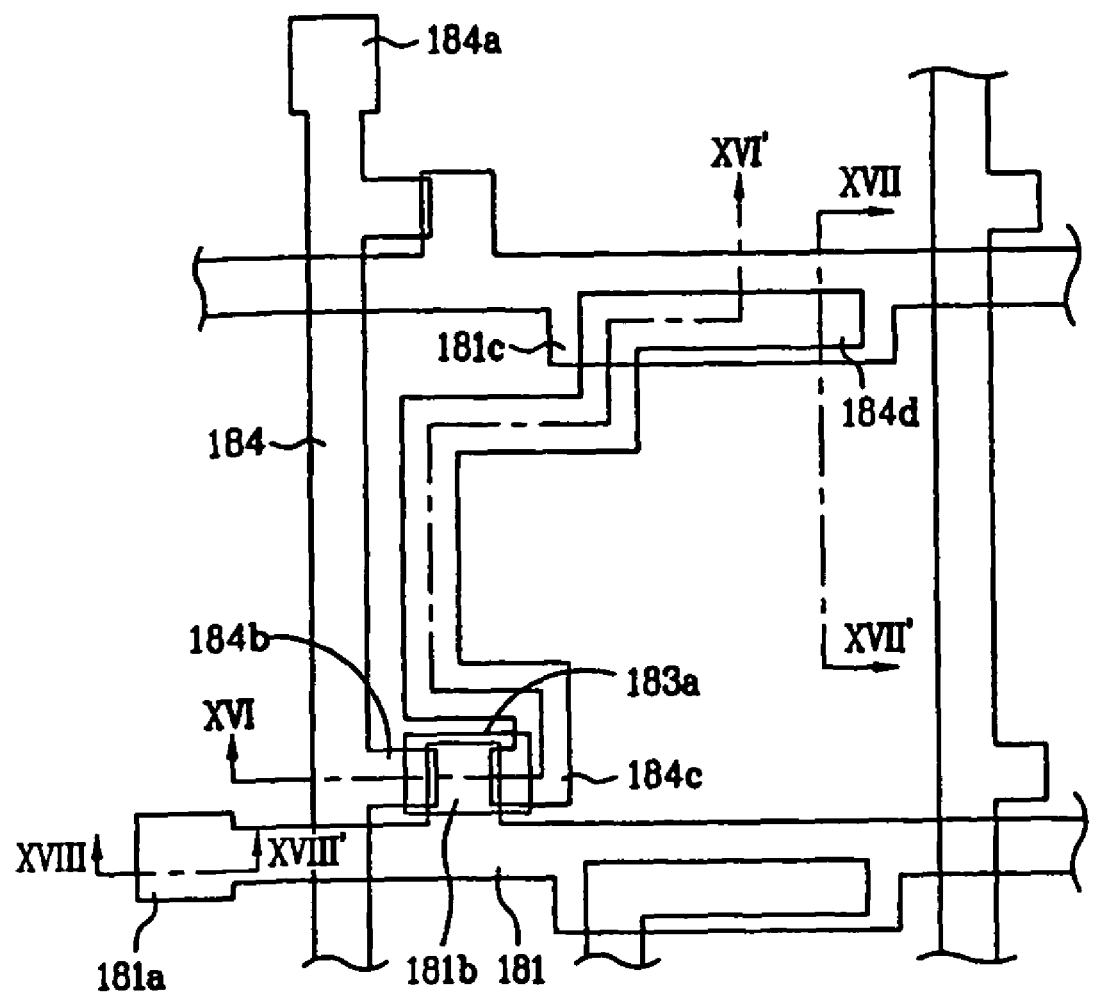
FIG. 23A to FIG. 23C are sequential plan views illustrating an enlarged pixel of an array substrate in a method for manufacturing a transflective type LCD device according to the fourth embodiment of the present invention.
Figure 23B:
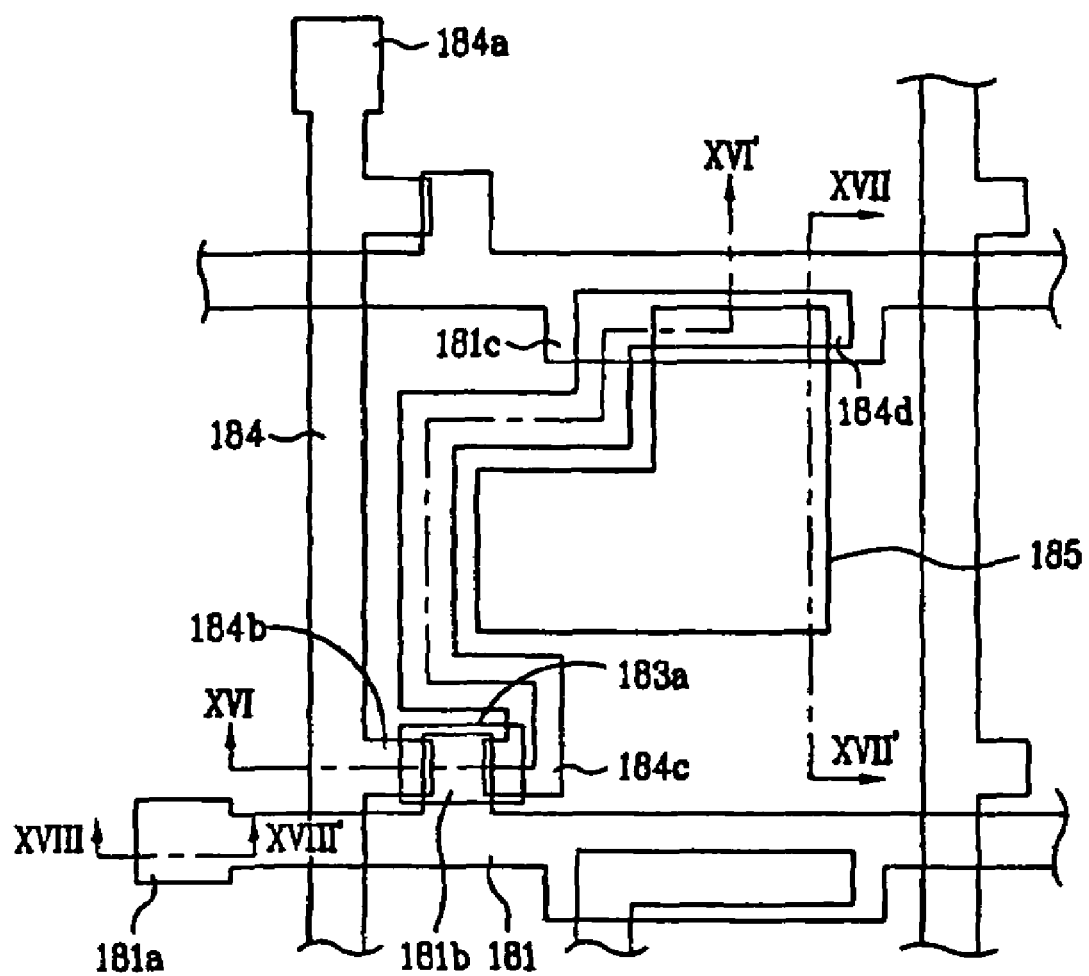
Figure 23C:
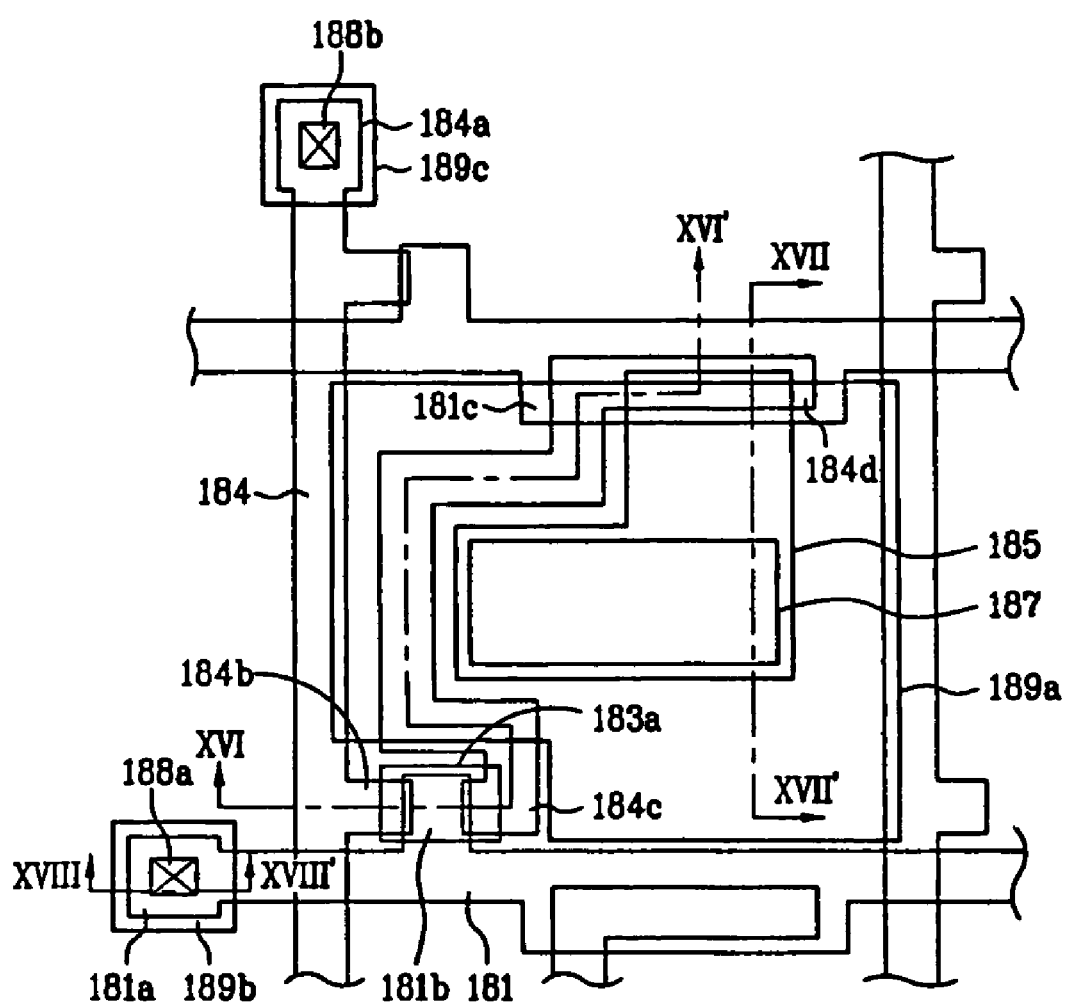
Figure 24A:
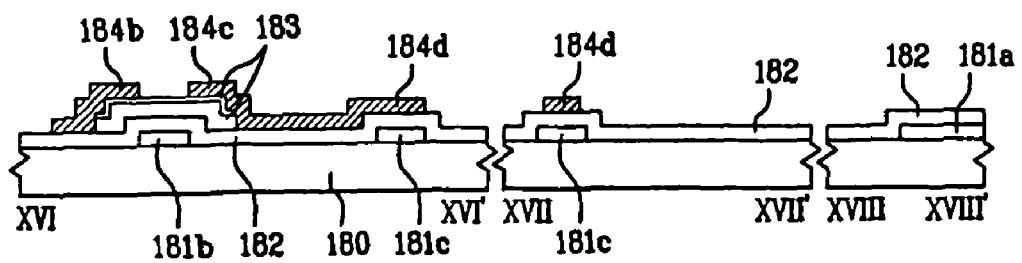
FIG. 24A to FIG. 24C are cross-sectional views taken along lines XVI-XVI', XVII-XVII' and XVIII-XVIII' of FIG. 23A to FIG. 23C for illustrating the manufacturing process.
Figure 24B:
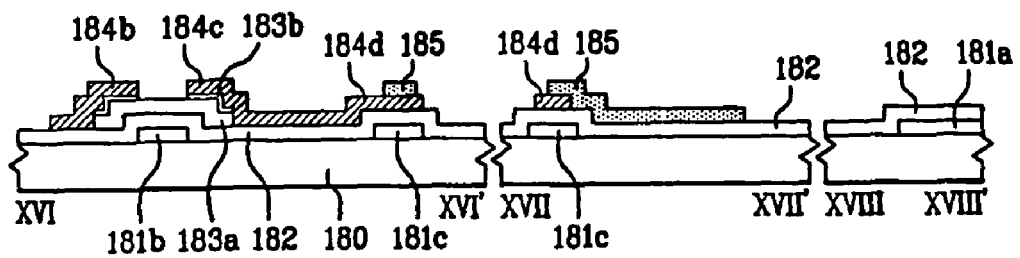
Figure 24C:
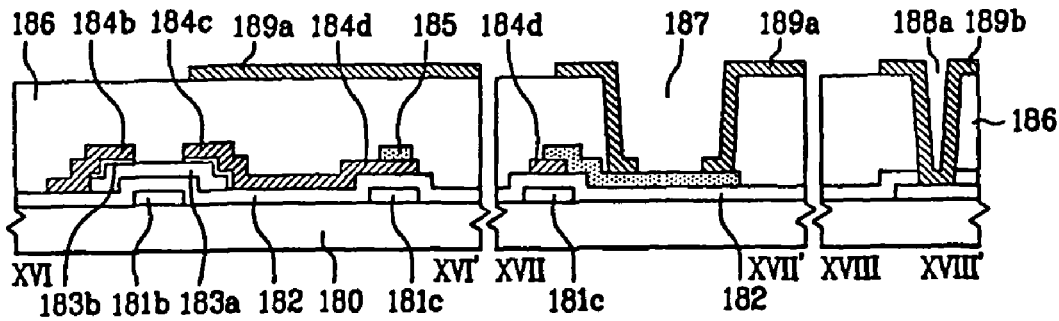

Hereinafter, the method for manufacturing the transflective type LCD device according to the fourth embodiment of the present invention will be described with reference to the accompanying drawings. FIG. 23A to FIG. 23C are sequential plan views illustrating an enlarged pixel of an array substrate in a method for manufacturing a transflective type LCD device according to the fourth embodiment of the present invention. FIG. 24A to FIG. 24C are cross-sectional views taken along lines XVI-XVII', XVII-XVII' and XVIII-XVIII' of FIG. 23A to FIG. 23C for illustrating manufacturing process.

As shown in FIG. 23A and FIG. 24A, a conductive metal such as aluminum Al, molybdenum Mo, tungsten W, and any conductive alloy is deposited on the transparent substrate 180, and then patterned to form a gate pad 181a of a predetermined area having a first hole, a gate line 181 extending from the gate pad 181a in one direction, and a gate electrode 181b projecting from the gate line at one side. Then, a lower storage electrode 181c is formed in a storage capacitor region of the preceding gate line when forming the gate line 181. Next, an insulating material such as silicon dioxide $SiO_2$ or silicon nitride SiNx is deposited on the entire surface of the transparent substrate 180 including the gate line 181, and sequentially, an amorphous silicon layer having amorphous silicon (a-Si) and impurity is deposited to form a gate insulating layer 182 and a semiconductor layer (amorphous silicon layer and doped amorphous silicon layer). Then, the semiconductor layer is patterned to form an island-shaped semiconductor pattern above the gate electrode 181b.

Next, a conductive metal material such as molybdenum Mo, tungsten W or chrome Cr is deposited on the entire surface of the transparent substrate 180 having the semiconductor pattern 183, and then a patterning process is performed thereto. Through the patterning process, the data line 184 is formed substantially perpendicular to the gate line having the gate insulating layer 182 in between, and the source pad 184a is formed at one end of the data line 184. Also, the source electrode 184b projects and overlaps with one side of the semiconductor pattern 183 above the gate electrode 181b. When forming the data line 184, the drain electrode 184c is formed overlapping the other side of the semiconductor pattern 183 at a predetermined interval with the source electrode 184b. The upper storage electrode 184d is formed above the lower storage electrode 181c at the preceding gate line integral with the drain electrode 184c.

As shown in FIG. 23B and FIG. 24B, one of transparent conductive metals such as Indium-Tin-Oxide ITO and Indium-Zinc-Oxide IZO is deposited on the entire surface of the transparent substrate 180 having the source electrode 184b and the drain electrode 184c, and then a wet-etch process is performed thereto, thereby forming the transmitting electrode 185 in the pixel region in direct contact with the upper storage electrode 184d at the preceding gate line. At this time, the transmitting electrode 185 is wider than a second transmitting hole (187 of FIG. 23C and FIG. 24C). Then, the doped amorphous silicon layer of the semiconductor pattern 183 is etched by using the source electrode 184b and the drain electrode 184c as masks, so that the active layer 183a of the amorphous silicon layer is formed, and the ohmic contact layer 183b of the doped amorphous silicon layer is formed on the active layer 183a except in the channel region.

In the method for manufacturing the transflective type LCD device shown in FIG. 23C and FIG. 24C, the next process is same as that in the method for manufacturing the transflective type LCD device according to the first embodiment of the present invention, whereby next process will be omitted. Accordingly, in the method for manufacturing the transflective type LCD device according to the fourth embodiment of the present invention, the manufacturing process is simplified, and the aperture ratio is improved. Also, when forming the transmitting electrode, it is possible to prevent the channel region of the thin film transistor from being damaged.

A transflective type LCD device according to a fifth embodiment of the present invention has the same structure as that according to the first embodiment of the present invention except that a buffer insulating layer of a silicon nitride layer is additionally formed between source/drain electrodes and a transmitting electrode, and a contact hole is formed at a contact portion of a transmitting electrode and an upper storage electrode. In the method for manufacturing the transflective type LCD device according to the first embodiment of the present invention, an ohmic contact layer is formed by etching a doped amorphous silicon layer, and then a transparent conductive metal material is deposited, and a wet-etch process is performed thereto, thereby forming a transmitting electrode. During this step, a channel region of a thin film transistor may be damaged due to the wet-etch process. In order to solve this problem, a buffer insulating layer of a silicon nitride layer is formed between source/drain electrodes and a transmitting electrode in the fifth embodiment of the present invention.

Figure 25:
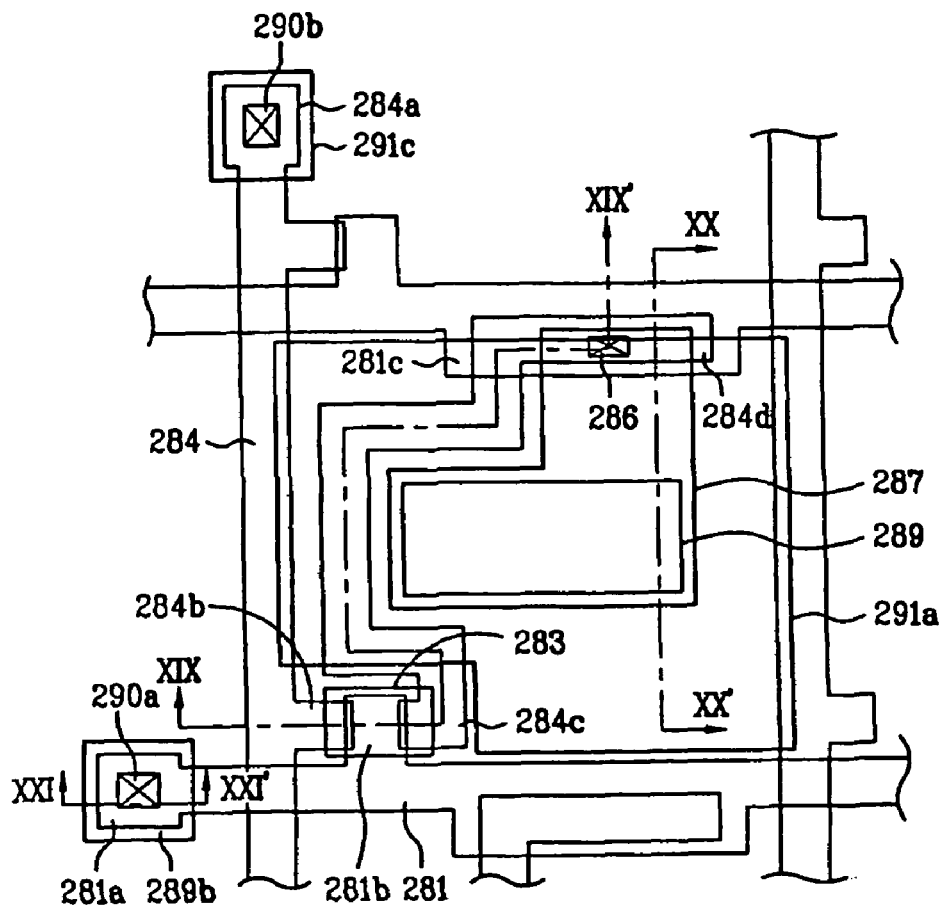
FIG. 25 and FIG. 26 are respectively a plan view and a cross-sectional view illustrating a transflective type LCD device according to the fifth embodiment of the present invention.
Figure 26:
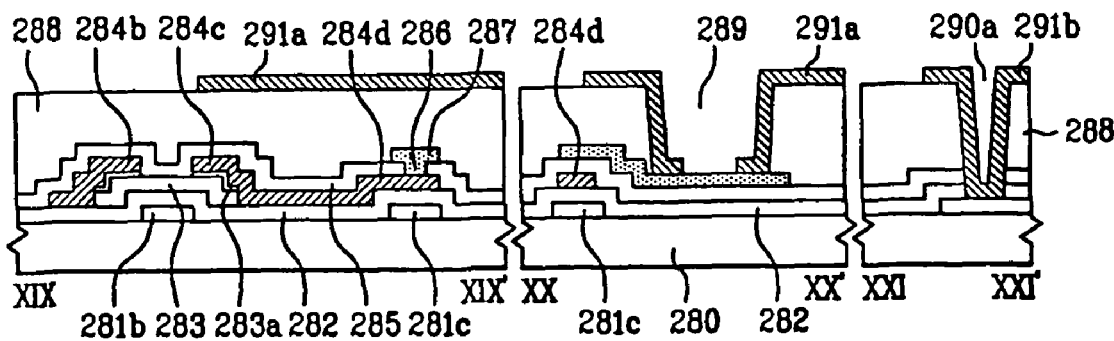
Figure 27A:
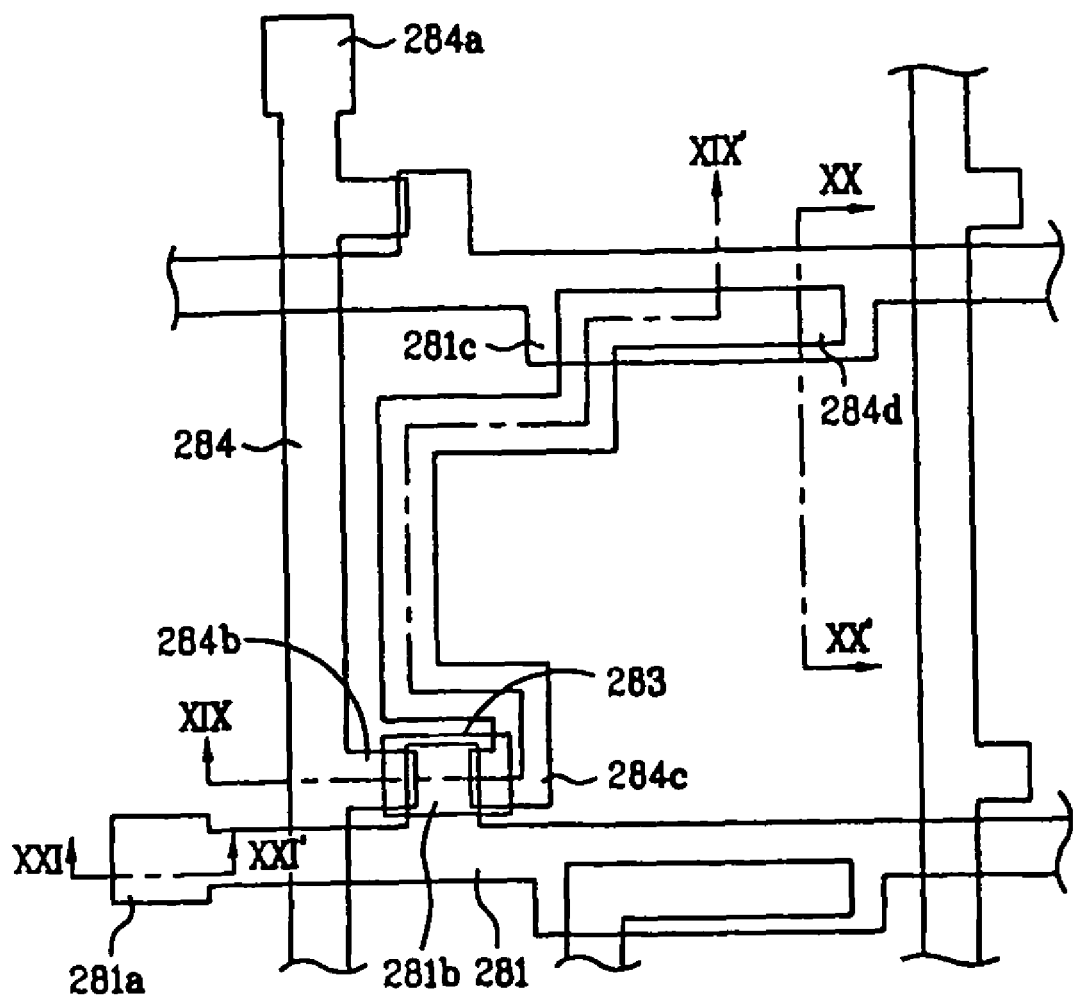
FIG. 27A to FIG. 27C are sequential plan views illustrating an enlarged pixel of an array substrate in a method for manufacturing a transflective type LCD device according to the fifth embodiment of the present invention.
Figure 27B:
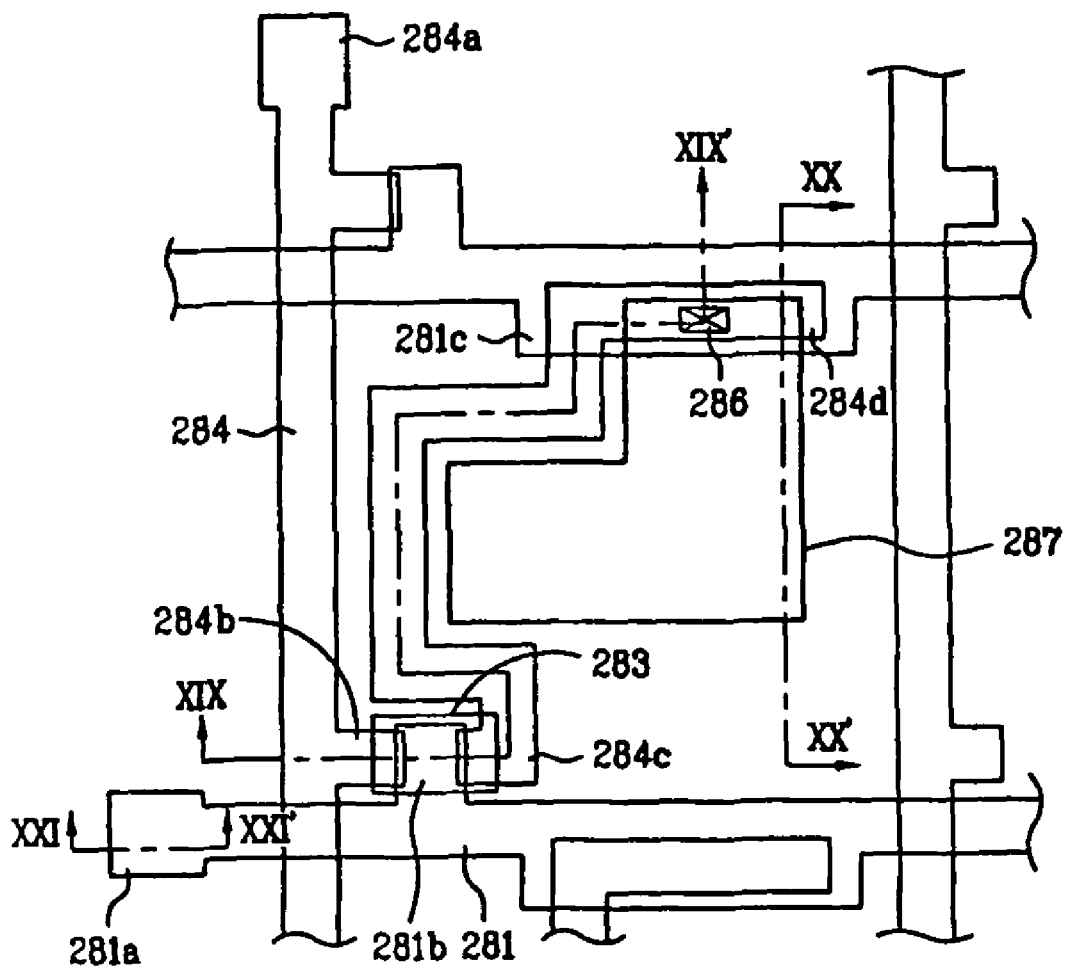
Figure 27C:
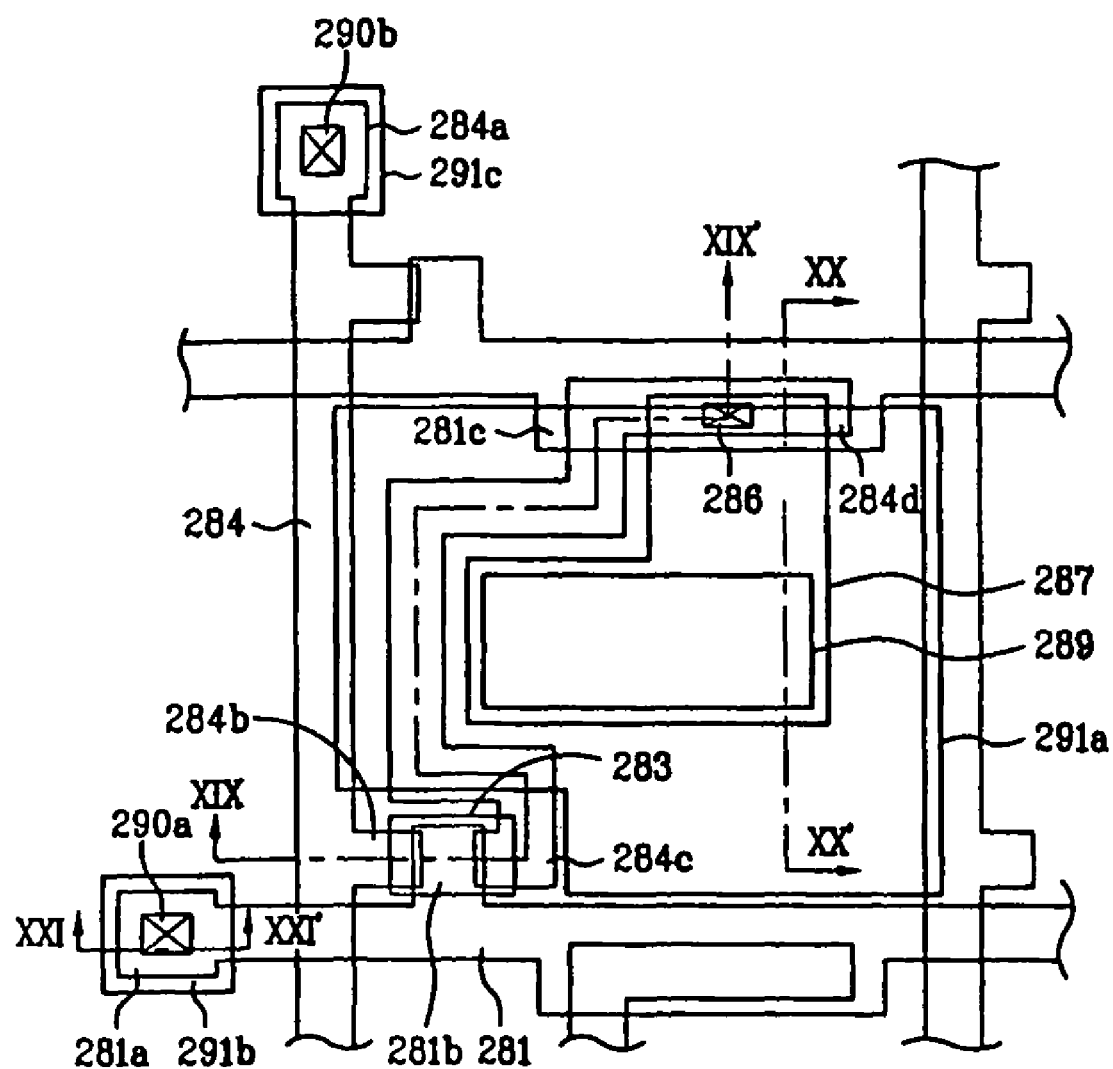
Figure 28A:
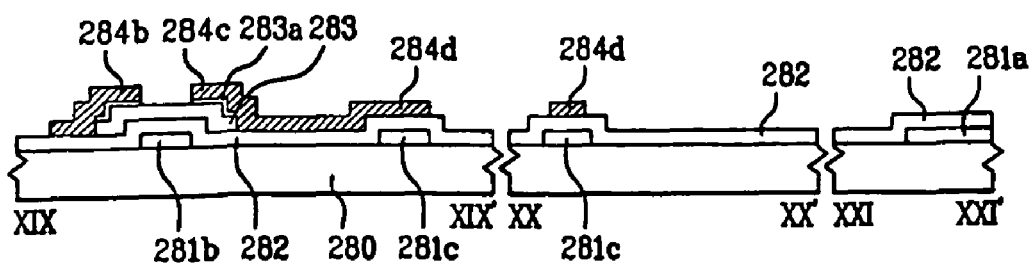
FIG. 28A to FIG. 28C are cross-sectional views taken along lines XIX-XIX', XX-XX' and XXI-XXI' of FIG. 27A to FIG. 27C for illustrating the manufacturing process.
Figure 28B:
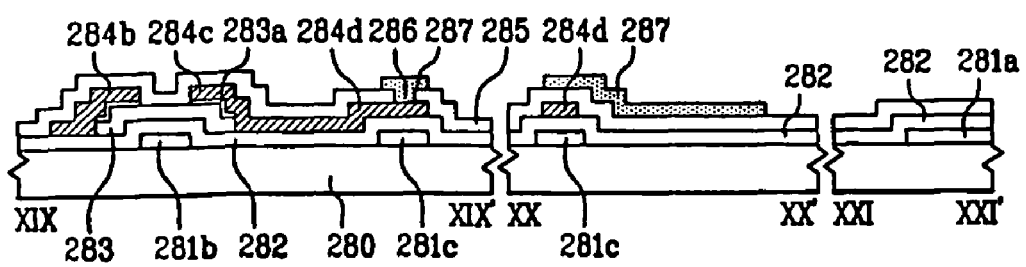
Figure 28C:
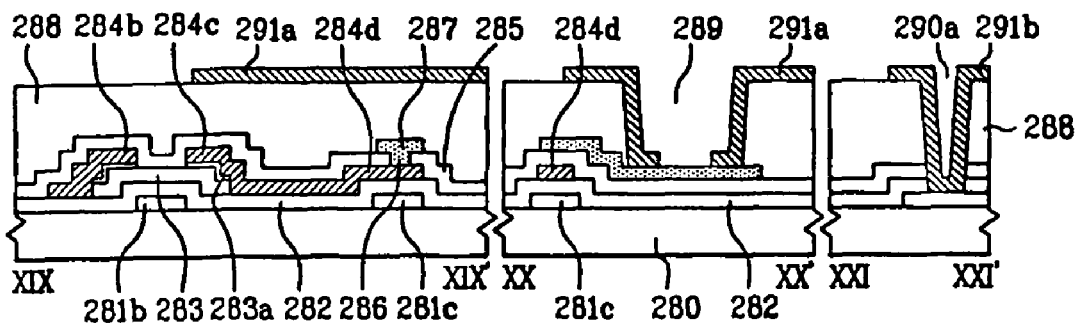

Hereinafter, a transflective type LCD device according to the fifth embodiment of the present invention and a method for manufacturing the same will be described with reference to the accompanying drawings. FIG. 25 and FIG. 26 are respectively a plan view and a cross-sectional view illustrating a transflective type LCD device according to the fifth embodiment of the present invention. FIG. 27A to FIG. 27C are sequential plan views illustrating an enlarged pixel of an array substrate in a method for manufacturing a transflective type LCD device according to the fifth embodiment of the present invention. FIG. 28A to FIG. 28C are cross-sectional views taken along lines XIX-XIX', XX-XX' and XXI-XXI' of FIG. 27A to FIG. 27C for illustrating manufacturing process.

As shown in FIG. 25 and FIG. 26, the transflective type LCD device according to the fifth embodiment of the present invention includes a gate line 281, a gate electrode 281*b*, a gate pad 281*a*, a lower storage electrode 281*c*, a gate insulating layer 282, a data line 284, a source pad 284*a*, a source electrode 284*b*, a drain electrode 284*c*, an upper storage electrode 284*d*, an active layer 283, and an ohmic contact layer 283*a* on a substrate 280 in the same structure as that in the transflective type LCD device according to the first embodiment of the present invention.

However, a buffer insulating layer 285 of a silicon nitride layer is formed on an entire surface of the substrate 280 including the source/drain electrodes 284*b*/284*c*, and a first contact hole 286 is formed at one portion of the upper storage electrode 284*d* for connecting a transmitting electrode 287 to the upper storage electrode 284*d* through the first contact hole 286 in the pixel region. The transmitting electrode 287 in the fifth embodiment of the present invention has the same structure as that in first embodiment of the present invention except that the transmitting electrode 287 is in contact with the upper storage electrode 284*d* through the first contact hole 286. Accordingly, structures of a passivation layer 288, a transmitting hole (second transmitting hole 289), a second contact hole 290*a*, a third contact hole 290*b*, a reflective electrode 291*a*, a gate pad terminal 291*b* and a source pad terminal 291*c* are same as those in the transflective type LCD device according to the first embodiment of the present invention. In the fifth embodiment of the present invention, the second contact hole 290*a* and the third contact hole 290*b* are corresponding to the first contact hole 88*a* and the second contact hole 88*b* in the transflective type LCD device according to the first embodiment of the present invention.

The method for manufacturing the transflective type LCD device according to the fifth embodiment of the present invention has the same process as that of the first embodiment of the present invention as shown in FIG. 27A and FIG. 28A. Then, referring to FIG. 27B and FIG. 28B, the buffer insulating layer 285 of the silicon nitride layer is formed on the entire surface of the substrate 280 including the source/drain electrodes 284*b*/284*c*, the active layer 283 and the ohmic contact layer 283*a*. Then, a photoresist pattern (not shown) is formed to open a predetermined portion of the upper storage electrode 284*d*, and the buffer insulating layer 285 is etched by using the photoresist pattern as a mask, thereby forming the first contact hole 286. Next, a transparent conductive metal such as Indium-Tin-Oxide ITO or Indium-Zinc-Oxide IZO is formed on the buffer insulating layer 285 having the first contact hole 286, and a wet-etch process is performed thereto. As a result, the transmitting electrode 287 is formed in the pixel region in contact with the upper storage electrode 284*d* through the first contact hole 286. The transmitting electrode 287 is wider that the second transmitting hole (289 of FIG. 27C and FIG. 28C).

As shown in FIG. 27C and FIG. 28C, the passivation layer 288, the transmitting hole (second transmitting hole 289), the second contact hole 290*a*, the third contact hole 290*b*, the reflective electrode 291*a*, the gate pad terminal 291*b*, and the source pad terminal 291*c* are formed in the same method as that of the first embodiment of the present invention. The fifth embodiment of the present invention is manufactured in the aforementioned process, and the transflective type LCD device according to the fifth embodiment of the present invention solves the same problems as the first embodiment of the present invention. Furthermore, it is possible to prevent the channel region of the thin film transistor from being damaged when forming the transmitting electrode in the method for manufacturing the transflective type LCD device according to the fifth embodiment of the present invention.

Figure 29:
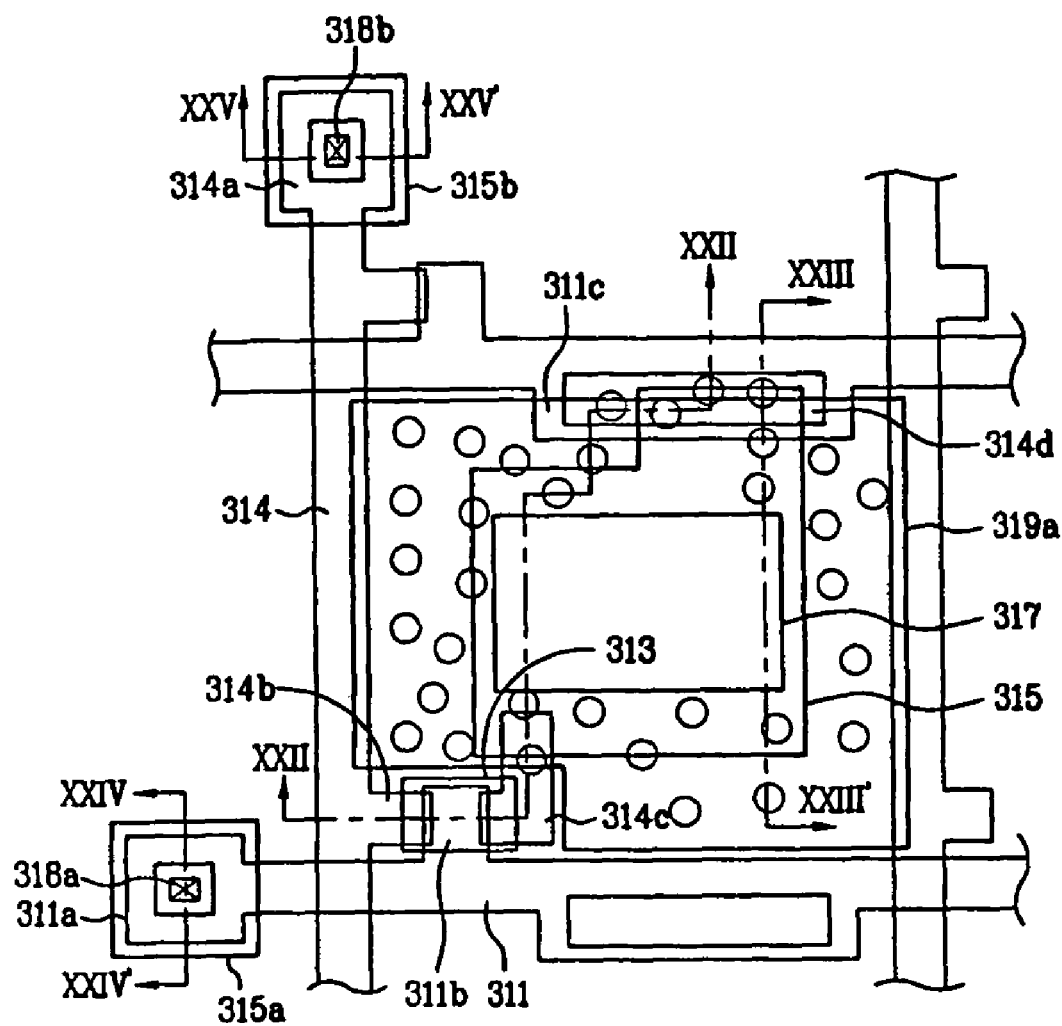
FIG. 29 and FIG. 30 are respectively a plan view and a cross-sectional view illustrating a transflective type LCD device according to the sixth embodiment of the present invention.
Figure 30:
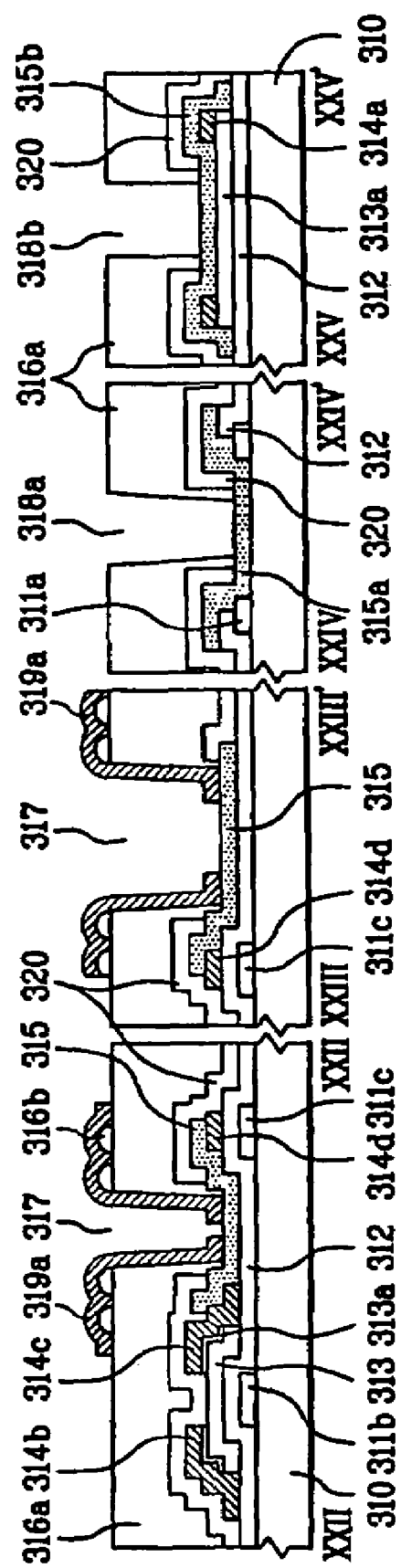
Figure 31A:
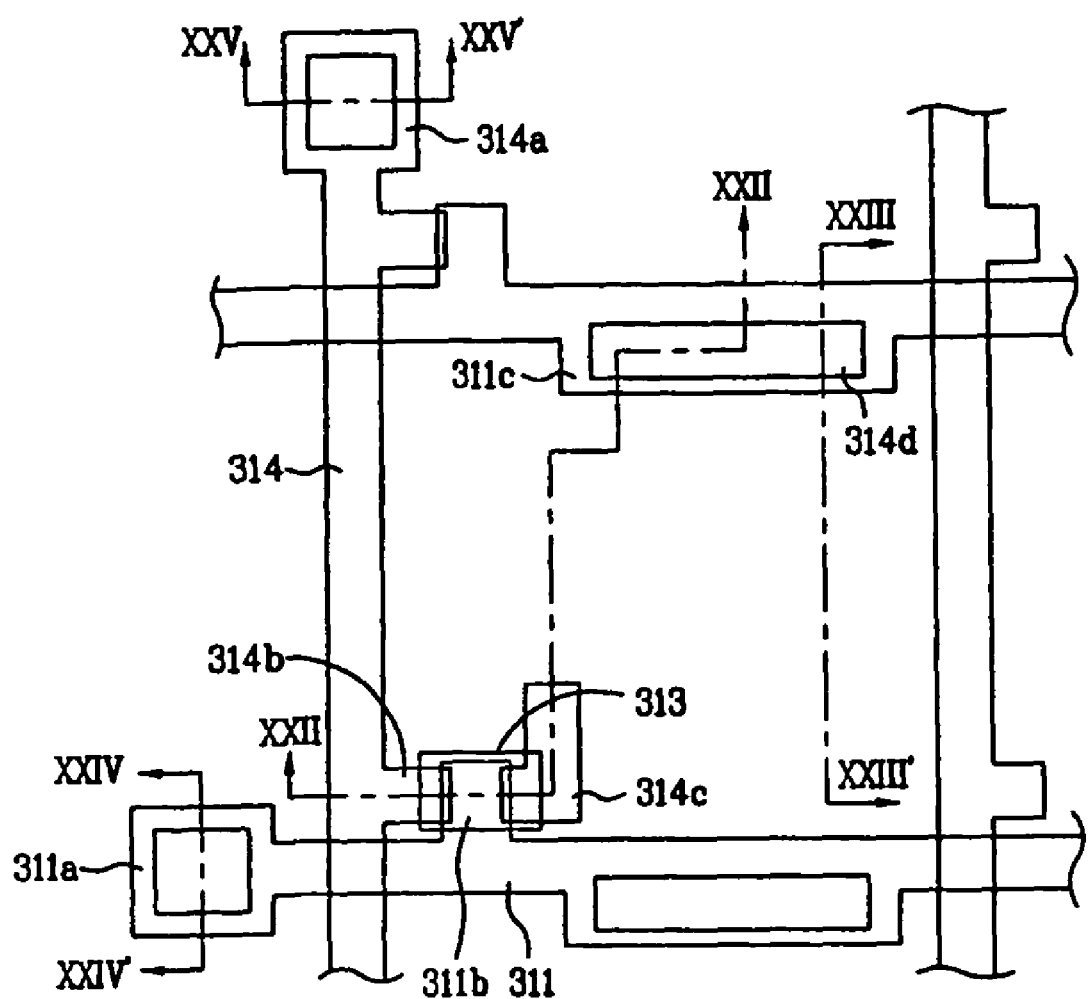
FIG. 31A to FIG. 31C are sequential plan views illustrating an enlarged pixel of an array substrate in a method for manufacturing a transflective type LCD device according to the sixth embodiment of the present invention.
Figure 31B:
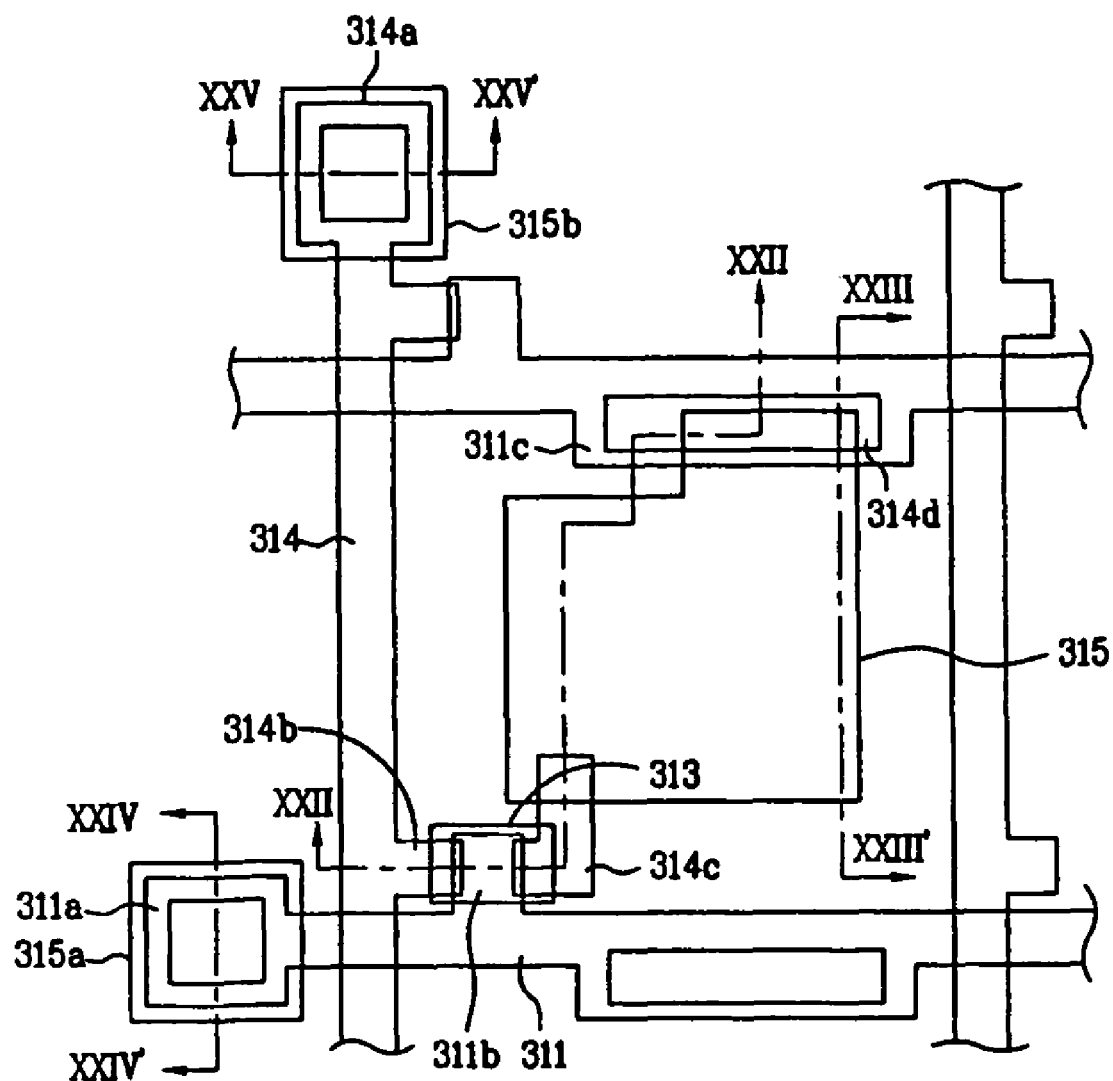
Figure 31C:
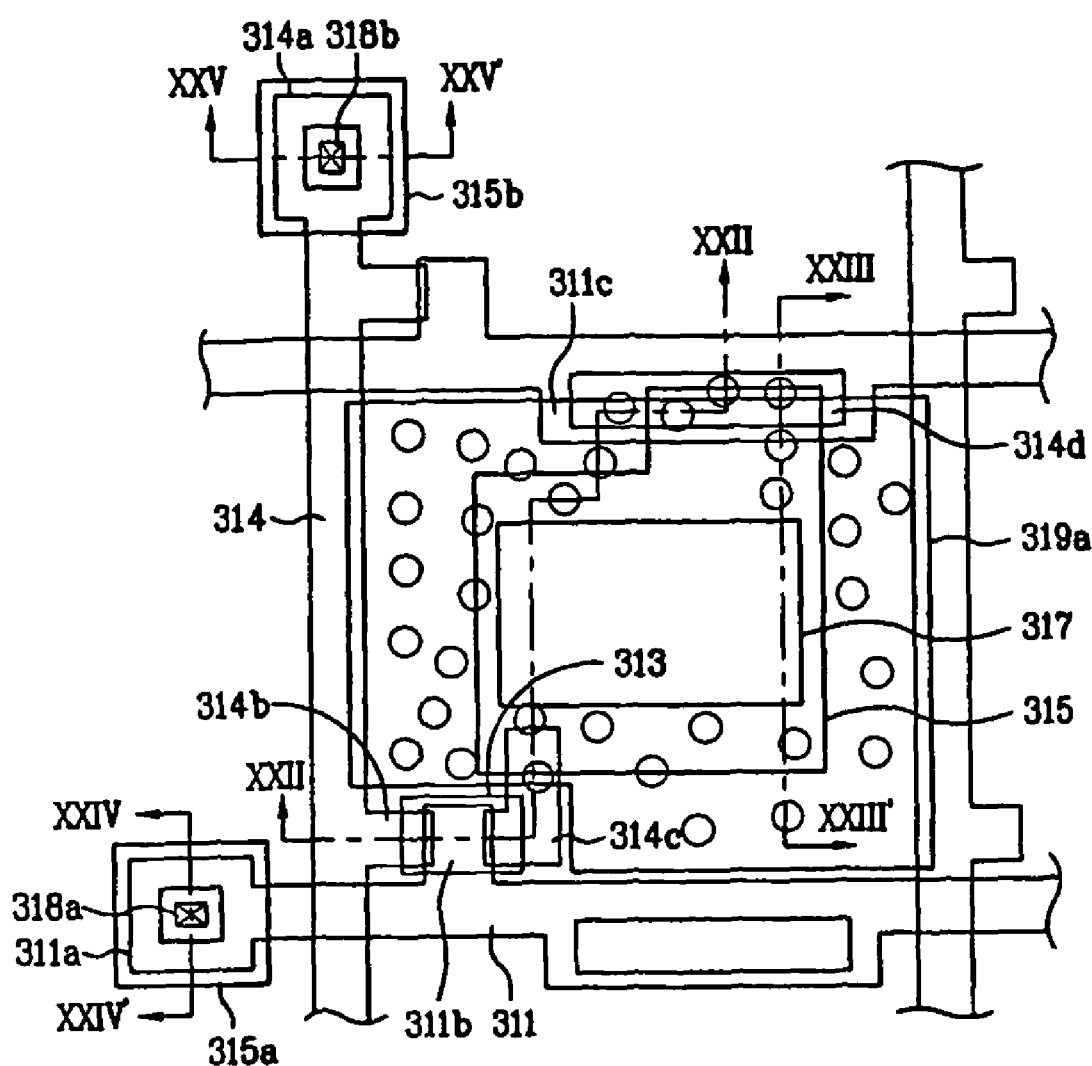
Figure 32A:
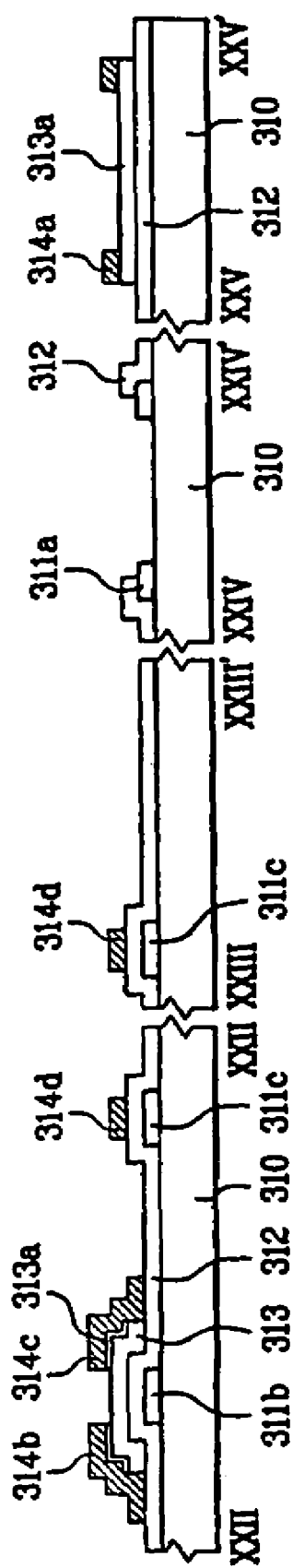
FIG. 32A to FIG. 32C are cross-sectional views taken along lines XXII-XXII', XXIII-XXIII', XXIV-XXIV' and XXV-XXV' of FIG. 31A to FIG. 31C.
Figure 32B:
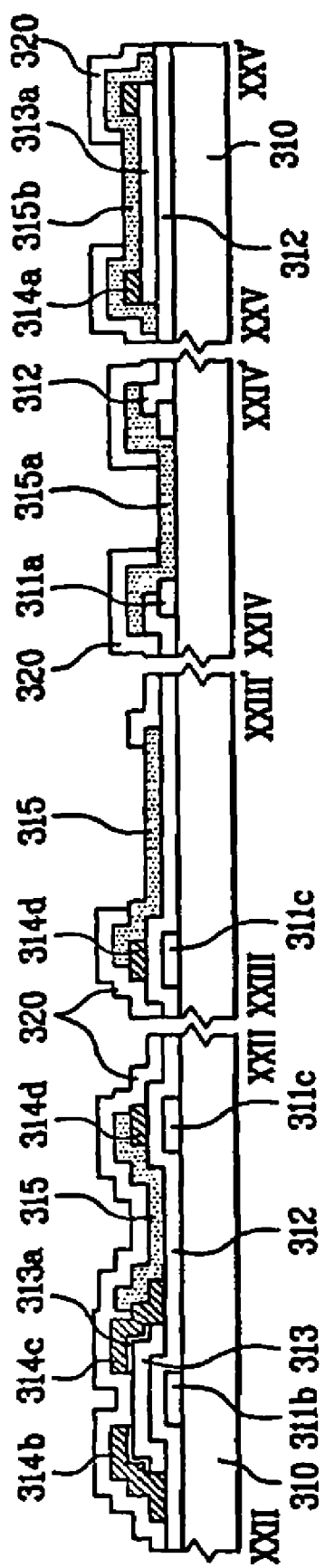
Figure 32C:
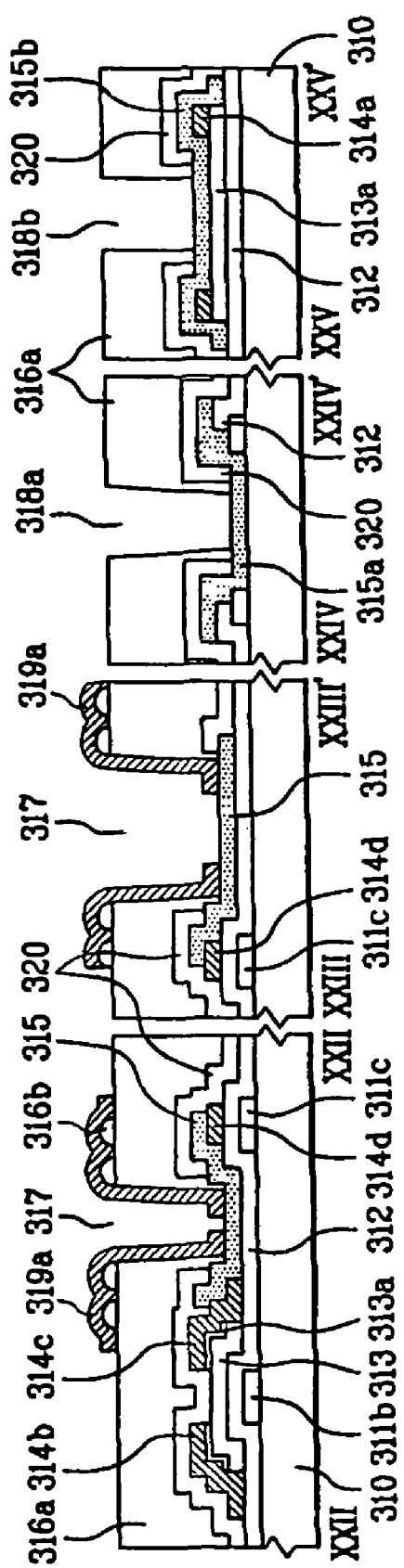

FIG. 29 and FIG. 30 are respectively a plan view and a cross-sectional view illustrating a transflective type LCD device according to a sixth embodiment of the present invention. FIG. 31A to FIG. 31C are sequential plan views illustrating an enlarged pixel of an array substrate in a method for manufacturing a transflective type LCD device according to the sixth embodiment of the present invention. FIG. 32A to FIG. 32C are cross-sectional views taken along lines XXII-XXII', XXIII-XXIII', XXIV-XXIV' and XXV-XXV' of FIG. 31A to FIG. 31C. At this time, the line XXII-XXII' is a cross-sectional line of a thin film transistor and a storage capacitor, the line XXIII-XXIII' is a cross-sectional line of a storage capacitor and a transmitting hole, the line XXIV-XXIV' is a cross-sectional line of a gate pad, and the line XXV-XXV' is a cross-sectional line of a source pad. The transflective type LCD device according to the sixth embodiment of the present invention has a photoacrylic projection pattern. Referring to FIG. 29 and FIG. 30, the transflective type LCD device according to the sixth embodiment of the present invention is characterized in that the gate and source pads 311*a* and 314*a* respectively have first and second holes therein, a reflective electrode 319*a* is formed on a transmitting electrode 315, and a passivation pattern extends to sidewalls of the gate pad 311*a*, the source pad 314*a* and gate line 311 before forming a transmitting hole.

More specifically, the transflective type LCD device according to the sixth embodiment of the present invention will be described as follows.

Referring to FIG. 29 and FIG. 30, a plurality of gate lines 311 are arranged on a transparent substrate 310 at fixed intervals in one direction, a gate pad 311*a* is formed at one end of the gate line 311, and then a first hole is formed inside the gate pad 311*a*. Then, a gate electrode 311*b* projects from the gate line 311 in one direction, and a lower storage electrode 311*c* is formed at a storage capacitor integral with the preceding gate line. After that, a gate insulating layer 312 is formed for electrically insulating the gate line 311, the gate electrode 311*b* and the lower storage electrode 311*c* from an upper layer, and an active layer 313 is formed on the gate insulating layer 312 above the gate electrode 311*b*. The active layer 313 is formed of an amorphous silicon layer, and an ohmic contact layer 313*a* of doped amorphous silicon is formed on the active layer 313 except in a channel region above the gate electrode 311*b*.

Next, a data line 314 is formed substantially perpendicular to the gate line 311, thus defining a pixel region. A source pad 314a is formed at one end of the data line 314, and then a second hole is formed inside the source pad 314a. Then, a source electrode 314b projects from the data line 314 in one direction and overlaps one side of the active layer 313, and a drain electrode 314c is formed at a fixed interval from the source electrode 314b overlapping with the other side of the active layer 313. Then, a semiconductor layer 313a is formed to have a predetermined space under the source pad 314a, and an upper storage electrode 314d is formed above the lower storage electrode 311c.

As mentioned above, a thin film transistor is formed at each crossing point of the gate and data lines 311 and 314. Also, a transmitting electrode 315 is formed overlapping the upper storage electrode 314d and the drain electrode 314c in the pixel region, whereby the transmitting electrode 315 is in direct contact with the upper storage electrode 314d and the drain electrode 314c. The transmitting electrode 315 is wider than a second transmitting hole 317. When the transmitting electrode 315 is in direct contact with the drain electrode 314c and the upper storage electrode 314d, it is not required to perform an additional contact process between the drain electrode 314c and the transmitting electrode 315 and between the upper storage electrode 314d and the transmitting electrode 315. The gate and source pad terminals 315a and 315b are formed to be in contact with upper sides of the respective gate pad 311a and the source pad 314a through the first and second holes. The transmitting electrode 315, the gate pad terminal 315a and the source pad terminal 315b are formed of transparent conductive metal such as Indium-Tin-Oxide ITO, Tin-Oxide TO, Indium-Zinc-Oxide IZO or Indium-Tin-Zinc-Oxide ITZO.

Although not shown, a passivation layer is formed below the transmitting electrode 315 to have contact holes corresponding to the drain electrode 314c and the upper storage electrode 314d, whereby the transmitting electrode 315 is in contact with the drain electrode 314c and the upper storage electrode 314d through the contact hole. Then, an insulating layer 320 of silicon nitride is formed on an entire surface of the transparent substrate 310 including the thin film transistor and the pixel region. The insulating layer 320 is formed to surround the sidewalls of the gate pad 311a and the source pad 314a respectively having the first and second holes. The insulating interlayer 320 is extended at minimum of 3 μm from the sidewalls of the gate pad 311a and the source pad 314a. When forming the insulating interlayer 320 surrounding the sidewalls of the gate pad 311a and the source pad 314a at the first and second holes, it is possible to prevent the gate pad 311a and the source pad 314a from being damaged due to pin holes. The pin holes are generated because the gate pad terminal 315a and the source pad terminal 315b of the transparent conductive metal are damaged by an etchant when removing reflective electrodes of the first and second holes.

Figure 1:
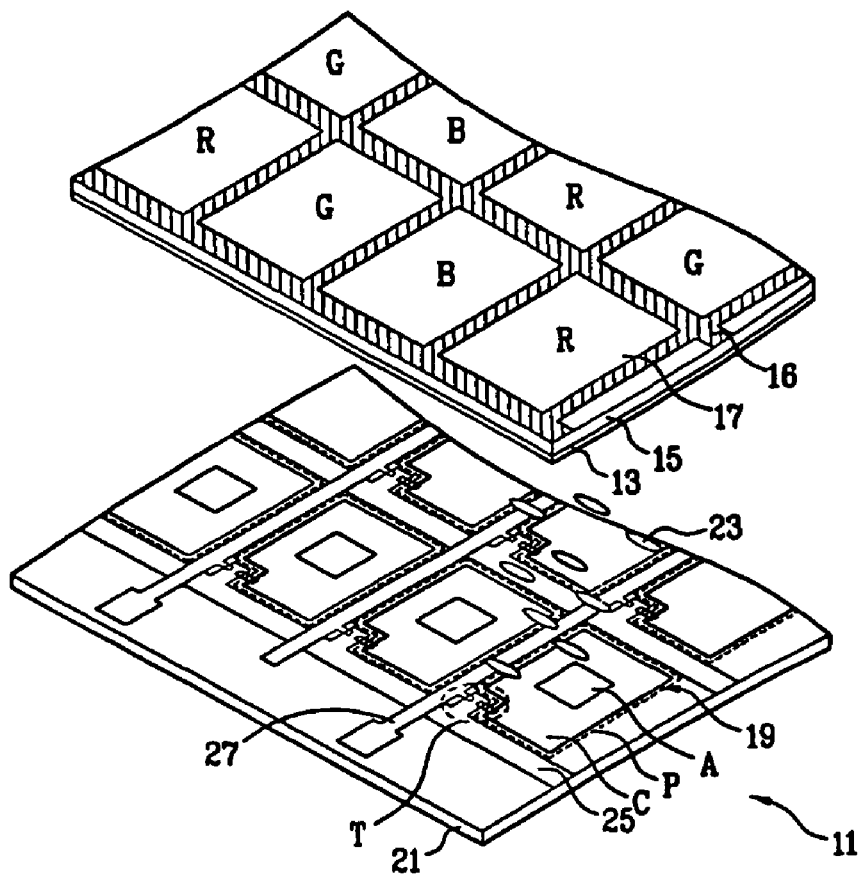
FIG. 1 is an exploded perspective view illustrating some parts of a general transflective type LCD device.
Figure 2:
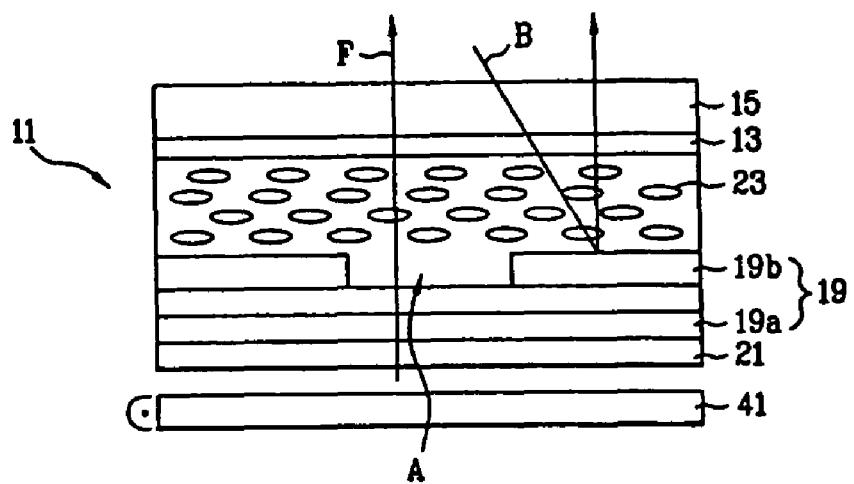
FIG. 2 is a cross-sectional view illustrating a general transflective type LCD device.
Figure 3:
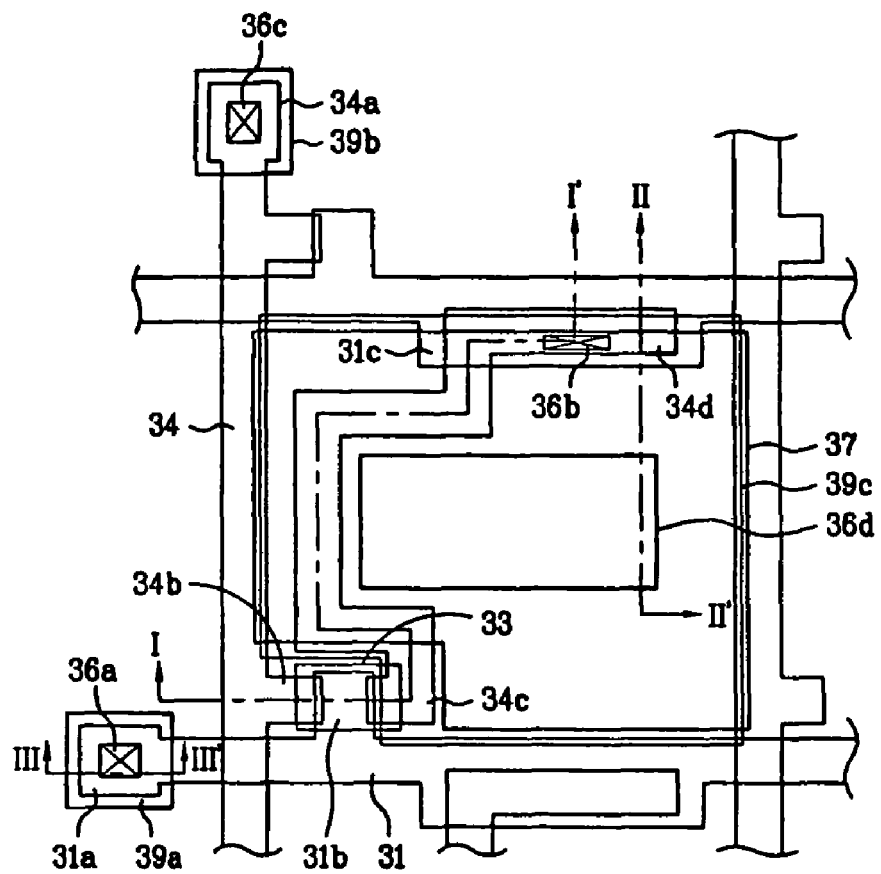
FIG. 3 and FIG. 4 are respectively a plan view and a cross-sectional view illustrating a transflective type LCD device according to the first method of the related art.
Figure 4:
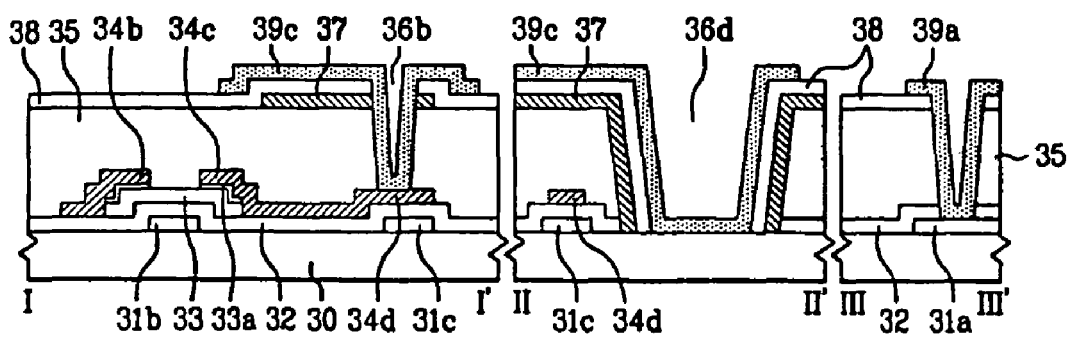
Figure 5A:
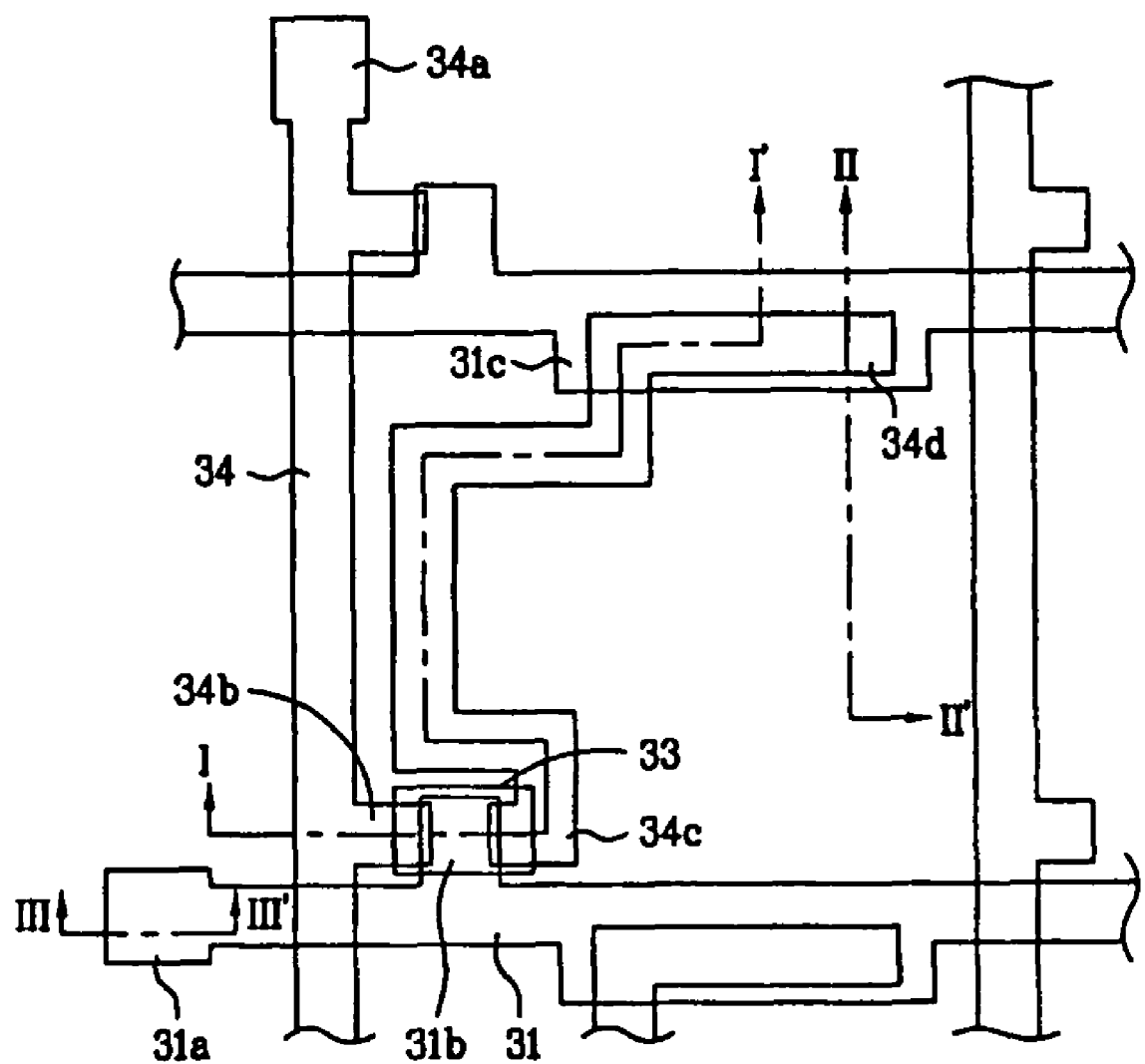
FIG. 5A to FIG. 5C are sequential plan views illustrating an enlarged pixel of an array substrate in a method for manufacturing a transflective type LCD device according to the first method of the related art.
Figure 5B:
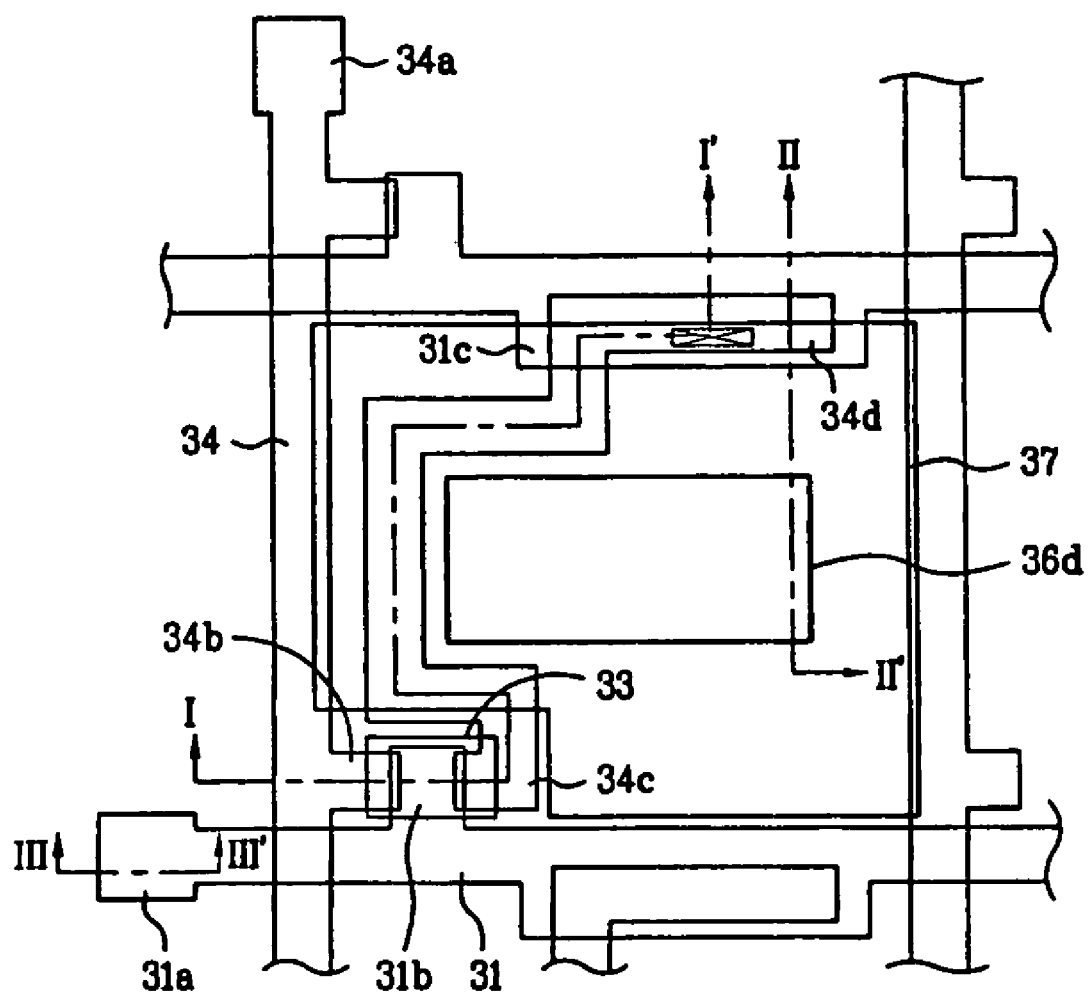
Figure 5C:
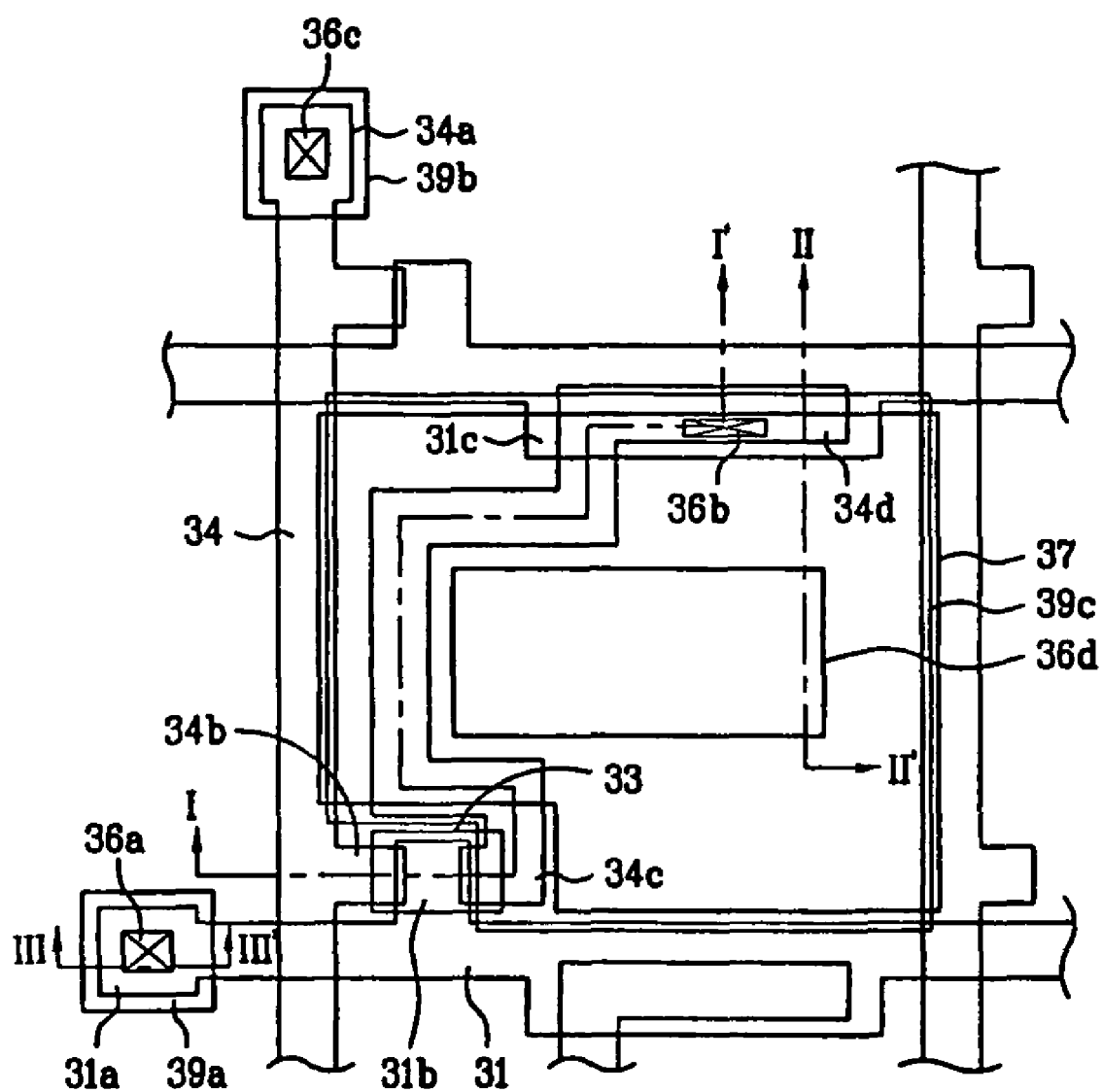
Figure 6A:
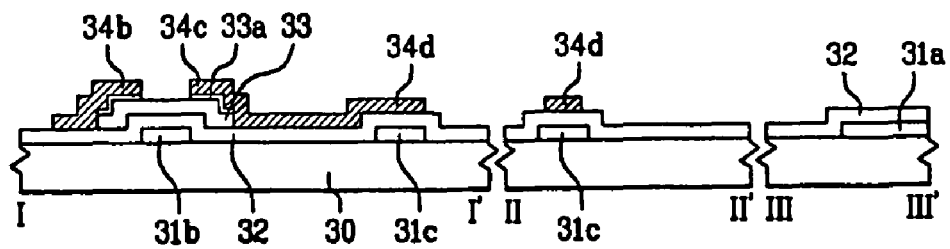
FIG. 6A to FIG. 6C are cross-sectional views taken along lines I-I', II-II' and III-III' of FIG. 5A to FIG. 5C for illustrating the manufacturing process.
Figure 6B:
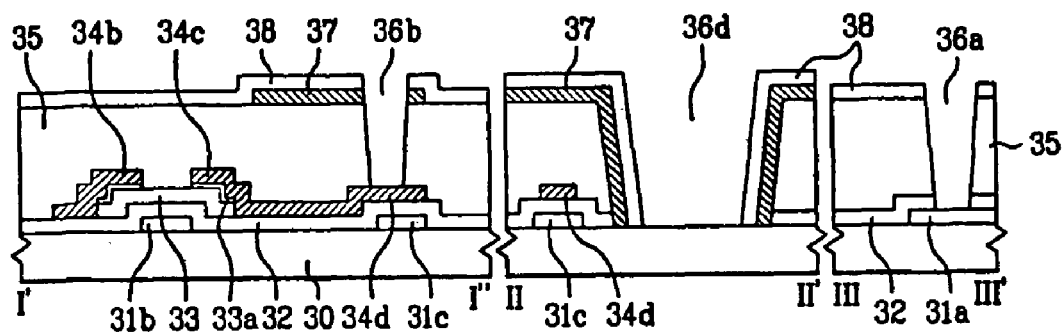
Figure 6C:
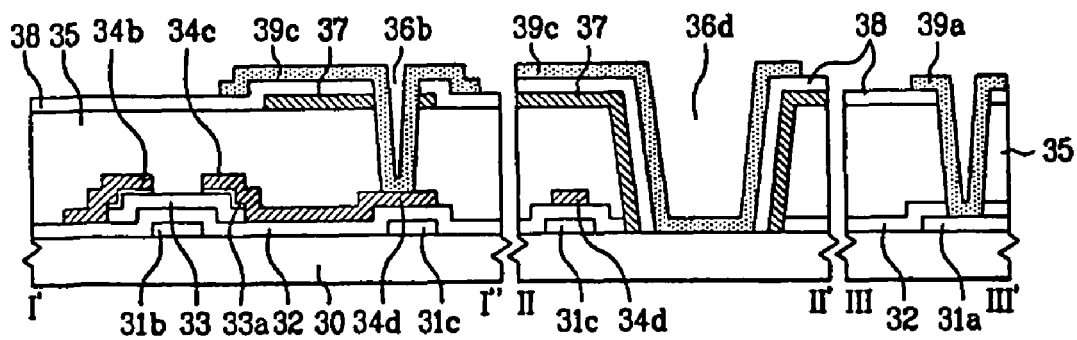
Figure 7:
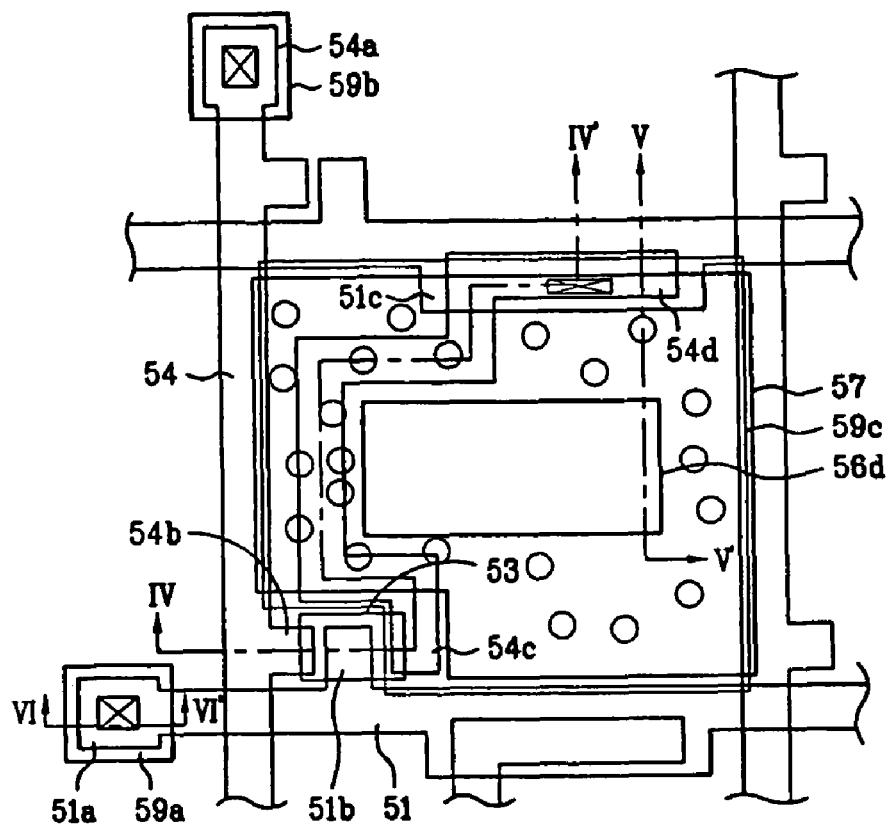
FIG. 7 and FIG. 8 are respectively a plan view and a cross-sectional view illustrating a transflective type LCD device according to the second method of the related art.
Figure 8:
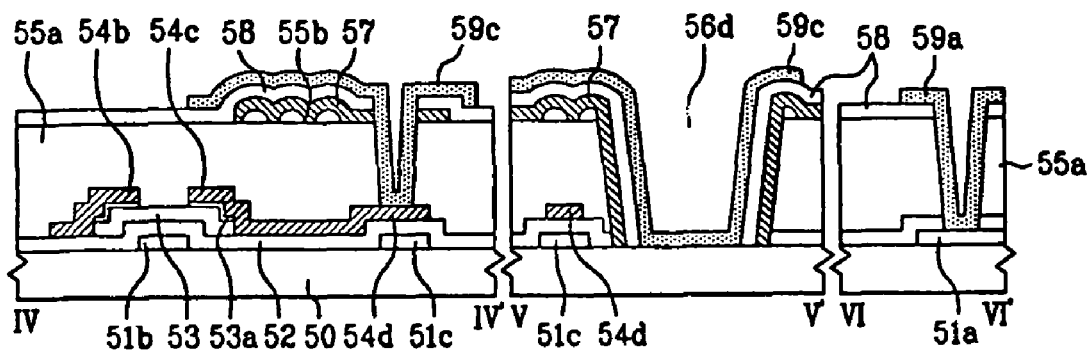
Figure 9A:
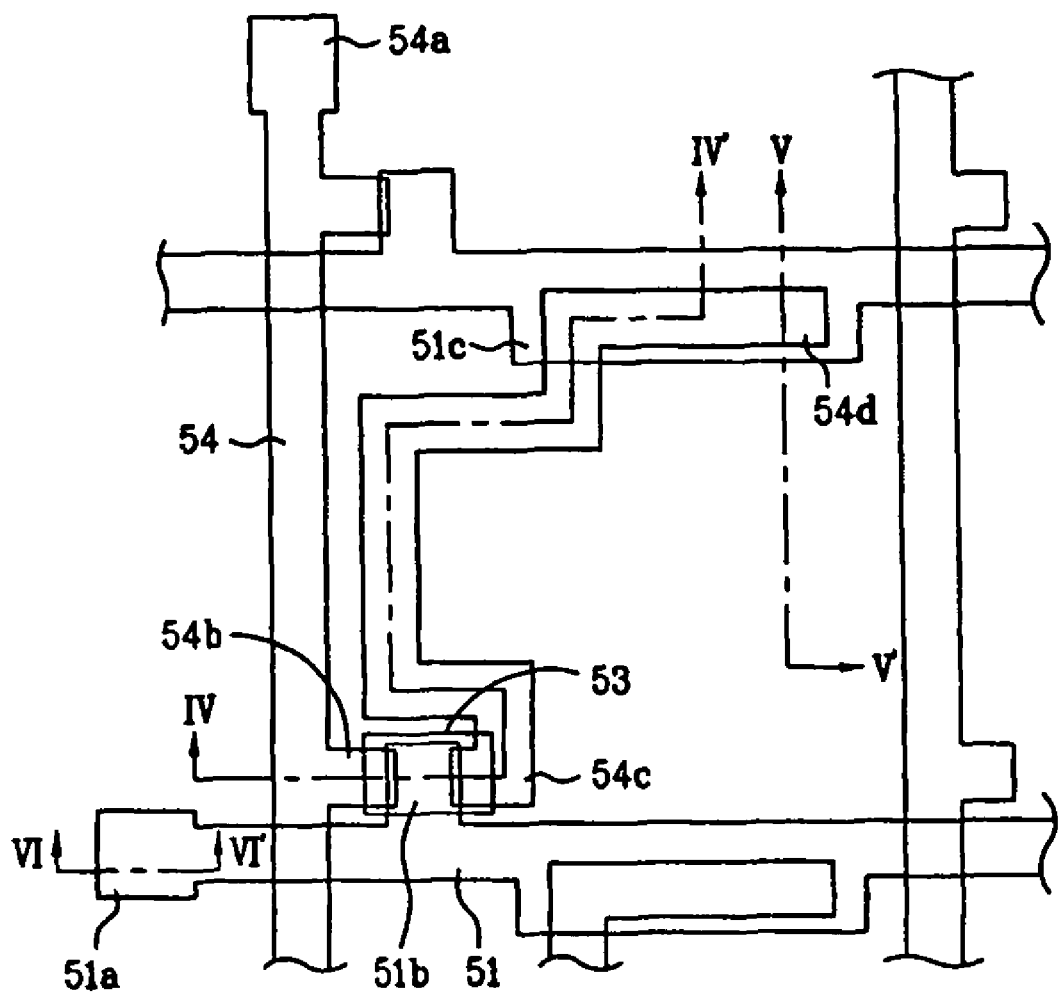
FIG. 9A to FIG. 9C are sequential plan views illustrating an enlarged pixel of an array substrate in a method for manufacturing a transflective type LCD device according to the second method of the related art.
Figure 9B:
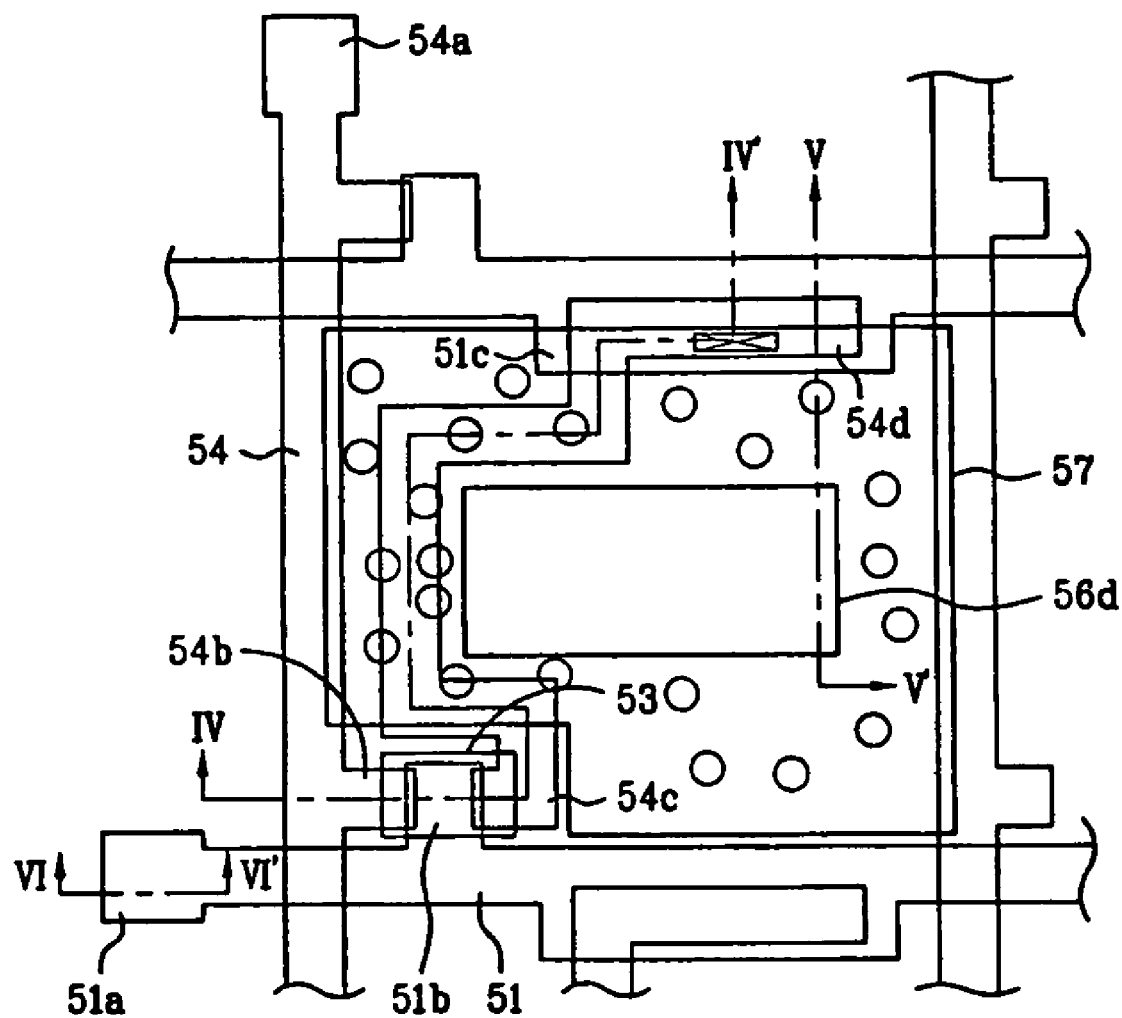
Figure 9C:
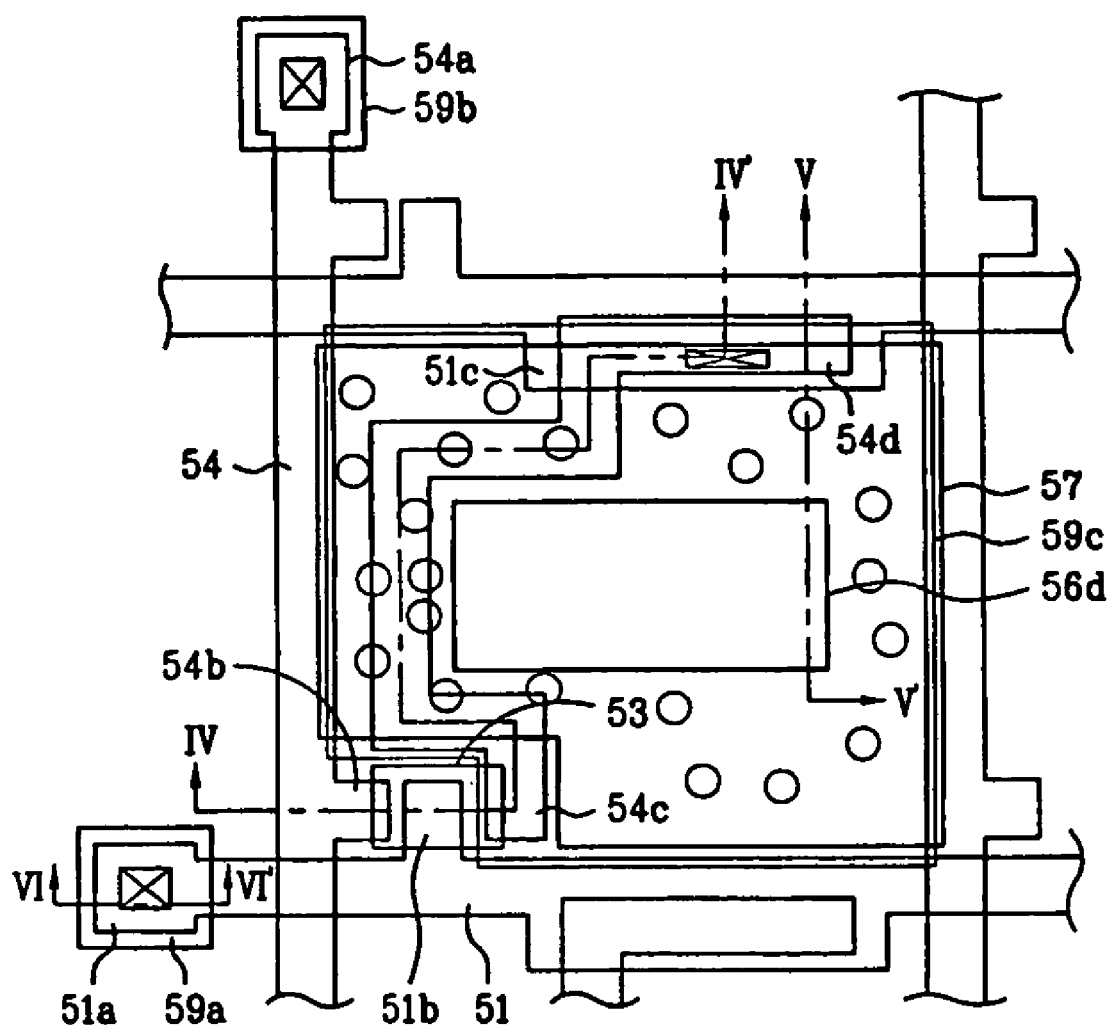
Figure 10A:
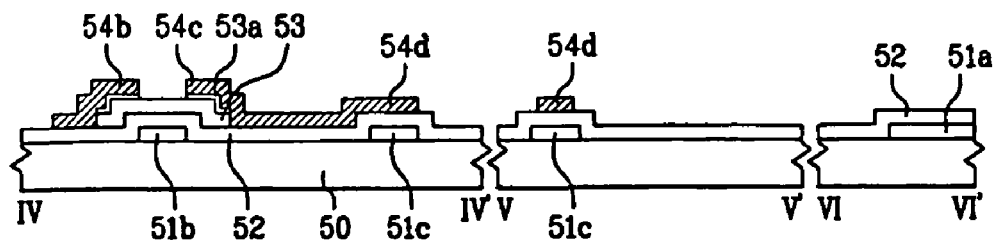
FIG. 10A to FIG. 10C are cross-sectional views taken along lines IV-IV', V-V' and VI-VI' of FIG. 9A to FIG. 9C for illustrating the manufacturing process.
Figure 10B:
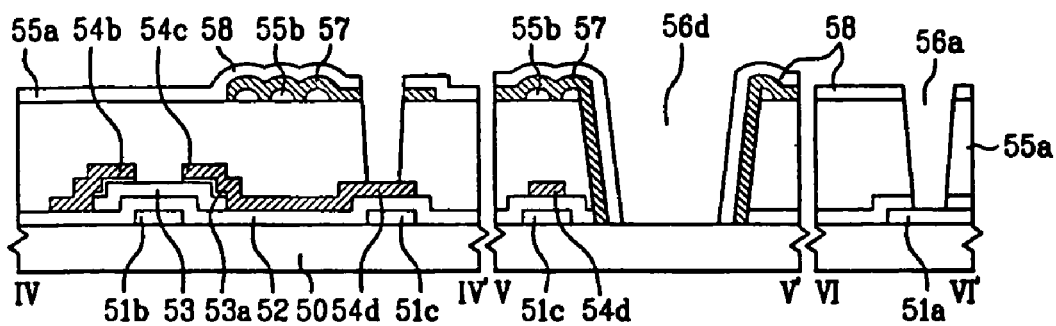
Figure 10C:
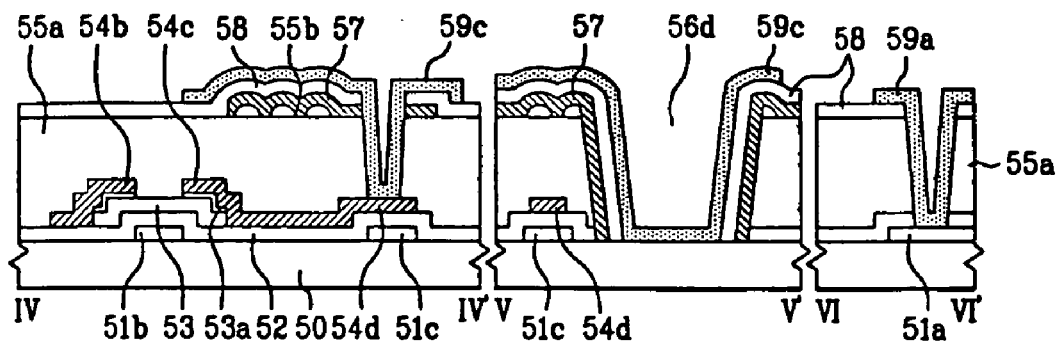

Also, a first passivation layer 316a has a first through hole, first and second contact holes 318a and 318b respectively formed on the transmitting electrode 315, the gate pad 311a and the source pad 314a in the pixel region. Then, a projection pattern 316b (circle of FIG. 7) is formed on the first passivation layer 316a of a reflective part of the pixel region. The transmitting holes are classified into first and second transmitting holes, the first transmitting hole having inclined sidewalls by the first passivation layer 316a, and the second transmitting hole exposing the transmitting electrode 315 by the reflective electrode 319a. Accordingly, the first transmitting hole is wider than the second transmitting hole. The reflective electrode 319a is formed to have an uneven surface on the first passivation layer 316a and the projection pattern 316b of the reflective part in contact with the transmitting electrode 315 at the bottom of the first transmitting hole extending from the inclined sidewall of the pixel region. The reflective electrode 319a overlaps the data line 315 defining the pixel region. Thus, a pixel electrode is formed of the reflective electrode 319a and the transmitting electrode 315.

Preferably, the reflective electrode 319a is formed as a dual-layered structure having first and second metals, the first metal having low resistance, and the second metal having great reflectivity. For example, the first metal may be formed of Mo, and the second metal may be formed of Al or AlNd. Thus, it is possible to decrease a contact resistance to the transparent electrode ITO by connecting Mo to the transparent electrode, and to prevent Galvanic corrosion according to direct contact between Al/AlNd and ITO. Also, the reflective electrode 319a is formed at an upper side of the first passivation layer 316a, the inclined sidewall of the first transmitting hole, and the bottom of the first transmitting hole extending from the inclined sidewall, thereby improving reflectivity. Furthermore, the reflective electrode 319a has an uneven surface due to the projection pattern, and the reflective electrode 319a is formed on the transmitting electrode 315, whereby it is possible to improve reflectivity in an effective viewing angle range.

The structure of the reflective electrode 319a having the projection pattern may be applicable to a connection structure between the upper storage electrode and the drain electrode. The first passivation layer 316a may be formed at lower portions of the transmitting electrode 315 and the insulating interlayer 320. In this case, the projection pattern 316b may be formed on the insulating interlayer 320. For reference, although not shown, bonding bumps may be formed for applying signals to the gate pad terminal 315a and the source pad terminal 315b. When the COG method is used, COG bonding bumps are formed inside the first and second contact holes 318a and 318b. When the COF and TAP methods are used, it is hard to form the bonding bumps inside the first and second contact holes because the bonding bumps are large. In this case, a conductive ball is formed in the first and second contact holes, and then the bonding bumps are formed on the conductive balls, so that the gate pad terminal 315a and the source pad terminal 315b are connected to the bonding bumps through the first and second contact holes.

A method for manufacturing the transflective type LCD device having the aforementioned structure will be described with reference to FIG. 31A to FIG. 31C and FIG. 32A to FIG. 32C. First, as shown in FIG. 31A and FIG. 32A, a conductive metal material such as aluminum Al, molybdenum Mo, tungsten W or any conductive alloy is deposited on the transparent substrate 310, and then patterned to form a gate pad 311a having a predetermined area and a first hole, a gate line 311 extending from the gate pad 311a in one direction, and a gate electrode 311b projecting from the gate line 311 to have a predetermined area. When forming the gate line 311, the lower storage electrode 311c is formed at the storage capacitor region of the preceding gate line. Next, an insulating material such as silicon dioxide $SiO_2$ or silicon nitride SiNx is deposited on the entire surface of the transparent substrate 310 including the gate line 311. Also, the amorphous silicon layer having amorphous silicon a-Si and impurity is deposited to form a first insulating layer and a semiconductor layer (amorphous silicon and doped amorphous silicon). Next, the semiconductor layer is patterned to form an island-shaped semiconductor pattern above the gate electrode 311b.

Subsequently, a conductive metal material such as molybdenum Mo, tungsten W or chrome Cr is deposited on the entire surface of the substrate 310 having the semiconductor pattern, and then a patterning process is performed thereon. According to the patterning process, the data line 314 is formed substantially perpendicular to the gate line 311 having the first insulating layer in between, the source pad 314a having the second hole is formed at one end of the data line 314, and the source electrode 314b projecting from one side of the data line 314 is formed overlapping with one side of the semiconductor pattern. When forming the data line 314, the drain electrode 314c separated from the source electrode 314b is formed overlapping with the other side of the semiconductor pattern, and the upper storage electrode 314d is formed above the lower storage electrode 311c of the preceding gate line. Also, the doped amorphous silicon is etched by using the source electrode 314b and the drain electrode 314c as masks, whereby the active layer 313 of the amorphous silicon is formed, and the ohmic contact layer 313a of the doped amorphous silicon layer is formed on the active layer 313 except the in channel region.

As shown in FIG. 31B and FIG. 32B, one of transparent conductive metals such as Indium-Tin-Oxide ITO and Indium-Zinc-Oxide IZO is deposited on the entire surface of the transparent substrate 310 having the source electrode 314b and the drain electrode 314c, and then a wet-etch process is performed thereto, thereby forming the transmitting electrode 315 in direct contact with the drain electrode 314c and the upper storage electrode 314d at the preceding gate line. The transmitting electrode 315 is wider than the second transmitting hole (FIG. 31C and FIG. 32C). After depositing the insulating interlayer 320 of the silicon nitride layer on the entire surface of the transparent substrate 310 including the transmitting electrode 315, a patterning process is performed thereon to expose predetermined portions of the gate pad terminal 315a and the source pad terminal 315b, and a predetermined portion of the transmitting electrode 315 in the pixel region. At this time, the insulating interlayer 320 is formed to surround the sidewalls of the gate pad 311a and the source pad 314a. The insulating interlayer 320 extends at a minimum of 3 μm from the sidewalls of the gate pad 311a and the source pad 314a.

Referring to FIG. 31C and FIG. 32C, one of organic insulating materials such as BenzocycloButen BCB and photoacrylic resin is deposited on the entire surface of the transparent substrate 310, thereby forming the first passivation layer 316a. After depositing an organic material such as photoacryl on the first passivation layer 316a, the organic material is patterned by embossing technology, whereby the projection pattern 316b is formed at the portion corresponding to the reflective part. Next, the first passivation layer 316a and the projection pattern 316b are patterned, thereby forming the first transmitting hole exposing the predetermined portion of the transmitting electrode 315 in the pixel region, and the first and second contact holes 318a and 318b on the gate pad terminal 315a and the source pad terminal 315b.

A reflective metal material having low resistance value and great reflectivity such as aluminum Al, aluminum alloy or silver Ag is deposited on the entire surface of the transparent substrate 310 having the projection pattern 316b, and then the patterning process is performed thereto. As a result, the transmitting electrode 315 is exposed, and the reflective electrode 319a is formed in the reflective part of the pixel region in contact with the sidewall of the first transmitting hole and the transmitting electrode 315 at the bottom of the extended first transmitting hole. Preferably, the reflective electrode 319a is formed as a dual-layered structure with the first metal having low resistance value and the second metal having great reflectivity. For example, the first metal may be Mo and the second metal may be Al or AlNd. When the reflective electrode 319a is formed of a dual-layer of Mo and Al/AlNd, it is possible to decrease the contact resistance to the transparent electrode ITO by connecting Mo to the transparent electrode, and to prevent Galvanic corrosion by $Al_2O_3$ at the interface between Al/AlNd and ITO.

When removing the reflective metal, the reflective metals on the gate pad 311a and the source pad 314a are removed together. The gate pad 311a and the source pad 314a respectively have the first and second holes, and the insulating interlayer 320 is formed thereon for surrounding the sidewalls of the gate and source pads 311a and 314a. Thus, it is possible to prevent the etchant from penetrating into the transparent conductive metal through the pin holes of the gate and source pad terminals 315a and 315b, thereby preventing the gate pad 311a and the source pad 314a from being damaged. The reflective electrode 319a partially overlaps the data line 314 defining the pixel region. The first passivation layer 316a may be formed at the lower portions of the transmitting electrode 315 and the insulating interlayer 320. In this case, the projection pattern 316b is formed on the insulating interlayer 320.

For reference, although not shown, bonding bumps may be formed for applying signals to the gate pad terminal 315a and the source pad terminal 315b. When a COG method is used, the COG bonding bumps are formed inside the first and second contact holes 318a and 318b. When COF and TAP methods are used, it is hard to form the bonding bumps inside first and second contact holes because the bonding bumps are large. In this case, a conductive ball is formed in the first and second contact holes, and then the bonding bumps are formed on the conductive balls, so that the gate pad terminal 315a and the source pad terminal 315b are connected to the bonding bumps through the first and second contact holes.

As mentioned above, the transflective type LCD device according to the present invention and the method for manufacturing the same have the following advantages.

First, it is not required to perform the additional process of forming the contact hole between the drain electrode and the transmitting electrode, and between the upper storage electrode and the transmitting electrode, thereby simplifying manufacturing process. Second, the contact hole is not formed on the storage capacitor, thereby preventing the aperture ratio from being lowered. Third, the reflective electrode is formed on the inclination of the first transmitting hole, and is in contact with the transmitting electrode at the bottom of the first transmitting hole extended from the inclination, thereby improving the aperture ratio of the reflective part. Fourth, the doped amorphous silicon layer is etched after forming the transmitting electrode, thereby preventing the channel region of the thin film transistor from being damaged. Fifth, the buffer insulating layer is deposited before forming the transmitting electrode, whereby it is possible to prevent the channel region of the thin film transistor from being damaged when performing the wet-etch process for forming the transmitting electrode. Sixth, the gate pad and the source pad respectively having the first and second holes are apart from each other, and the insulating interlayer is formed thereon for surrounding the sidewalls of the gate and source pads, thereby preventing the gate pad and the source pad from being damaged. Seventh, the reflective electrode is formed in the dual-layered structure of Mo—Al or Mo—AlNd, thereby preventing Galvanic corrosion at the interface between the transmitting electrode and the reflective electrode. Eighth, the reflective electrode is formed above the transmitting electrode, thereby improving reflectivity. Ninth, after forming the projection pattern of the photoacryl, it is not required to deposit an additional silicon nitride layer, whereby it is possible to prevent the photoacryl from deteriorating.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A transflective type LCD device having a pixel region with a reflective part and a transmitting part comprising:
    a plurality of gate and data lines crossing each other on a substrate defining a plurality of pixel regions;
    a thin film transistor having a drain electrode at a crossing point of the gate and data lines;
    an upper storage electrode of a storage capacitor at a preceding gate line separated from the drain electrode;
    a transmitting electrode in the pixel region in contact with the drain electrode and the upper storage electrode;
    a passivation layer including a first transmitting hole with an inclination exposing a predetermined portion of the transmitting electrode; and
    a reflective electrode in the reflective part of the pixel region wherein the transmitting electrode is in contact with the reflective electrode by a second transmitting hole in the passivation layer.

2. The transflective type LCD device of claim 1, wherein the passivation layer has projection patterns in the reflective part and thereby the reflective layer has an uneven surface.

3. The transflective type LCD device of claim 1, wherein a lower storage electrode of the storage capacitor is formed on the same plane as the gate line corresponding to a preceding gate line.

4. The transflective type LCD device of claim 1, wherein the reflective electrode is in contact with the transmitting electrode at the bottom of the first transmitting hole.

5. The transflective type LCD device of claim 1, wherein the reflective electrode is formed in a dual-layered structure of any one of Mo—Al and Mo—AlNd.

6. A transflective type LCD device having a pixel region including transmitting and reflective regions comprising:
    a plurality of gate and data lines formed on a substrate and having a gate insulating layer in between, each gate line substantially perpendicular to each data line for defining the pixel region;
    a thin film transistor with a gate electrode, a source electrode and a drain electrode, formed at a crossing point of the gate and data lines;
    a lower storage electrode formed integral with a preceding gate line;
    an upper storage electrode separated from the drain electrode, and formed above the lower storage electrode having the gate insulating layer in between;
    gate and source pads respectively formed at end portions of the gate and data lines, and having first and second holes;
    a transmitting electrode formed in the pixel region, respectively overlapping with a portion of the drain electrode and a portion of the upper storage electrode for being in direct contact with the drain electrode and the upper storage electrode;
    gate and source pad terminals formed with the transmitting electrode, and respectively being in contact with the gate and source pads through the first and second holes;
    an insulating layer formed on the substrate including the transmitting electrode and the thin film transistor, having regions exposing respective portions of the gate pad terminal, source pad terminal and the transmitting electrode, and surrounding sidewalls of the gate and source pad terminals;
    a passivation layer formed on the insulating layer;
    a first through hole exposing a predetermined portion of the transmitting electrode via at least the passivation layer;
    a projection pattern formed at the passivation layer of the reflective region; and
    a reflective electrode formed on the projection pattern of the passivation layer, and being in contact with the transmitting electrode through the first through hole.

7. The transflective type LCD device of claim 6, wherein the transmitting electrode and the gate and source pad terminals are formed of one of Indium-Tin-Oxide ITO, Tin-Oxide TO, Indium-Zinc-Oxide IZO and Indium-Tin-Zinc-Oxide ITZO.

8. The transflective type LCD device of claim 6, wherein the insulating layer is formed of silicon nitride.

9. The transflective type LCD device of claim 6, wherein the reflective electrode is overlapped with the data line.

10. The transflective type LCD device of claim 6, wherein the reflective electrode has a dual-layered structure of one of Mo—Al and Mo—AlNd.

11. The transflective type LCD device of claim 6, wherein a semiconductor layer is formed to have a predetermined space below the source pad, and a predetermined portion of the semiconductor layer is exposed by the second hole.

12. A method for manufacturing a transflective type LCD device having a unit pixel region with a reflective part and a transmitting part comprising:
    forming a plurality of gate and data lines crossing each other on a substrate defining a plurality of pixel regions;
    forming a thin film transistor having a drain electrode at a crossing point of the gate and data lines;
    forming an upper storage electrode of a storage capacitor at a preceding gate line separated from the drain electrode;
    forming a transmitting electrode in the pixel region in contact with the drain electrode and the upper storage electrode;
    forming a passivation layer including a first transmitting hole with an inclination exposing a predetermined portion of the transmitting electrode; and
    forming a reflective electrode in the reflective part of the pixel region wherein the transmitting electrode is in contact with the reflective electrode by a second transmitting hole in the passivation layer.

13. The method of claim 12, wherein the passivation layer has projection patterns in the reflective part and thereby the reflective layer has an uneven surface.

14. The method of claim 12, wherein a lower storage electrode of the storage capacitor is formed on the same plane as the gate line corresponding to a preceding gate line.

15. The method of claim 12, wherein the reflective electrode is in contact with the transmitting electrode at the bottom of the first transmitting hole.

16. The method of claim 12, wherein the reflective electrode is formed in a dual-layered structure of any one of Mo—Al and Mo—AlNd.

* * * * *